(12) United States Patent  
Rubin

(10) Patent No.: US 10,609,937 B2  
(45) Date of Patent: Apr. 7, 2020

(54) SYSTEMS AND METHODS FOR DISTRIBUTING AND DISPENSING CHOCOLATE

(71) Applicant: Trade Secret Chocolates, Indianapolis, IN (US)

(72) Inventor: Matthew Rubin, Indianapolis, IN (US)

(*) Notice: Subject to any disclaimer, the term of this patent is extended or adjusted under 35 U.S.C. 154(b) by 307 days.

(21) Appl. No.: 14/879,997

(22) Filed: Oct. 9, 2015

(65) Prior Publication Data

US 2016/0100604 A1    Apr. 14, 2016

Related U.S. Application Data

(60) Provisional application No. 62/061,856, filed on Oct. 9, 2014, provisional application No. 62/115,339, filed on Feb. 12, 2015.

(51) Int. Cl.
| | |
|---|---|
| *A23G 1/00* | (2006.01) |
| *A23G 1/20* | (2006.01) |
| *B67D 3/00* | (2006.01) |
| *B67D 7/02* | (2010.01) |
| *B67D 7/82* | (2010.01) |

(52) U.S. Cl.
CPC .............. *A23G 1/20* (2013.01); *A23G 1/005* (2013.01); *A23G 1/0009* (2013.01); *A23G 1/0036* (2013.01); *A23G 1/0046* (2013.01); *A23G 1/201* (2013.01); *B67D 3/0012* (2013.01); *B67D 3/0022* (2013.01); *B67D 7/0216* (2013.01); *B67D 7/82* (2013.01)

(58) Field of Classification Search
CPC .. A23G 1/0009; A23G 1/0036; A23G 1/0046; A23G 1/005; A23G 1/20; A23G 1/201; B67D 3/0012; B67D 3/0022; B67D 7/0216; B67D 7/82

See application file for complete search history.

(56) References Cited

U.S. PATENT DOCUMENTS

| | | |
|---|---|---|
| 3,042,265 A | 7/1962 | Rodth |
| 4,087,053 A | 5/1978 | Voglesonger |
| 4,526,300 A | 7/1985 | Woody |

(Continued)

*Primary Examiner* — Erik Kashnikow
*Assistant Examiner* — Preston Smith
(74) *Attorney, Agent, or Firm* — C. John Brannon; Brannon, Sowers & Cracraft PC

(57) ABSTRACT

Systems and methods for preparing and dispensing food contents, typically molten chocolate. In one aspect, a method for treating chocolate includes placing a quantity of chocolate in a pressure-controllable environment; heating the quantity of chocolate to a temperature of about 115 degrees Fahrenheit; decreasing the pressure of the pressure-controllable environment to about 5 Torr; and holding the pressure of the pressure-controllable environment at about 5 Torr for a predetermined period of time. Additional steps may include decreasing the pressure of the pressure-controllable environment to about 5 Torr at an average rate of about 8 Torr per minute; heating the quantity of chocolate to a temperature of about 115 degrees Fahrenheit may occur at a rate of about 2 degrees Fahrenheit per minute; and/or heating the quantity of chocolate to a temperature of about 115 degrees Fahrenheit may occur at a rate of no more than 1 degree Fahrenheit per minute.

13 Claims, 34 Drawing Sheets

(56) References Cited

U.S. PATENT DOCUMENTS

| | | | |
|---|---|---|---|
| 4,572,835 A * | 2/1986 | Hachiya | A23G 1/18 |
| | | | 426/306 |
| 5,096,092 A | 3/1992 | Devine | |
| 5,803,317 A | 9/1998 | Wheeler | |
| 6,193,407 B1 | 2/2001 | Kubicz | |
| 6,860,788 B2 * | 3/2005 | Small | A63H 33/30 |
| | | | 446/475 |
| 7,371,004 B1 | 5/2008 | Branson, III et al. | |
| 2001/0002675 A1 | 6/2001 | Wilcox | |
| 2001/0038020 A1 | 11/2001 | Schalow et al. | |
| 2003/0129921 A1 | 7/2003 | Small | |
| 2004/0022903 A1 * | 2/2004 | Takeuchi | A23G 1/36 |
| | | | 426/98 |
| 2005/0122837 A1 | 6/2005 | Bravard et al. | |
| 2006/0182856 A1 * | 8/2006 | Ornelaz, Jr. | A23G 1/0063 |
| | | | 426/383 |
| 2006/0231577 A1 | 10/2006 | Powling et al. | |
| 2006/0283879 A1 | 12/2006 | Rasmussen | |
| 2008/0105711 A1 | 5/2008 | Kirimli | |
| 2010/0068365 A1 * | 3/2010 | Kober | A23G 1/0003 |
| | | | 426/507 |
| 2010/0163573 A1 | 7/2010 | Wegelin et al. | |
| 2010/0213210 A1 | 8/2010 | Drennow | |
| 2011/0300288 A1 * | 12/2011 | Godfrey | A23G 1/0009 |
| | | | 426/584 |
| 2012/0018561 A1 | 1/2012 | Wulf et al. | |
| 2012/0104041 A1 | 5/2012 | Coleman et al. | |
| 2013/0071523 A1 | 3/2013 | Barrett et al. | |
| 2014/0021221 A1 | 1/2014 | Derby et al. | |
| 2014/0061245 A1 | 3/2014 | McNulty et al. | |
| 2014/0120229 A1 | 5/2014 | Mantell | |
| 2015/0129611 A1 | 5/2015 | Vulpitta | |
| 2016/0100604 A1 | 4/2016 | Rubin | |
| 2016/0220078 A1 | 8/2016 | Ciavarella et al. | |

* cited by examiner

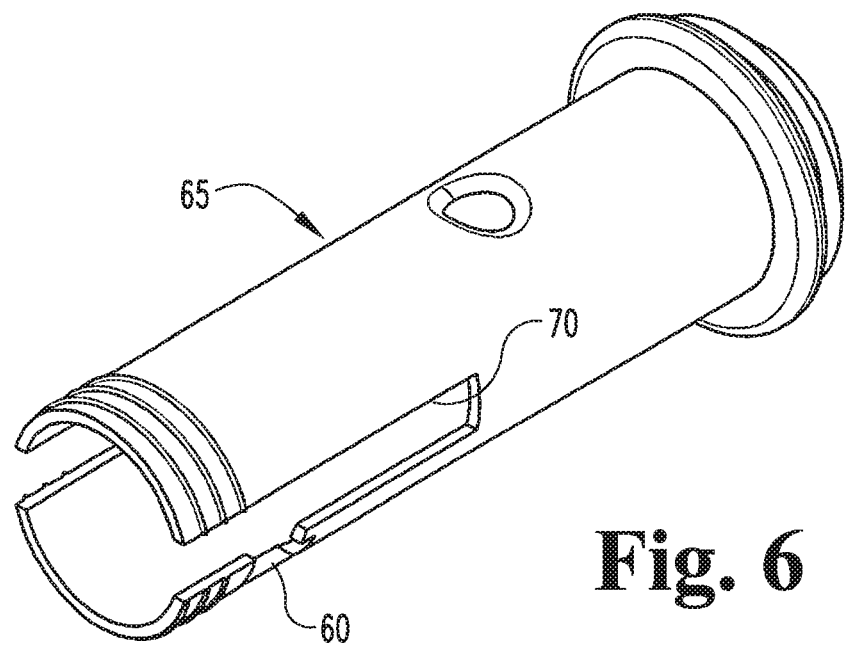
Fig. 6
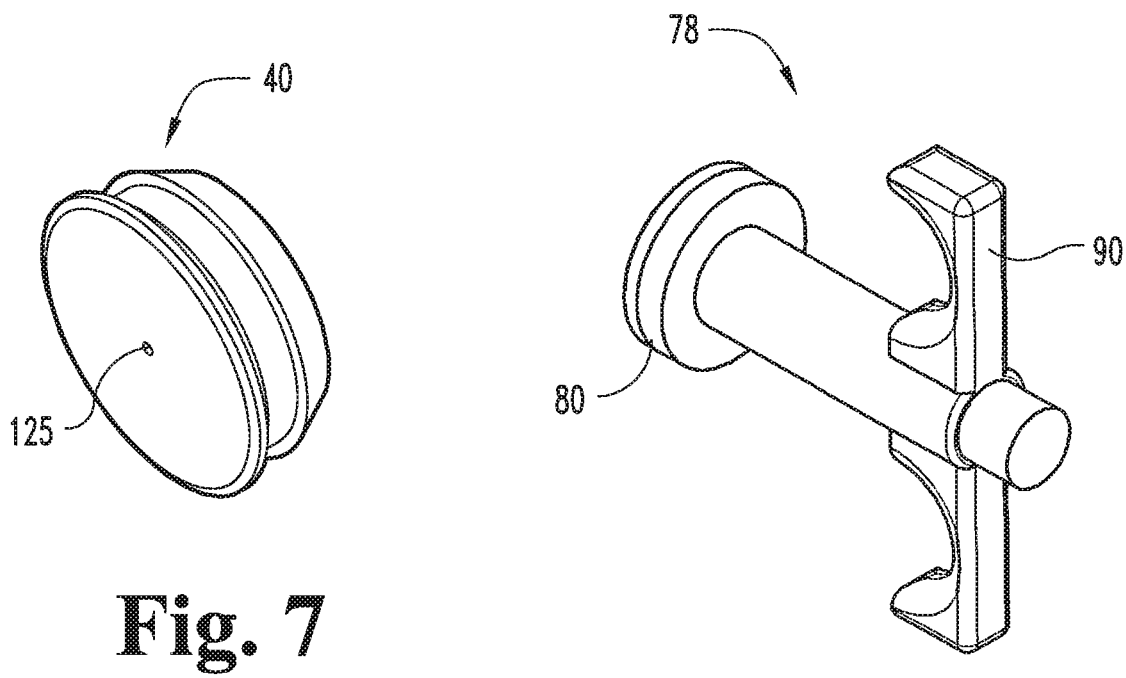
Fig. 7
Fig. 8

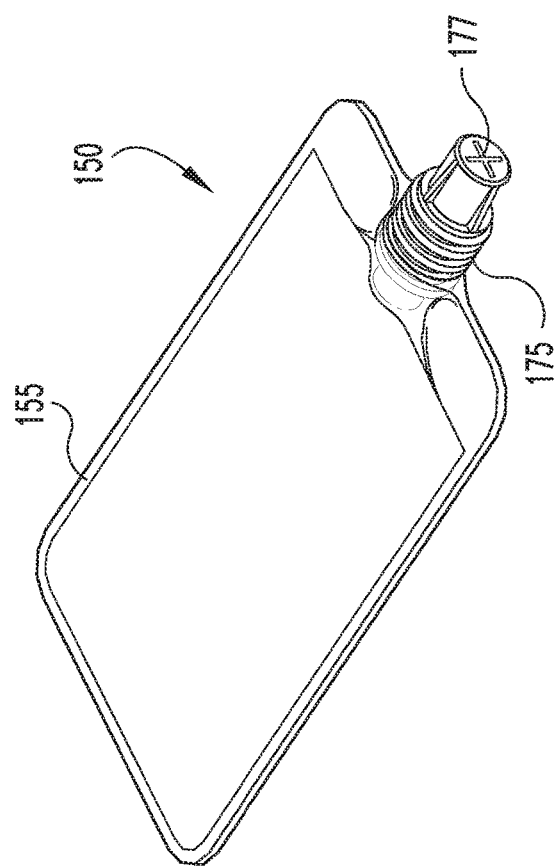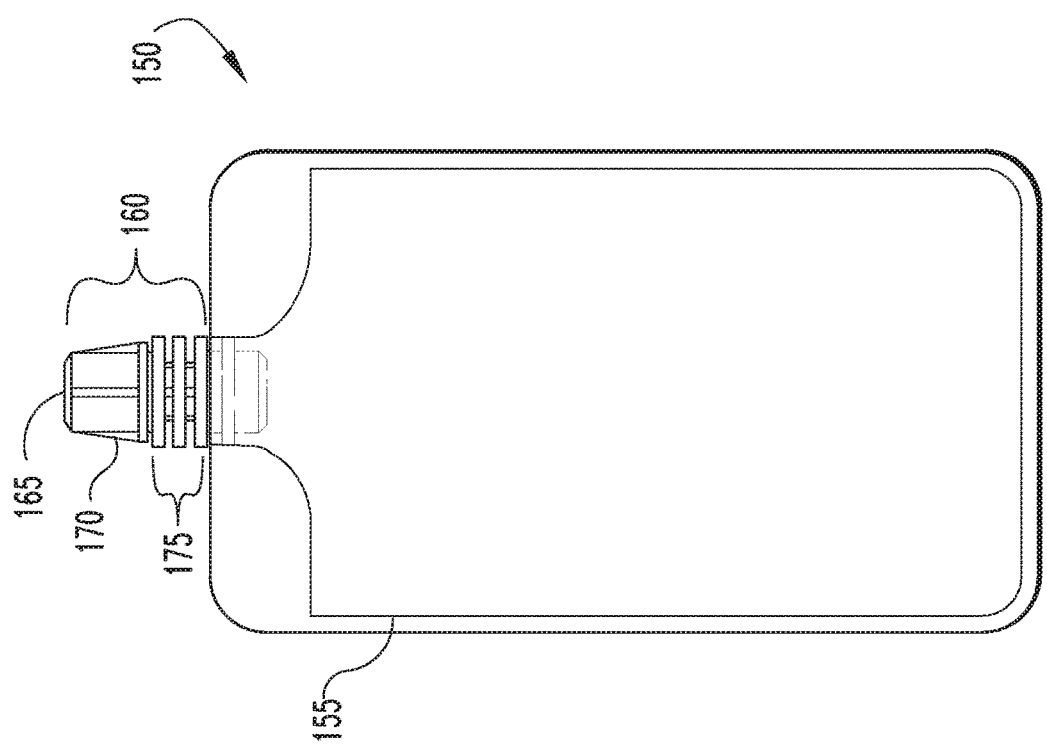
Fig. 9B
Fig. 9A

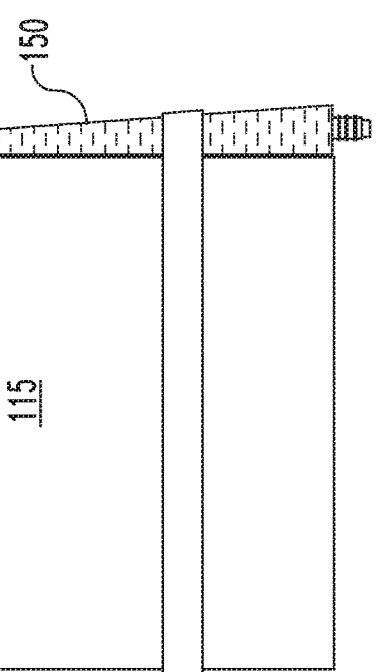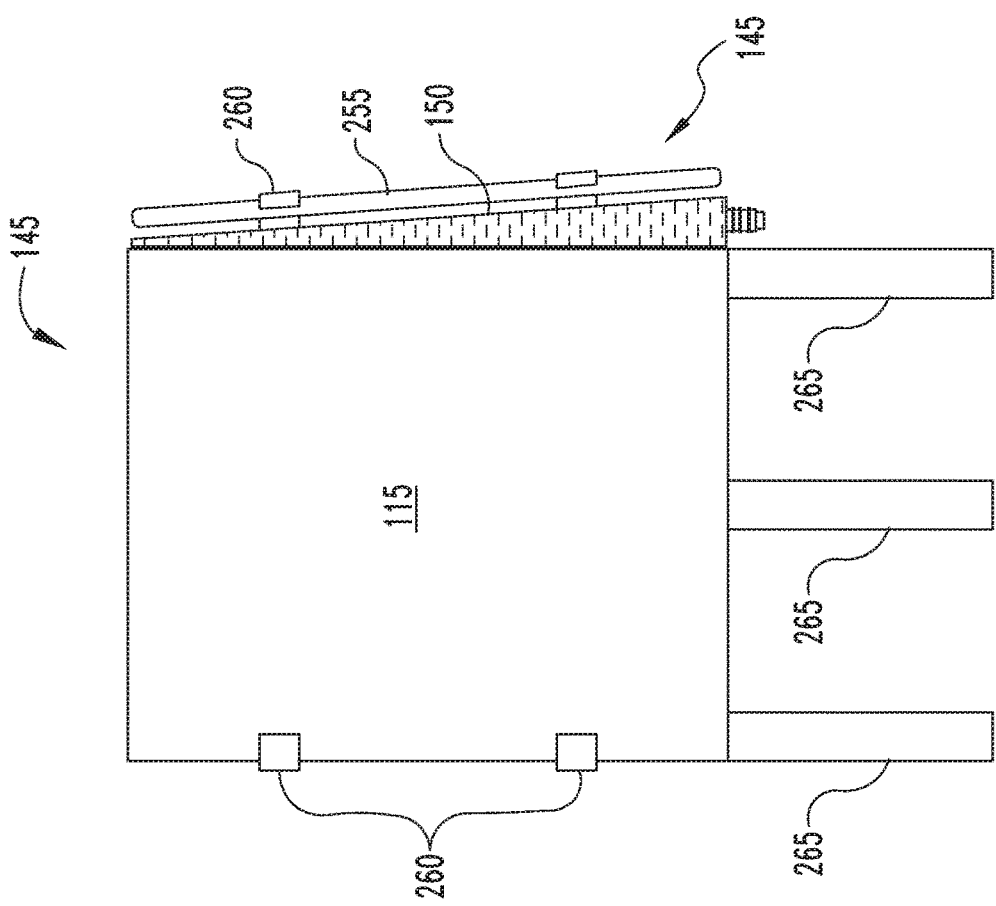
Fig. 12B
Fig. 12A

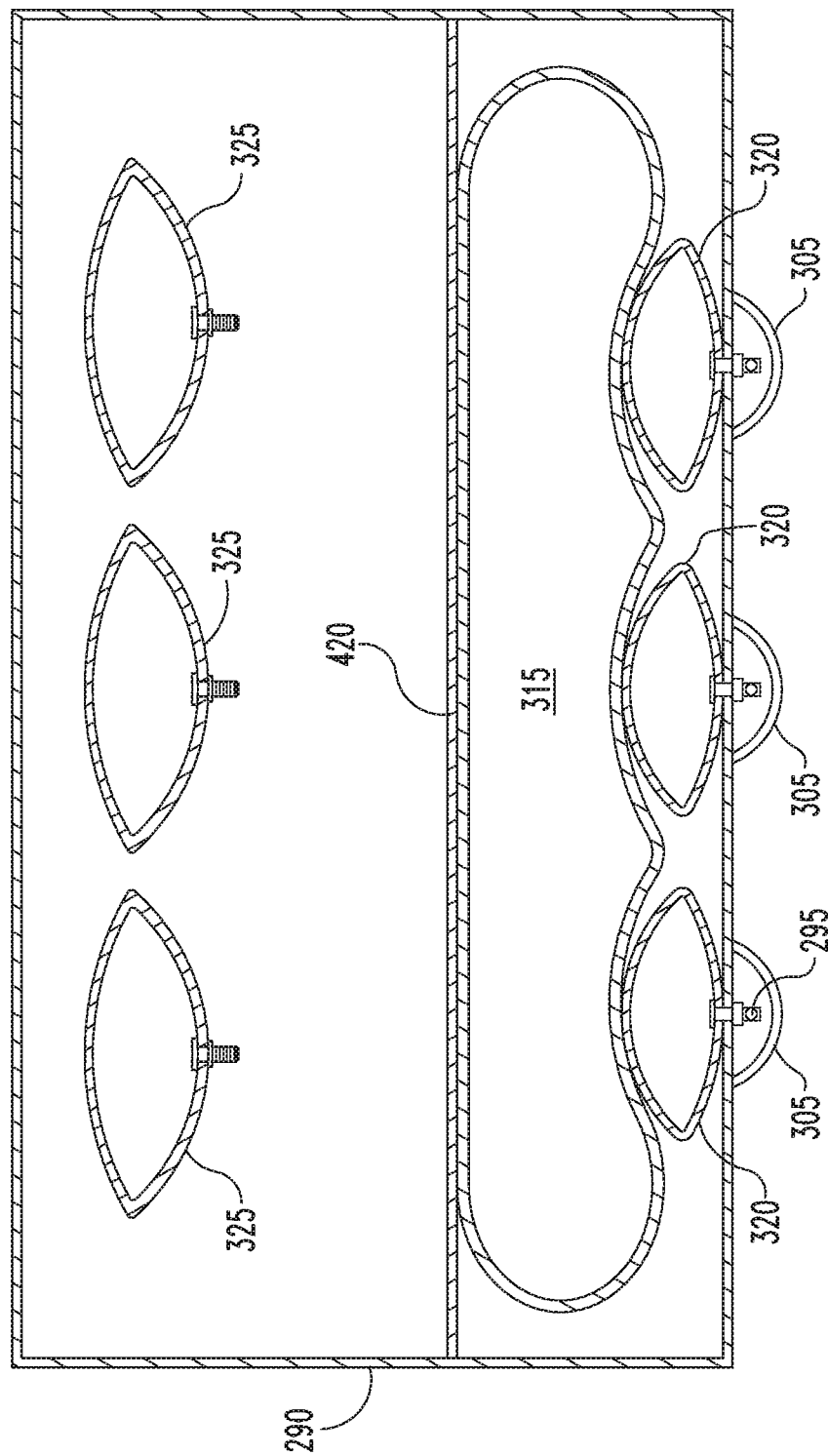

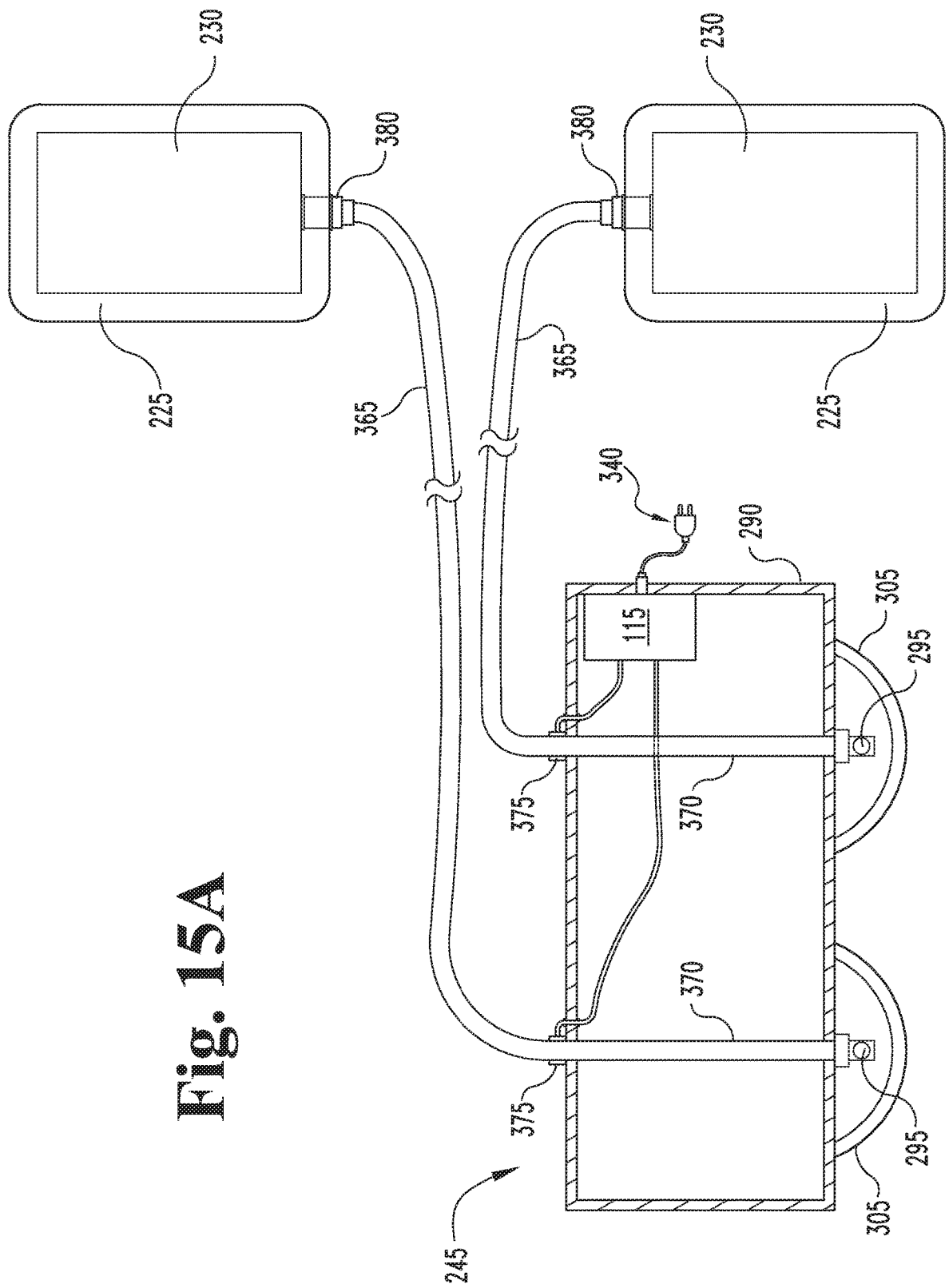

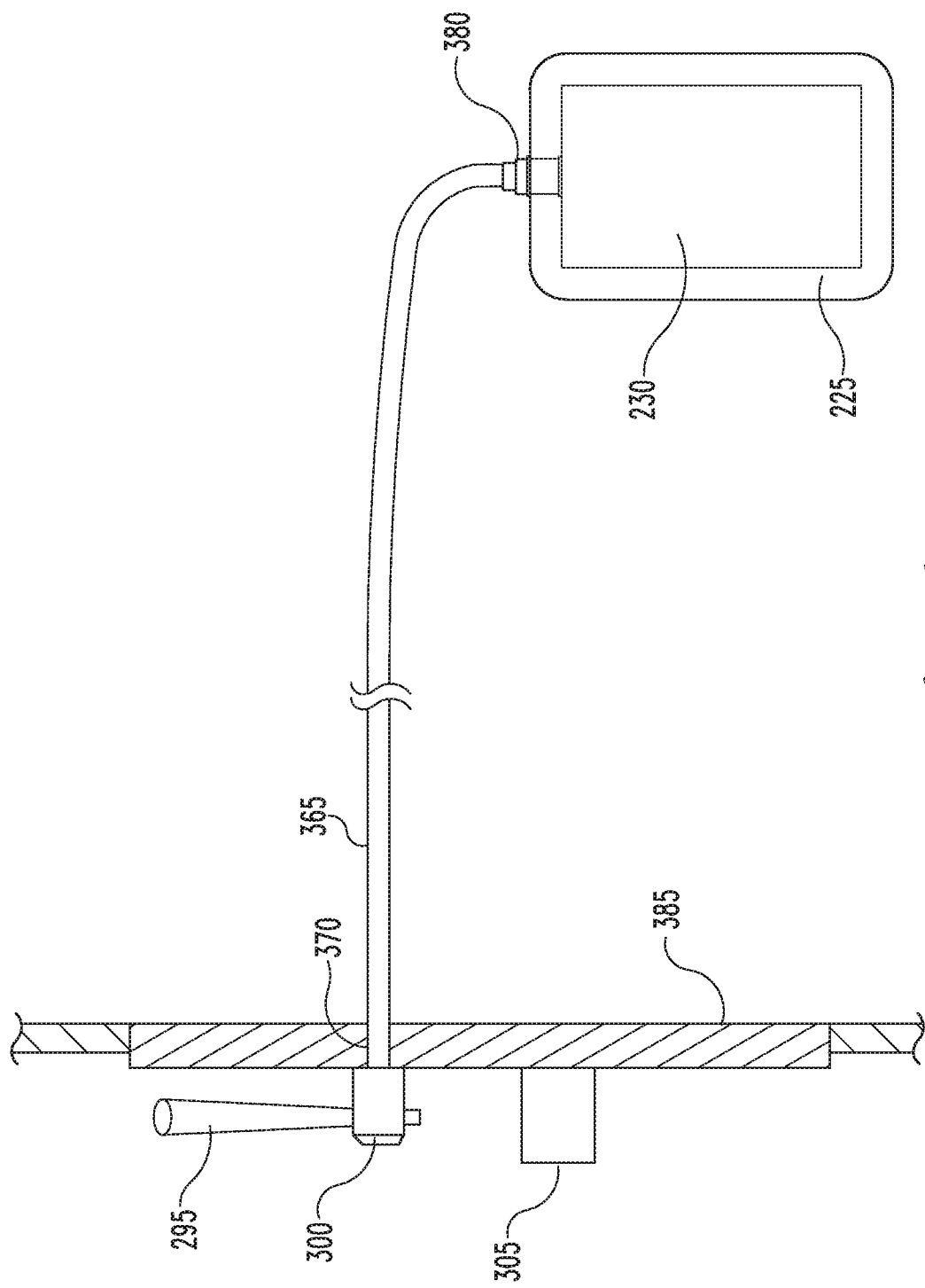

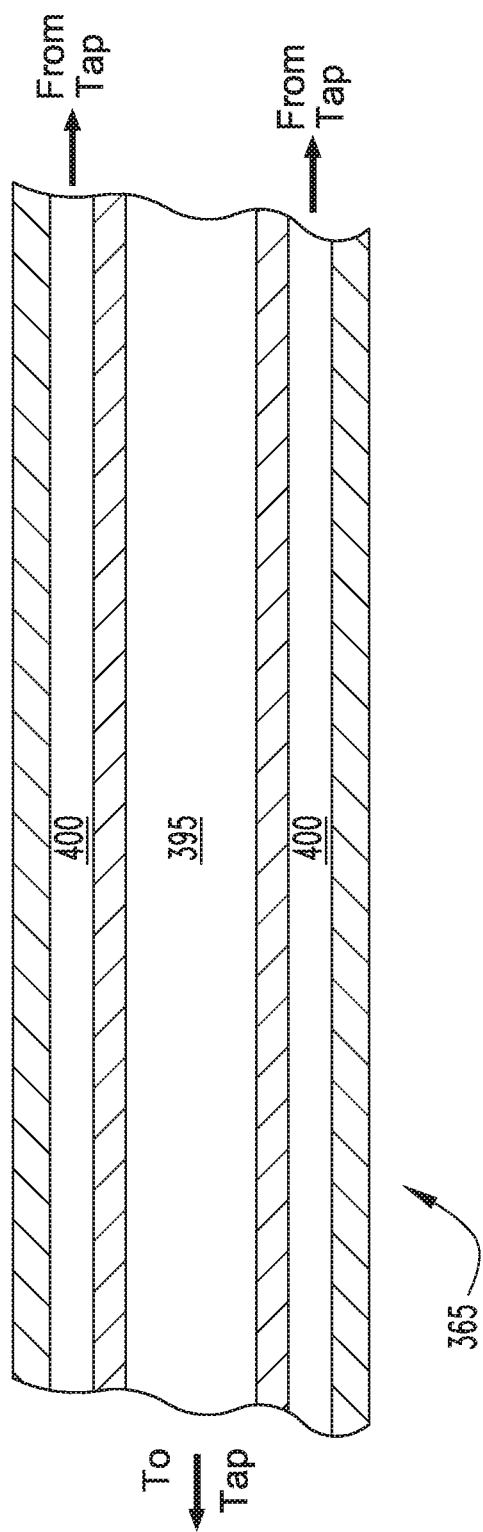

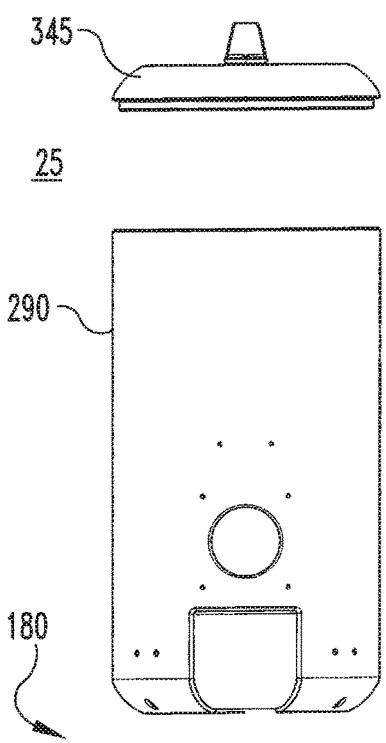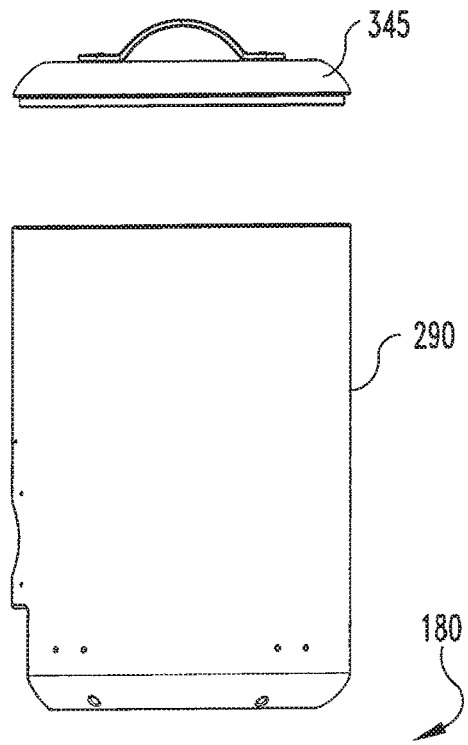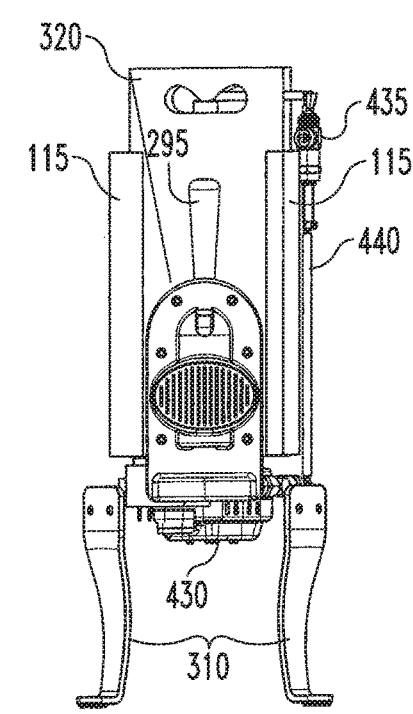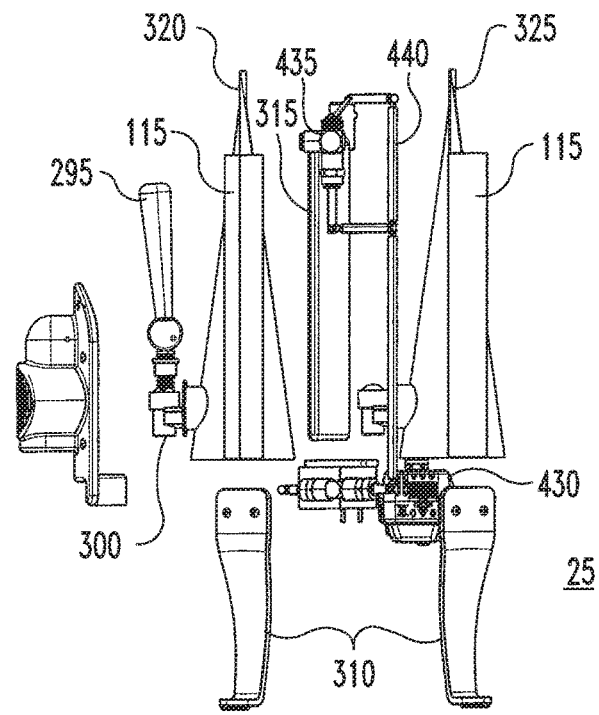
Fig. 19B
Fig. 19C

SYSTEMS AND METHODS FOR DISTRIBUTING AND DISPENSING CHOCOLATE

CROSS-REFERENCE TO RELATED APPLICATIONS

This application claims the benefit under 35 U.S.C. § 119(e) of co-pending U.S. Provisional Patent Application No. 62/061,856, entitled "Systems and Methods for Distributing and Dispensing Chocolate," filed Oct. 9, 2014, and also of co-pending U.S. Provisional Patent Application No. 62/115,339, entitled "Systems and Methods for Distributing and Dispensing Chocolate," filed Feb. 12, 2015, which are incorporated herein by reference in its entirety.

TECHNICAL FIELD

The invention disclosed herein relates generally to the field of food storage and dispensing, and more particularly, to a systems and methods for storing and dispensing molten food contents.

BACKGROUND

Chocolate, defined herein as a homogenous food substance that includes a suspension of cacao nibs, cacao powder, and/or cacao butter, and having a relative moisture content of less than 3% by weight, has been of economic and culinary interest for many years. Chocolate is typically solid at room temperature, and may form a liquid suspension or melt, at elevated temperatures above the melting point of the fat crystals, conventionally above 93° F. While chocolate may typically be characterized by an average particle size of less than 25 µm and a relative moisture content of approximately 1%, some course ground unconched chocolates, such as Mexican drinking chocolate, may contain particle sizes ranging up to 1 mm and a relative moisture content of over 2%.

In all cases, melted or molten chocolate is characterized by a relatively high viscosity compared to chocolate solutions, such as chocolate milk or other chocolate containing drinks, and unlike high water content chocolate drinks, chocolate is solid at 70° F. and must be melted in order to achieve a reasonable working viscosity. In this sense, chocolate may be considered a composite material characterized by a fatty, or hydrophobic matrix rather than an aqueous or hydrate matrix.

While ready-to-eat chocolate traditionally includes cacao nibs and sugar, other materials such as cacao butter, vegetable oil, milk powder, soy lecithin, ground vanilla bean, and/or nuts are often added to increase the sweetness, decrease the viscosity, dampen the flavor, or stabilize the chocolate suspension.

Like many melted suspensions, a chocolate melt will separate over time if left undisturbed resulting in a layer of high cacao butter content near the top of the melt, and a layer of high cacao and sugar particle content toward the bottom. Melt separation is one of the factors that drove the chocolate industry to store and distribute chocolate in solid tempered forms including beta-V crystals, which melt at approximately 93° F. In order to produce tempered chocolate, molten chocolate is heated above 98° F. to melt all crystal morphologies, cooled to approximately 82° F. to produce type IV and V crystals, and reheated to approximately 90° F. to melt the type IV crystals resulting in pure beta-V seed crystals that may propagate to form a solid bar upon rapid cooling. Rapid cooling is traditionally achieved through the use of large and expensive forced air cooling tunnels.

Unlike chocolate melts, tempered chocolate may preserve a consistent particle distribution for several months or years so long as it is stored in a cool and dry environment. If storage temperatures rise above 80° F., the crystalline state of tempered chocolate will soften and may result in migration and precipitation of cacao butter on the surface of the chocolate, resulting in a characteristic white flakey appearance on the surface known as fat bloom. Storing chocolate in humid environments may cause a similar problem known as sugar bloom where the sugar in the chocolate becomes saturated with excess moisture from the atmosphere and precipitate as tiny white spots on the surface of the chocolate with a characteristic appearance similar to fat bloom. The beta V crystal structure of cacao butter has a high density relative to amorphous chocolate or chocolate with other crystalline structures, resulting in a moisture resistant hard composite. Traditionally, the tempering process may be used to help store chocolate over a longer period of time in a relatively moisture-stable form as compared to amorphous chocolate.

Sugar and fat bloom are undesirable characteristics in finished chocolate goods, and often result in consumers either returning or disposing of their purchased goods. Cold chain distribution systems with refrigerated transports and storage facilities are traditionally used to avoid sugar and fat bloom. While this method is effective, it greatly adds to the cost and complexity of delivering chocolate goods.

Chocolate prior to tempering is traditionally melted and stored in large heated continuous mixing containers, such as tempering bowls or melting kettles. While continuous mixing and heating may maintain an even distribution of cacao butter in molten chocolate, it also exposes chocolate to a constant supply of open air, which promotes oxidation and outgassing of precious volatile flavors. As a result, chocolate manufacturers and chocolatiers typically limit the length of time chocolate is maintained in a molten state to only a few days in order to preserve the chocolate's flavor and freshness.

Molten untempered chocolate has many desirable culinary characteristics. Unlike tempered chocolate, melted chocolate may release its flavor without absorbing heat from a consumer's mouth, resulting in a more immediate and flavorful experience when compared to tempered chocolate. The flavor release from solid chocolate may be further delayed if a patron consumes a cold beverage or food prior to the consumption of solid chocolate. Cold food or drinks decrease the heat available in the mouth necessary to melt the chocolate and release the flavor.

Additionally, one technique for decreasing the viscosity of chocolate or other substances is a process known as conching, where the substance is heated above its melting point and milled in a conche for up to several days in an open air or forced air environment, resulting in a refined particle size distribution and a more desirable flavor profile. The milling process may be responsible for decreasing the average particle size, while the aeration may be responsible for decreasing the relative water content and other volatile acids contained within the chocolate.

Natural emulsifiers in chocolate have an affinity for water and organic acids, and may preferentially solubilize these compounds over less polar compounds such as sugar, resulting in a relatively viscous suspension. In an extreme case, excess water may strip the emulsifiers from sugar in melted chocolate causing the sugar to precipitate and result in chocolate seizing in a form resembling cement. Removing water and excess organic acids from chocolate releases bound emulsifiers and thereby decreases the viscosity of the suspension. While industrial scale chocolate manufactures often utilize conching in their production, the majority of small scale bean-to-bar chocolate manufactures utilize traditional milling systems, such as stone grinders, mélangers, or roller mills, to achieve the desired particle size distribution in a conche-free process. While these methods are effective at producing the desired particle size distribution, chocolate produced using a conch-free process may typically be characterized by a relatively high moisture content and acidic flavor profile.

Traditional conching methods may remove water and organic acids by passing air over the chocolate resulting in evaporation. Unfortunately, this method also results in additional oxidation of organic alcohols and ketones resulting in additional dissolved acids, in order to appreciably decrease the acid content of the chocolate, the oxidation process must first be driven to completion, which may take up to several days. Only then may aeration result in a net decrease of the acid content through evaporation.

Molten chocolate is a desirable food product that may deliver a superior consumer experience to solid chocolate due to the immediate availability of flavor and volatile compounds; however, it is increasingly difficult to maintain molten chocolate in a fresh homogenous state for periods of time greater than a few days with increasing container volumes. As a result, molten chocolate is often converted to tempered chocolate prior to distribution in order to preserve freshness. While tempered chocolate may enable long term storage and distribution, it requires the use of cold chain distribution systems in order to maintain quality of the finished goods. Therefore there is a need for a system and method that may enable distribution of chocolate through relatively uncontrolled environments. There is also a need for a system and method that would enable retailers to dispense fresh molten chocolate over extended periods of time without subjecting it to constant oxidation. The present novel technology addresses these needs.

BRIEF DESCRIPTION OF THE DRAWINGS

FIG. 6 is an illustration of a barrel of one embodiment of the present invention.

FIG. 7 is an illustration of a volume makeup according to one embodiment of the present invention.

FIG. 8 is an illustration of a plunger according to one embodiment of the present invention.

FIG. 9A is a perspective illustration of one embodiment of a container that may be used with the chocolate dispensing system.

FIG. 9B is a perspective illustration of a second implementation of the container embodiment of FIG. 9A including an anti-drain dispenser.

FIG. 12A is a front-perspective illustration of a fourth embodiment of the chocolate dispensing system.

FIG. 12B is a second perspective implementation of the fourth embodiment of the chocolate dispensing system.

FIG. 14B is a first top-down, cross-sectional illustration of the sixth embodiment of the chocolate dispensing system having a unitary pressure member.

FIG. 15A is a first schematic illustration of a seventh embodiment of the chocolate dispensing system including a remote delivery system.

FIG. 15B is a second schematic illustration of the seventh embodiment of the chocolate dispensing system including a remote delivery system and wall mount.

FIG. 15F is a cross-sectional illustration of the double-walled tubing used in the seventh embodiment of the chocolate dispensing system.

FIG. 19B is an exploded perspective view of an eighth embodiment of the chocolate dispensing system from the front.

FIG. 19C is an exploded perspective view of an eighth embodiment of the chocolate dispensing system from the side.

DETAILED DESCRIPTION

Figure 1:
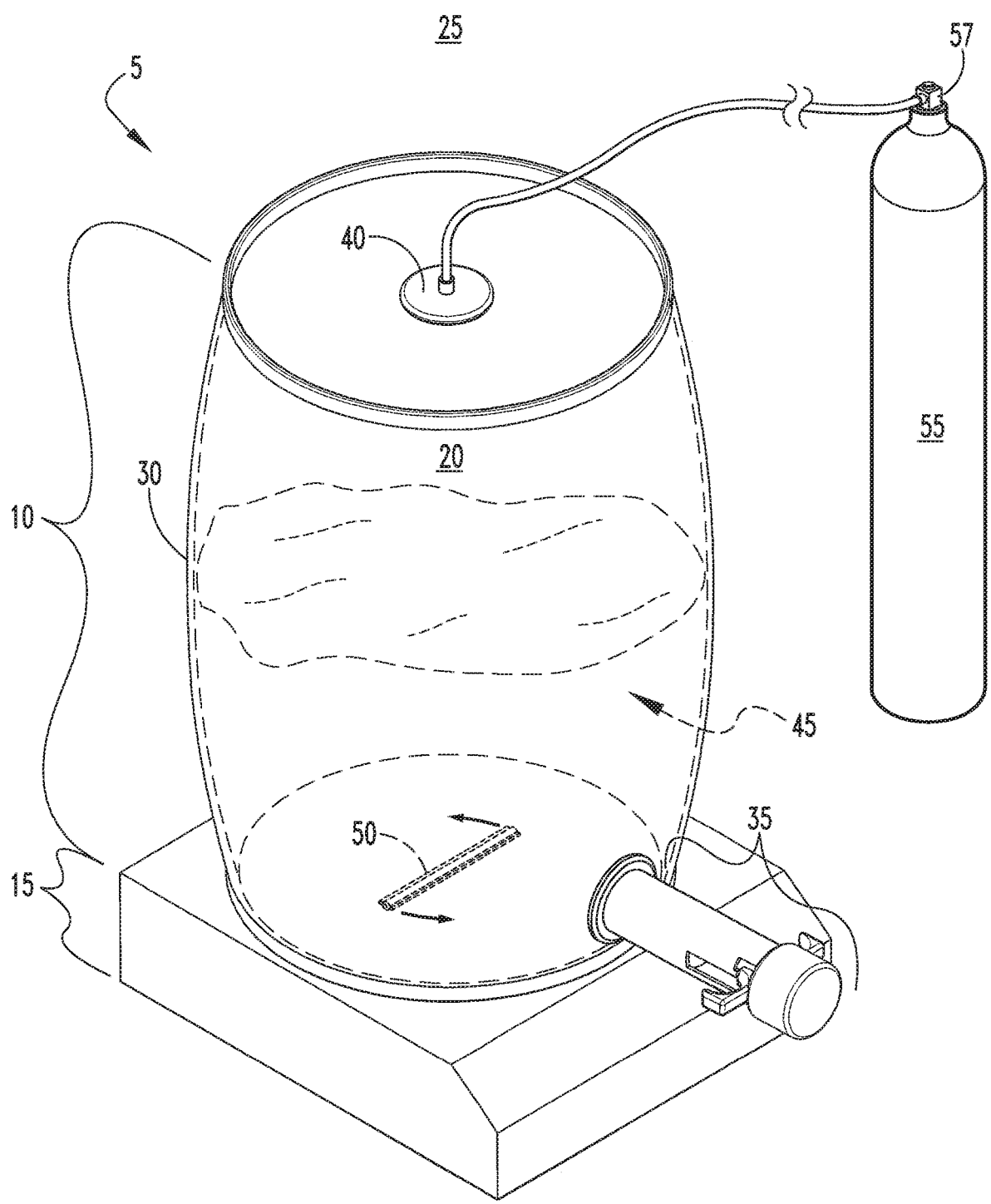
FIG. 1 is an illustration of a chocolate dispensing system according to one embodiment of the present invention.
Figure 2:
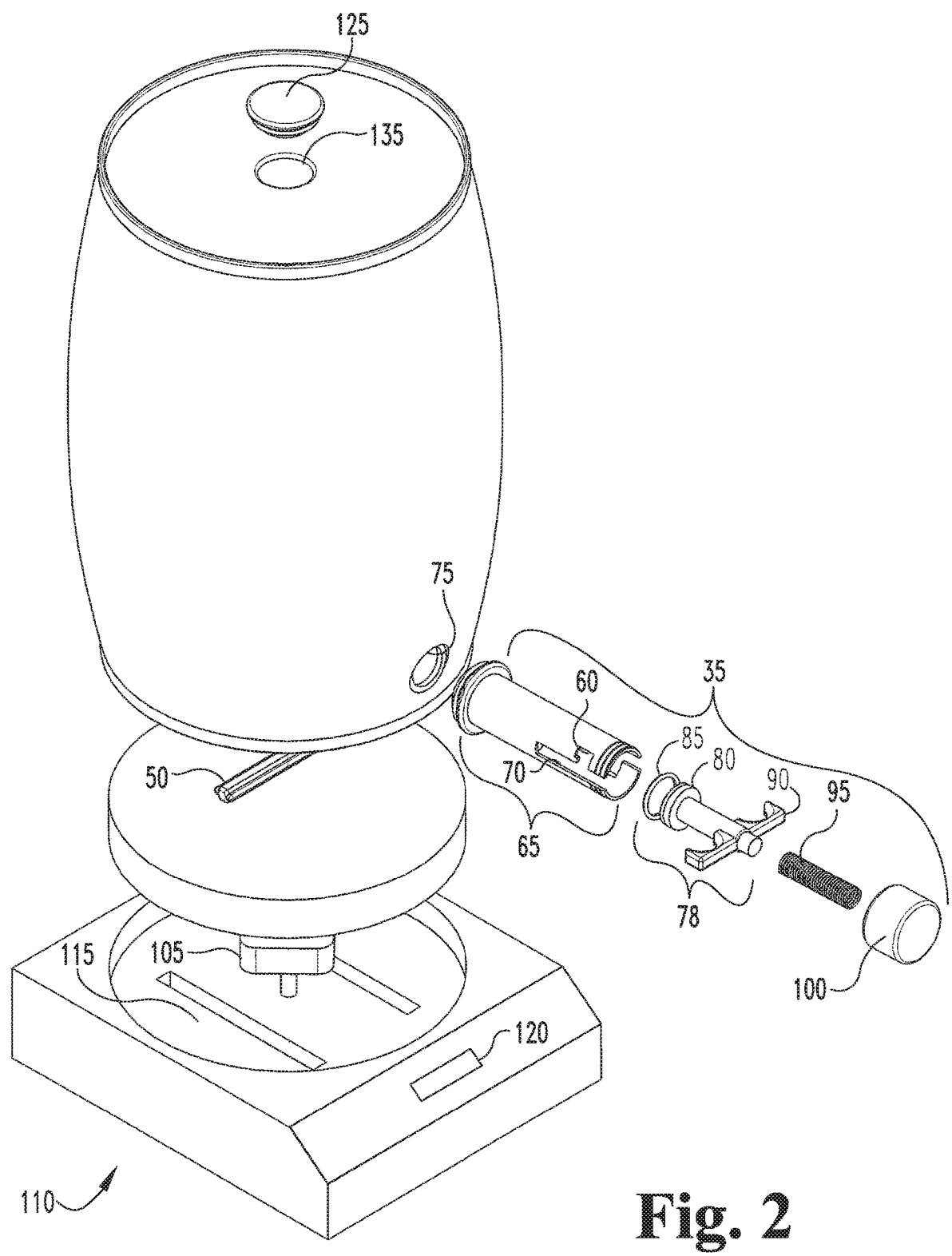
FIG. 2 is an exploded perspective illustration of a chocolate dispensing system of the present invention.
Figure 3:
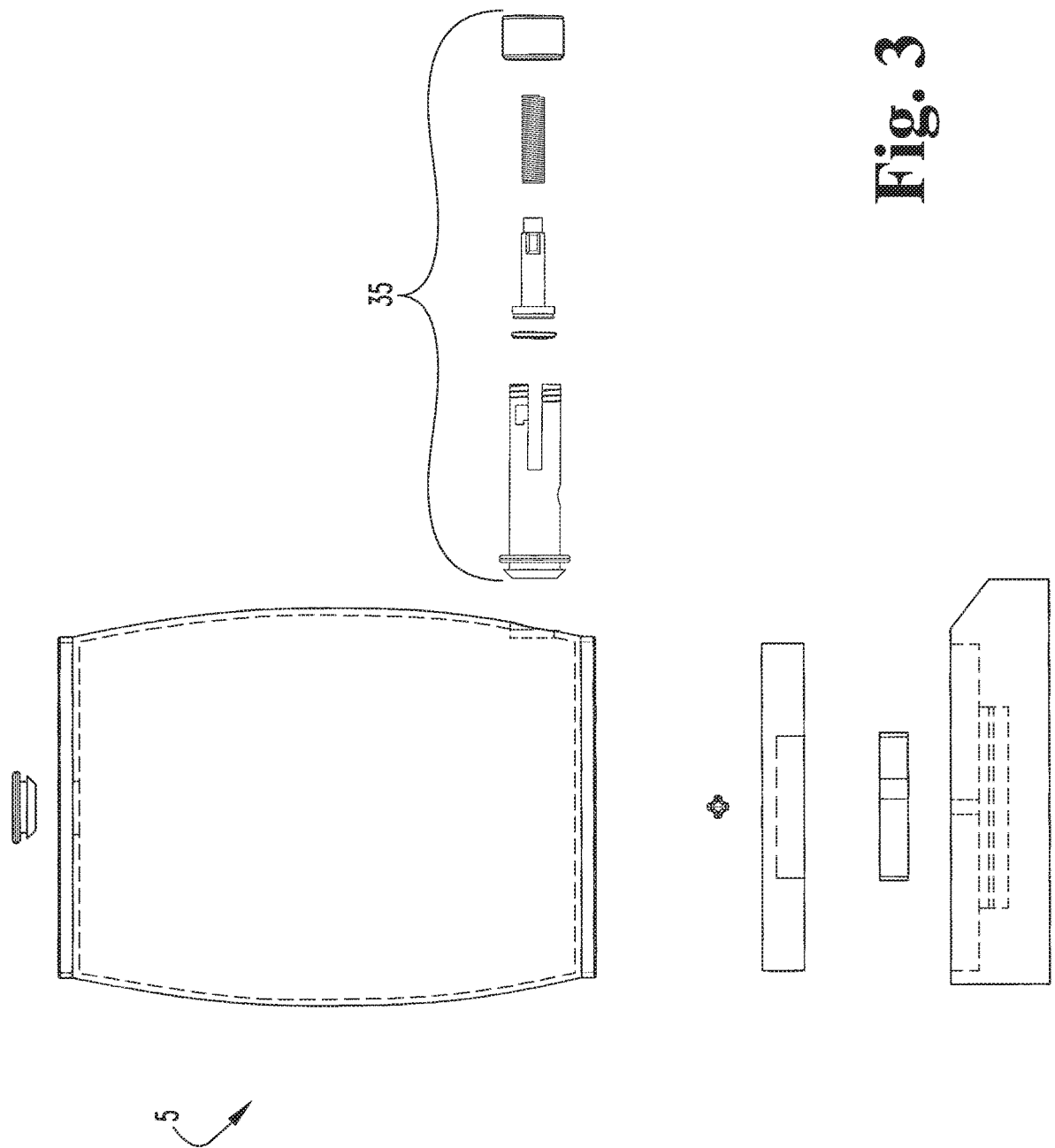
FIG. 3 is an exploded profile illustration of a chocolate dispensing system of the present invention.
Figure 4:
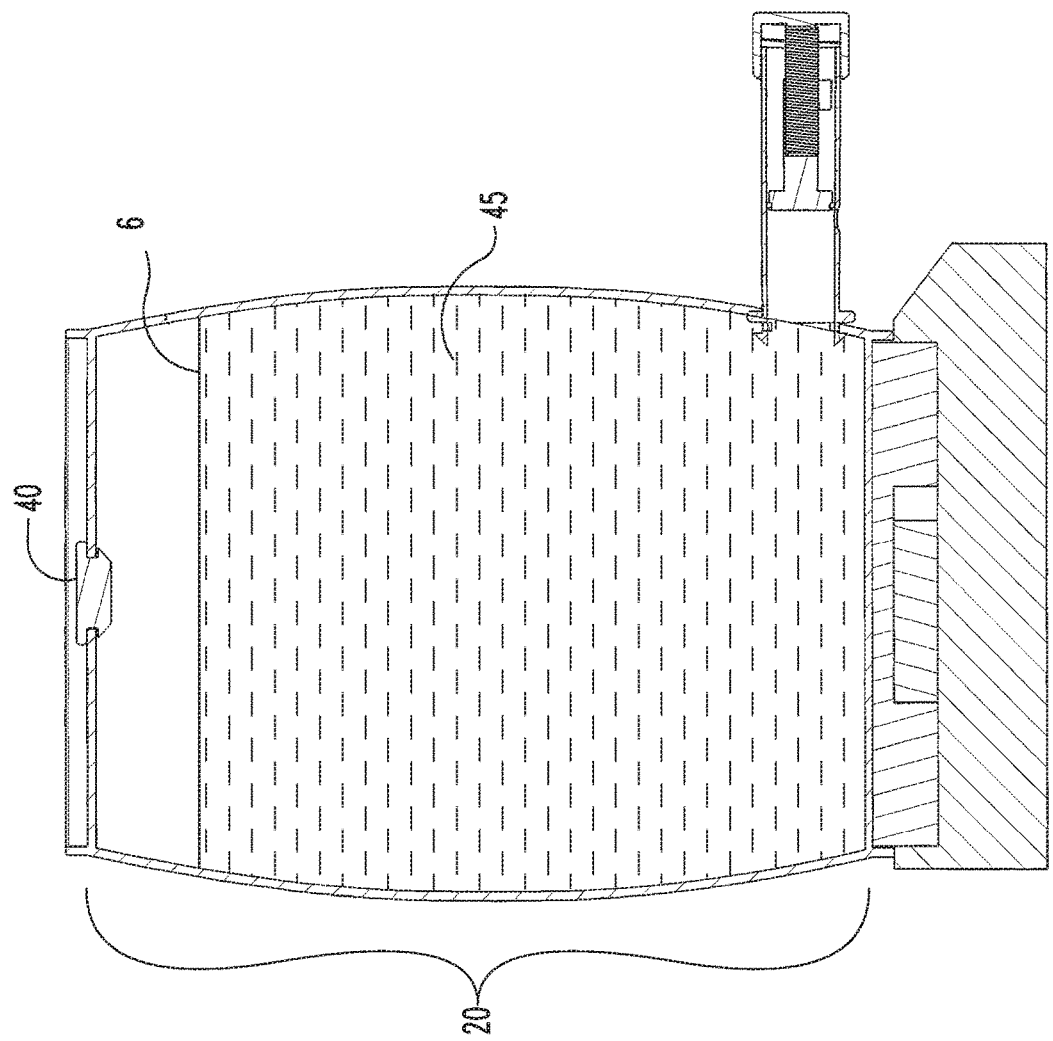
FIG. 4 is a cross-sectional illustration of a chocolate dispensing system according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As shown in FIGS. 1-8, the present novel technology relates to a melt dispensing system 5 having housing 10 that may be operationally connected to a base 15. Referring to FIGS. 1-4, housing 10 typically includes housing shell 30, dispenser 35, volume makeup 40, contents 45, and agitator 50. Housing shell 30 structurally defines volume 20 of housing 10 and operationally isolates housing volume 20 and contents 45, such as solid or melted chocolate, from external environment 25. Contents 45 of the present technology may be a solid, semi-solid, and/or highly viscous food or cosmetic substance at room temperature that may be warmed above room temperature and agitated in order to achieve a homogeneous lower viscosity melted state. Solid typically may be considered to mean when contents 45 retains shape in the absence of outside forces being applied to contents 45. Contents 45 typically may have a nonaqueous matrix and may include chocolate, nut butter, coconut butter, and/or the like. Some implementations may also include lotions and/or other mixtures containing such ingredients. Contents 45 in housing 10 may be released into external environment 25 via dispenser 35.

Dispenser 35 of the present technology is typically operationally connected to housing shell 30 at the boundary between housing volume 20 and external environment 25, such that operation and/or activation of dispenser 35 may enable fluid communication from housing volume 20 to external environment 25. During dispenser operation, melted contents 45 are typically urged from housing shell 30 to external environment 25 via dispenser nozzle 75, which may result in a negative pressure forming within housing volume 20 as measured with respect to external environment 25, which may be neutralized by a volume makeup 40. Volume makeup 40 may be positioned in operational communication with housing volume 20 and may introduce additional fluid, such as ambient air, inert atmosphere, and/or the like into housing volume 20 to at least partially offset any negative pressure generated during dispenser operation.

In one embodiment, volume makeup 40 may be positioned entirely within volume 20 of housing 10 and may address and/or offset a portion of the negative pressure by releasing a compressed fluid, such as nitrogen or carbon dioxide, from a compressed gas cylinder 55 into housing volume 20. In this case, volume makeup 40 is typically positioned toward the bottom of housing shell 30 and more typically includes a fluid filled cylinder 55 operationally connected to a pressure regulator 57 that maintains constant housing volume 20 pressure during operation.

As shown in FIGS. 1-4, another embodiment of volume makeup 40 may be operationally connected to housing shell 30 and positioned at the boundary between housing volume 20 and external environment 25 such that it enables air from external environment 25, or inert gas from compressed cylinder 55, to enter housing volume 20 and neutralize negative pressure generated during dispenser 35 operation. In this embodiment, volume makeup 40 is typically positioned above content fill level 140 near the top of housing 10 to enable operational communication between the air above fill level 140 and external environment 25 or inert gas source 55. Volume makeup 40 may also result in the deformation of the housing shell 30 itself, resulting in a decreased housing volume 20.

Agitators 50 of the present technology may include conventional stirring blades, paddles, whisks, magnetic stir bars, subsonic, sonic, and ultrasonic vibrators, rotators, and the like. Agitator 50 may be a mechanical device positioned within housing shell 30 that may mix melted contents 43 when operationally connected and driven by an agitator driver 105. In one embodiment, agitator 50 may be a magnetic stir bar positioned entirely within housing shell 30. Stir bar 50 may be driven by a moving magnetic field projected from an agitator driver 105 in base 15 resulting in stir bar 50 rotating or vibrating within housing shell 30. In other embodiments, agitator 50 may include a stir blade or paddle positioned mostly within housing volume 20 such that a portion of an agitator 50 crosses housing shell 30 to enable operational communication with agitator driver 105. In some implementations, where housing shell 30 may be flexible, a movable plate and/or object external of container shell 30 may deform container shell 30 resulting in indirect agitation of the contents 45.

Magnetic stir bars 50 typically include a suitable permanent magnetic material, such as alnico, incased in an inert plastic material, such as polytetrafluoroethylene or silicone. Stirring blades 50 typically include stainless steel or plastic blades that rotate about an axis at relatively high velocities to induce a cyclonic movement in contents 45. Stirring paddles and whisks 50 may also rotate about an axis; however, paddles and whisks 50 typically provide agitation by introducing turbulent motion in contents 45 at a much slower speed compared to a stirring blade 50. Respective agitation elements such as stirring blades, paddles, and whisks 50 may be connected to housing shell 30 via an anchor and dynamic seal, and may have a drive mechanism, such as a gear or driveshaft, protrude from housing shell 30 to enable operational communication with a drive mechanism 105, as is known in the art.

Housing shells 30 serve as the boundary between housing interior volume 20 and external environment 25, and may provide mechanical support to housing contents 45, dispenser 35, and/or volume makeup 40. Housing shells 30 may be manufactured from conventional materials such as stamped and welded steel and stainless steel cans, aluminum cans, glass or plastic bottles, flexible plastic and aluminized plastic pouches, and the like. Housing shell 30 may be rigid, as in the case of steel or aluminum, or deformable and flexible, as in the case of plastic pouches. Housing shells 30 may be disposable after a single use, as in the case of a non-refillable keg or flexible plastic pouch, or may be repeatedly refillable for reuse and distribution, as in the case of kegs, barrels, glass bottles, and the like. In some implementations, additional housing shells 30 may be layered over other housing shells 30 aesthetic and/or functional purposes. For example, additional housing shells 30 may bear a logo, advertisement, contact information, contents 45 information, and/or the like. Functional housing shells 30 may provide weatherproofing, insulation, and/or other like functional benefits.

Volume makeup 40 devices are known in the art and may typically include bung pressure release valves, regulated compressed gas cylinders, expandable elastic bladders, and the like. A bung pressure release valve 40 passively regulates the pressure in housing volume 20 to equal that of external environment 25 via a tiny hole or channel 125 that may be operationally engaged after transport and prior to releasing contents 45. Flexible housing shell 30 may collapse housing volume 20 to serve as volume makeup 40 without introducing air into housing 10. Volume makeup 40 may further include an atmospheric separator (not shown), such as an air bladder, or filter, such as a micron or carbon air filter, to limit contents' 45 exposure to harmful materials or contamination.

Unlike traditional liquid dispensers where contents 45 are either a liquid or gas at room temperature, dispenser 35 of the present technology is typically able to repeatedly dispense warm melted contents 45 that may solidify at room temperature, typically without clogging. Traditional liquid nozzles and dispensers have a tendency to clog with solidified melt after only a few uses.

There are several dispenser designs known in the art capable of dispensing a melt without clogging. These may include guillotine valves, plunger valves, and internal ball valves. Guillotine valves are currently used in commercial chocolate and glass dispensing machinery and typically may include a large shearing plate that slides along a relatively large opening to control the flow. White guillotine valves may be effective at dispensing melts, it may be difficult to control the flow rate of the melt when operating a guillotine valve due to their relatively large openings.

Self-cleaning plunger valves may conventionally be used to dispense chocolate melts from heavy chocolate tempering systems. Unfortunately, like guillotine valves, they require force to be exerted against a container during operation, which may result in disconnecting a relatively lightweight container from the base.

Ball valves typically may include a plastic or metal ball that forms a seal around a circular opening. Fluid pressure from a melt helps to maintain the seal of the hall valve around the opening. Ball valves may conventionally be used in confectionary funnels to dispense small amounts of chocolate melts; however, they have a tendency to clog and remain in an open position after long sessions of repeated use. Unfortunately, while guillotine valves, plunger valves, and ball valves may be used as dispensers, all require force to be exerted on the container when operating the dispenser. One aspect of the present novel technology addresses this issue.

Figure 5:
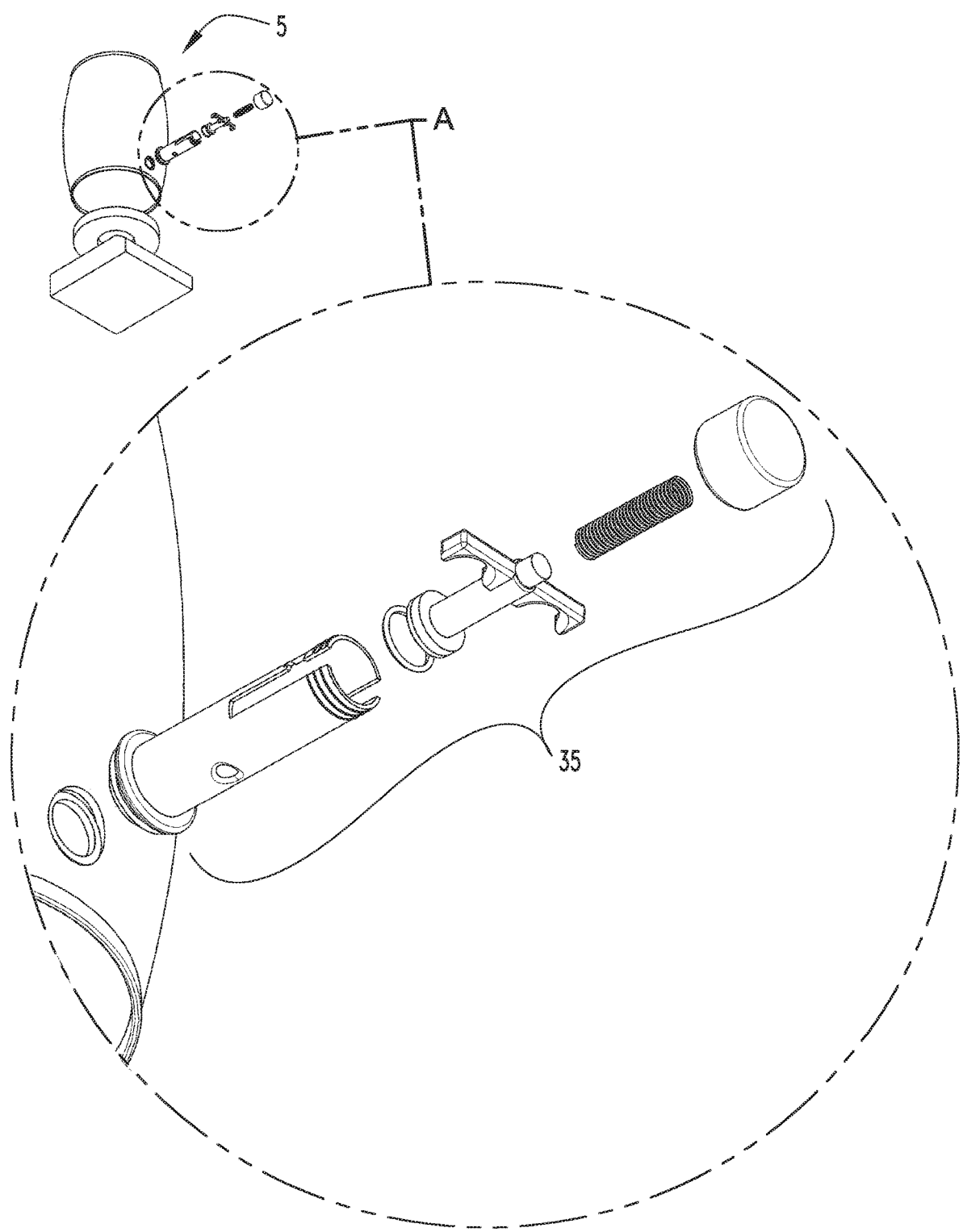
FIG. 5 is an expanded illustration of a semi-automatic plunger valve of the present invention.

As shown in FIGS. 1-6, semi-automatic plunger valve 35 of the present technology typically includes plunger 78 and barrel 65. Plunger 78 further includes piston 80 radially surrounded by seal 85 at the terminal end of plunger 78 that may be operationally connected along a central axis to finger flange 90 at the proximal end, as shown in FIG. 8. Barrel 65 further includes port hole 75, plunger guide 70, and open lock 60 formed therethrough. Open lock 60 typically may maintain system 10 in an open position to allow continuous dispensing of contents 45. During operation, barrel 65 with a central axis may be operationally connected (e.g., via threading, adhesive, pressure contact, and/or the like) to housing shell 30, as shown in FIG. 6. As shown in FIGS. 5-6, seal 85, plunger 78, spring 95 may be positioned along the central axis and retained by barrel cap 100.

In one implementation of the present technology, a dispenser plug (not shown), such as a bung plug or punch-out plate, or a low profile dispenser adapter (not shown) may be used to temporarily seal dispenser port 75 of housing shell 30 during packing and transport prior to use. This would enable housings 10 to be packed at a higher density during storage and transport, and would protect the protruding dispenser 35 from potential damage during packing, transport, and unpacking. Dispenser 35 may be provided with each housing 10, or a reusable dispenser 35 may be fitted and/or used with replaceable housing 10 at the dispensing location.

During operation of a semi-automatic plunger valve 35, opposing force may be applied between barrel cap 100 and finger flanges 37 to urge and/or advance plunger 78 toward barrel cap 100. This may expand the volume of barrel chamber 130, defined by volume created between barrel 65, piston 80, and contents 45, and may enable operational communication between melt 45 and port hole 75. During this time, spring 95 is compressed. Once pressure is released from finger flange 90, plunger 78 advances away from barrel cap 100 along the central axis and returns to its resting position. During this time, plunger 78 may close operational communication between melt 45 and port hole 75, and urging and/or displacing remaining melt 45 in barrel chamber 130 back to housing volume 20. This may result in a dispenser 35 that may repeatedly dispense a portion of melt 45 without applying a net force to housing 10, or clogging due over time, due to solidification of melt 45 in barrel chamber 130. Contents 45 typically may remain isolated from external environment 25 while in the closed configuration, typically maintaining a fluid-tight seal.

As shown in FIGS. 1-4, base 15 typically may include hotplate 110 operationally connected to heating element 115 and heating controller 120. Hotplate 110 may be positioned such that it may also enable operational communication with housing 10. Unlike conventional bases, base 15 of the present technology may directly monitor and regulate the temperature of hotplate 110, rather than inferring or measuring the temperature of contents 45, or regulating a fixed power cycle of heating element 115. This prevents contents 45 from being under-heated resulting in solidification when housing 10 may be full or overheated resulting in burning when housing 10 may be near empty. Heating controller 120 controls the power provided to heating element 115 while it monitors the temperature of hotplate 110. Drive mechanisms for magnetic agitator drivers 105 are known in the art and may be positioned below a non-ferromagnetic hotplate 110 and transfer mechanical force from driver 105 to agitator 50.

Base 15 also typically includes agitator driver 105 that may be operationally connected to agitator 50 and may transfer work from base 15 to agitator 50, resulting in mixing of housing contents 45. During typical operation, housing 10 may be operationally connected to hotplate 110 and agitator driver 105 of base 15. Heat from hotplate 110 may then be transferred to housing shell 30, which may then melt contents 45 at an optimal operating temperature. During this time, agitator 50 may be engaged by agitator driver 105 to mix contents 45, thereby decreasing thermal gradients while increasing homogeneity of container contents 45.

Suitable materials for heating elements 115 are known in the art and typically include resistive or inductive coils powered by an electrical supply. Combustible gas heaters 115 may also be used for portable applications. The power to heating element 115 may be controlled by heating controller 120 positioned in base 15.

Heating controller 120 typically may include a temperature probe, such as a thermoelectric element, in operational communication with hotplate 110 that sends signals to a microprocessor, which translates the signals to a temperature and then adjusts the power to heating element 115 via an electronically controlled power switch, such as a transistor. Heating controller 120 may be calibrated to a preset temperature, or may be adjustable via a digital or analog user interface, as is known in the art. For chocolate, heating controller 120 may be set to 95-110° F., more preferably 100-108° F., and more preferably to 105° F.

Agitator driver 105 typically may include an electromagnetic motor or electromagnetic array that may transfer force from base 15 to agitator 50 to do work. Agitator driver 105 may operationally communicate with agitator 50 via a magnetic and/or mechanical linkage. One benefit of magnetic linkages over mechanical linkages may be that they do not require the use of dynamic seals during operation, which are expensive and have a tendency to leak over time. Instead, force is transferred directly through housing shell 30.

Housing 10 may be used to maintain contents 45 in an isolated, sanitary environment 20 during transport and storage. During transport, dispenser 35 and volume makeup 40 may be sealed with housing seals from operational communication with external environment 25, enabling contents, typically chocolate, to be transported through warm, high-moisture environments up to 120° F. and 100% humidity, which may result in contents 45 melting and resolidifying multiple times without harm to the food product. Once housing 10 arrives at its destination, it may be operationally connected to a base 15, and heat from heat source 110 may be transferred from base 15 to housing 10 to melt contents 45.

While commercial applications typically may include a presealed housing 10, a residential housing 10 may include re-sealable lid to enable the consumer to fill housing 10 with their own combinations of homemade chocolate 45.

Housing 10 typically may be assembled, filled, and used in the following manner. Housing shell 30, volume makeup 40, agitator 50, and dispenser 35 may be sanitized prior to filling housing 10 with contents 45, which may take place prior to or after assembly of the components. Once dispenser 35 and housing shell 30 are assembled, housing 10 may be filled with solid or melted chocolate 45, or other melted contents 45, through hole 135 to desired level 140. A paddle 50 or stirring blade 50 may be added to assembly 5 prior to filling housing 10, while a magnetic stir bar 50 may be at any time prior to sealing housing 10. Aperture 135 may then be closed with volume makeup 40 and/or an impermeable plug (depending on the desired vacuum makeup 40 system) and sealed from external environment 25. A housing seal may be formed by disengaging vacuum makeup 40, sealing vacuum makeup 40 from environment 25, or using other conventional methods. Contents 45 may now be isolated from ambient conditions and may be stored at a wide range of temperatures and relative humidity.

Once housing 10 has been transported to its destination, the housing seal may be disengaged, and housing 10 may be operationally connected to base 15 and agitator driver 105 to melt and agitate contents 45 prior to dispensing. In one embodiment of the present technology, dispenser port 75 in housing shell 30 may be covered with a removable plug or dispenser adapter, enabling housing 10 with a dispenser plug to be safely transported in a higher packing density without the risk of damaging dispenser 35 during transport. The housing plug and/or dispenser adapter may be removed or operationally connected to dispenser 35 to enable dispensing prior to or after contents 45 have been melted. Once contents 45 are melted, dispenser 35 may be activated resulting in chocolate 45 flowing from dispenser port 75 into external environment 25 and a negative pressure generated in housing volume 20. As the negative pressure builds, volume makeup 40 may neutralize and/or regulate the pressure to maintain consistent flow during dispenser 35 operation. Once contents 45 have been removed, housing 10 may be operationally disconnected from base 15 and replaced with a separate filled housing 10. Housing 10 may also be operationally disconnected and reconnected multiple times to enable the dispensing of a variety of contents 45 from base 15.

Figure 10A:
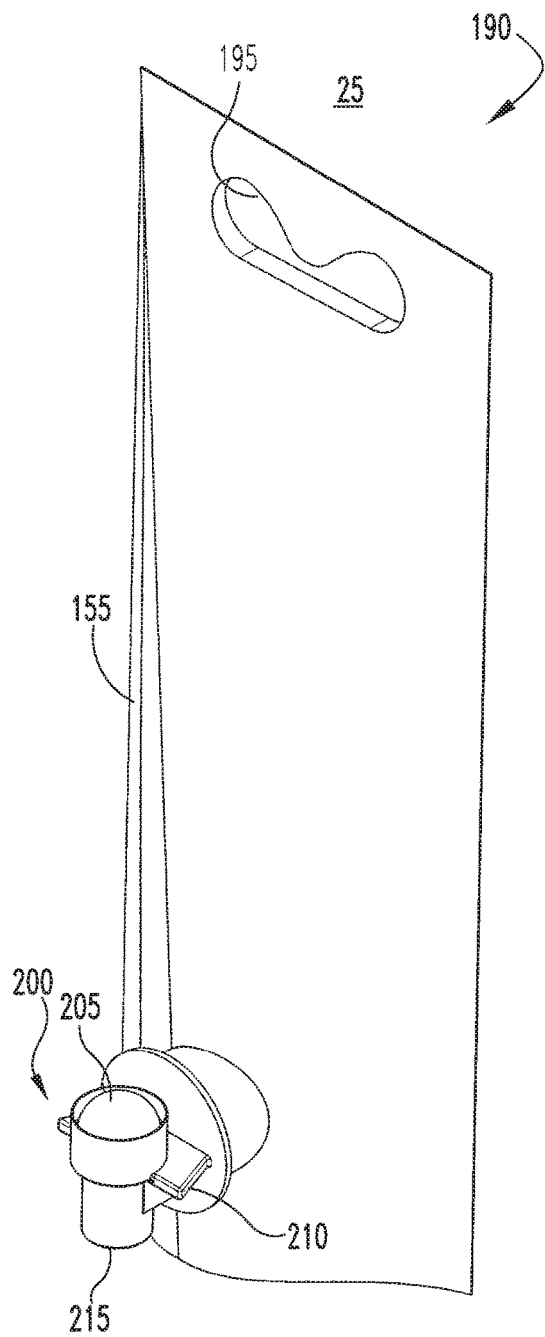
FIG. 10A is a perspective illustration of a second embodiment of a container that may be used with the chocolate dispensing system.
Figure 10B:
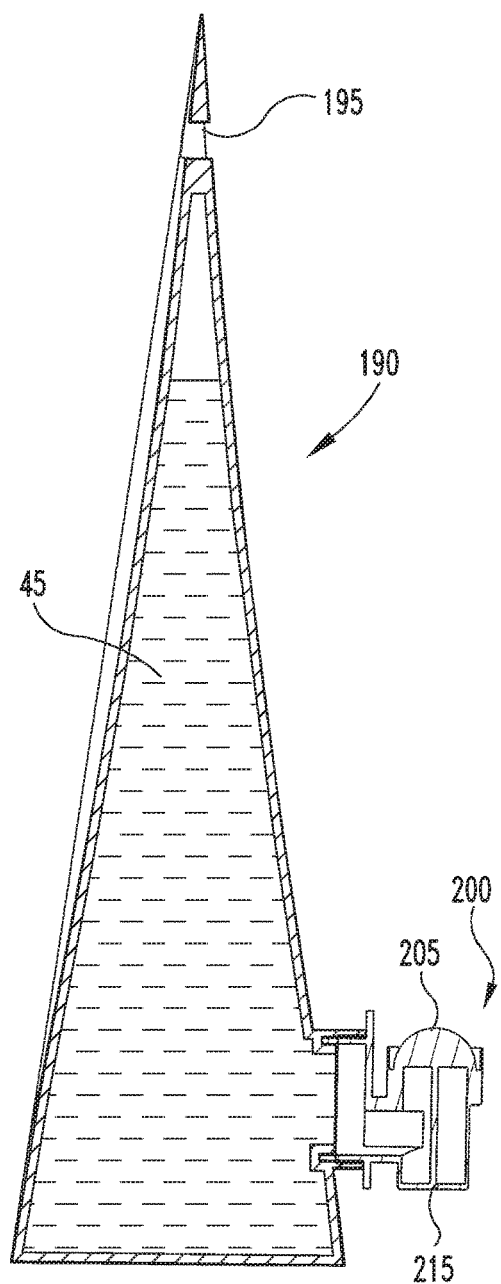
FIG. 10B is a sectional view of the second embodiment of a container that may be used with the chocolate dispensing system.
Figure 11:
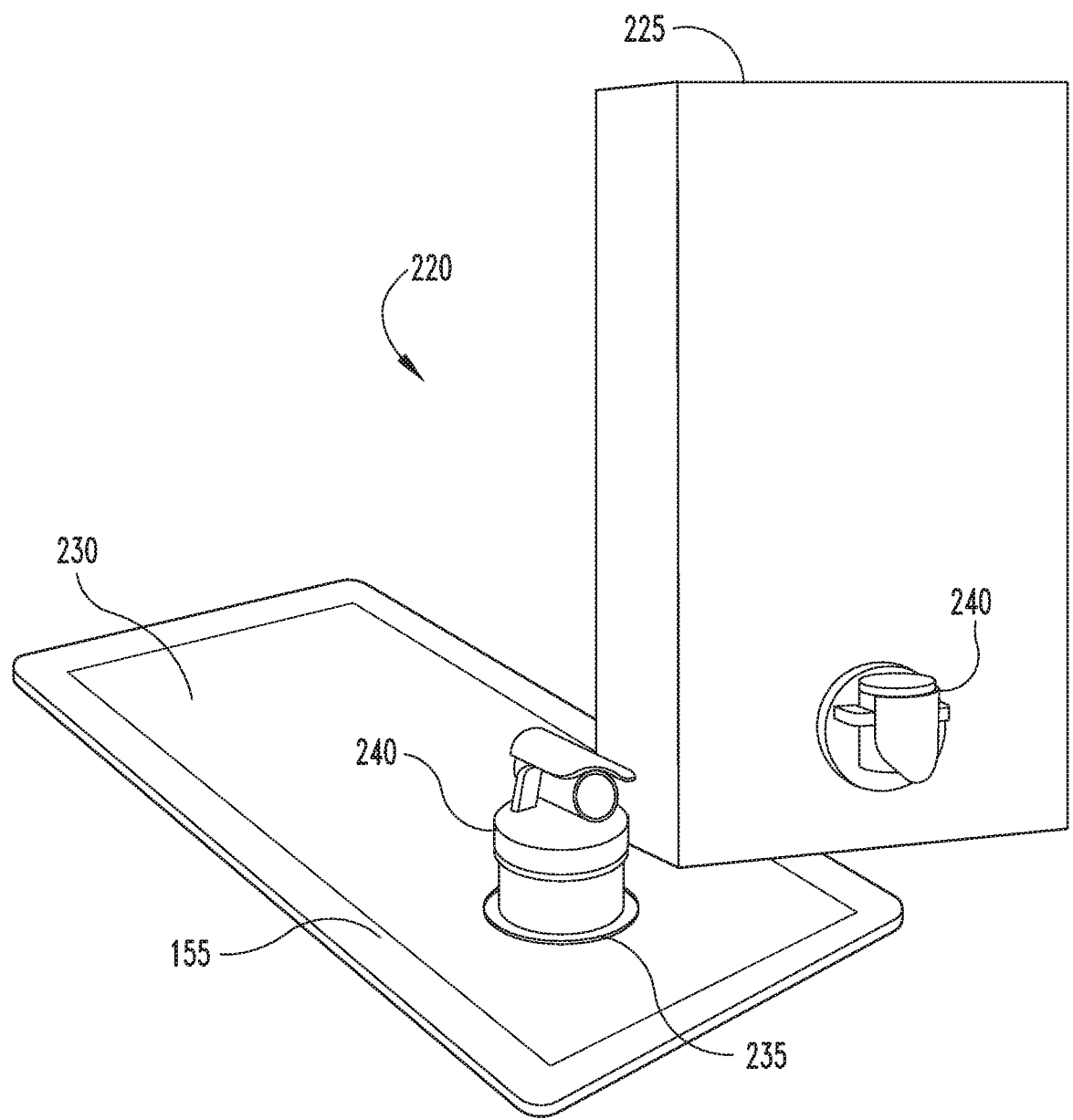
FIG. 11 is a perspective illustration of a third embodiment of a container that may be used with the chocolate dispensing system

Other aspects of the present novel technology are depicted in FIGS. 9-15F. Specifically, FIGS. 9-11 illustrate housing embodiments suitable for containing contents 45 (typically chocolate, but potentially cheese, cosmetic products, and/or any other material benefitting from the present novel technology system). FIGS. 12A-15F illustrate various additional embodiments of the present novel system. These embodiments are described in greater detail below.

Figure 12C:
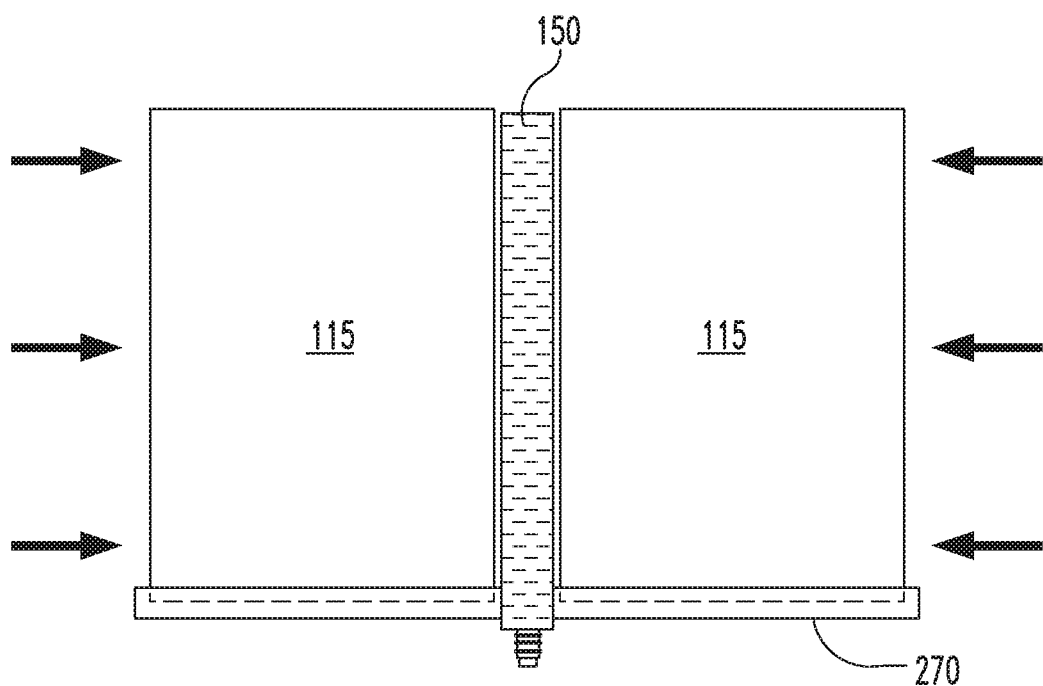
FIG. 12C is a third perspective implementation of the fourth embodiment of the chocolate dispensing system.

With regard to the content containers (e.g., twist-type container 150, press-type container 190, bulk container 220, and/or the like) illustrated in FIGS. 9-11. FIG. 9 depicts a typically small-scale container 150 having a volume of between approximately 187 or 375 milliliters, although the container may be of any volume. A container embodiment may, for example, be used with small dispenser unit 145 (for example, as depicted in FIGS. 12A-12C). FIG. 9A depicts twist-type container 150 typically including container seal 155, twist-type dispenser 160, twist dispenser outlet 165, twist closure 170, and anchor 175 (also referred to as grip or neck). FIG. 9B depicts another implementation of small-scale container 150 as depicted in FIG. 9A, but substituting an anti-drain dispenser 177 for twist-type dispenser 160.

Twist-type container 150 typically may be sealed by container seal 155 to define an interior volume that may contain contents 45 such as chocolate, cheese, cosmetic materials, etc. With contents 45 in a sufficiently moveable state, an individual may apply a torque to twist closure 170 sufficient to allow contents 45 to flow from the interior volume of twist-type container 150, through twist closure 170, and then be expelled through twist dispenser outlet 165. Expulsion of contents 45 through twist dispenser outlet 165 may be through simple gravity action, applying positive pressure toward contents 45 of twist-type container 150 (typically the exterior of twist-type container 150, but direct positive pressure on contents 45 inside twist-type container 150 may be used as well), and/or applying negative pressure on twist-type dispenser 160 and/or twist dispenser outlet 165 to pull contents 45 from twist-type container 150. Grasping and/or immobilizing anchor 175, which may also act as a passage from the interior of twist-type container 150 to twist-type dispenser 160, may allow the user to achieve sufficient torque when components of twist-type container 150 are lacking in sufficient frictional properties (e.g., due to expelled contents 45 and/or liquid from a liquid bath on twist closure 170). Anchor 175 may also act to provide additional structural integrity to twist-type container 150. A user may then close twist-type dispenser 160 torque twist closure 170 in a direction opposite of the opening direction, again using anchor 175 for support if desired.

Container seal 155 may, for example, be achieved through the use of thermal, adhesive, chemical, vacuum, and/or other sealing techniques capable of producing a sufficiently impermeable container. Typically, container seal 155 maintains a fluid-tight seal of twist-type container 150 for the shelf-life duration (or longer) of contents 45 of twist-type container 150. In some implementations, twist-type container 150 and/or container seal 155 may utilize one or more materials in a layered and/or semi-layered configuration to maintain a sufficiently nonpermeable barrier including, but not limited to, plastic films, metal foils, etc. Twist-type dispenser 160, anchor 175, twist closure 170, and/or twist dispenser outlet 165 typically may be constructed of a food-safe plastic, polymer, metal, and/or other suitable material sufficiently resilient of repeated applications of torque strain during the life of the product. They also typically may be constructed to sufficiently withstand (i.e., by maintaining a majority degree of structural integrity) repeated applications of thermal energy from the warming process that twist-type container 150 and its contents 45 may experience. In its closed state (i.e., when twist closure 170 is terminally torqued onto twist-type dispenser 160 such that no contents 45 may be expelled from twist-type dispenser 160), twist closure 170 typically may maintain a fluid-tight seal such that contents 45 of twist-type container 150 remain isolated from an external environment 25. Additional aspects to further seal twist closure 170 may include use of resilient and/or flexible gaskets that may deform and/or seat while torqueing twist closure 170 from a closed position to an open position. Further, twist closure 170 may include self-cleaning mechanisms to expel leftover contents 45 in twist-type dispenser 160, which may aid in maintaining a proper seal and/or easy action of twist closure 170.

Another implementation of twist-type container 150 of FIG. 9A depicted in FIG. 9B typically may substitute an anti-drain dispenser 177 for twist-type dispenser 160. Anti-drain dispenser 177 typically may be constructed of plastic, polymer, and/or any other material that may retain contents 45 within twist-type container 150 using a semi-rigid portal and/or membrane. Anti-drain dispenser 177 may function in a manner similar to squeezable condiment containers with a silicone valve. Contents 45 remain inside twist-type container 150 until sufficient internal pressure is reached, overcoming anti-drain dispenser 177 and dispensing contents 45. Such pressure may be applied, for example, by manual pressure from an individual (e.g., by squeezing twist-type container 150 in a hand), by a preloaded pressure plate (e.g., pressure member 315 (described below), a clamping device, and/or any other mechanism for applying force to the exterior of twist-type container 150. Anti-drain dispenser 177 may also, in some implementations, be used with press-type container 190 (and/or like containers) in place of press-type dispenser 200 and/or press-type dispenser outlet 215 (and/or like components).

Figure 13A:
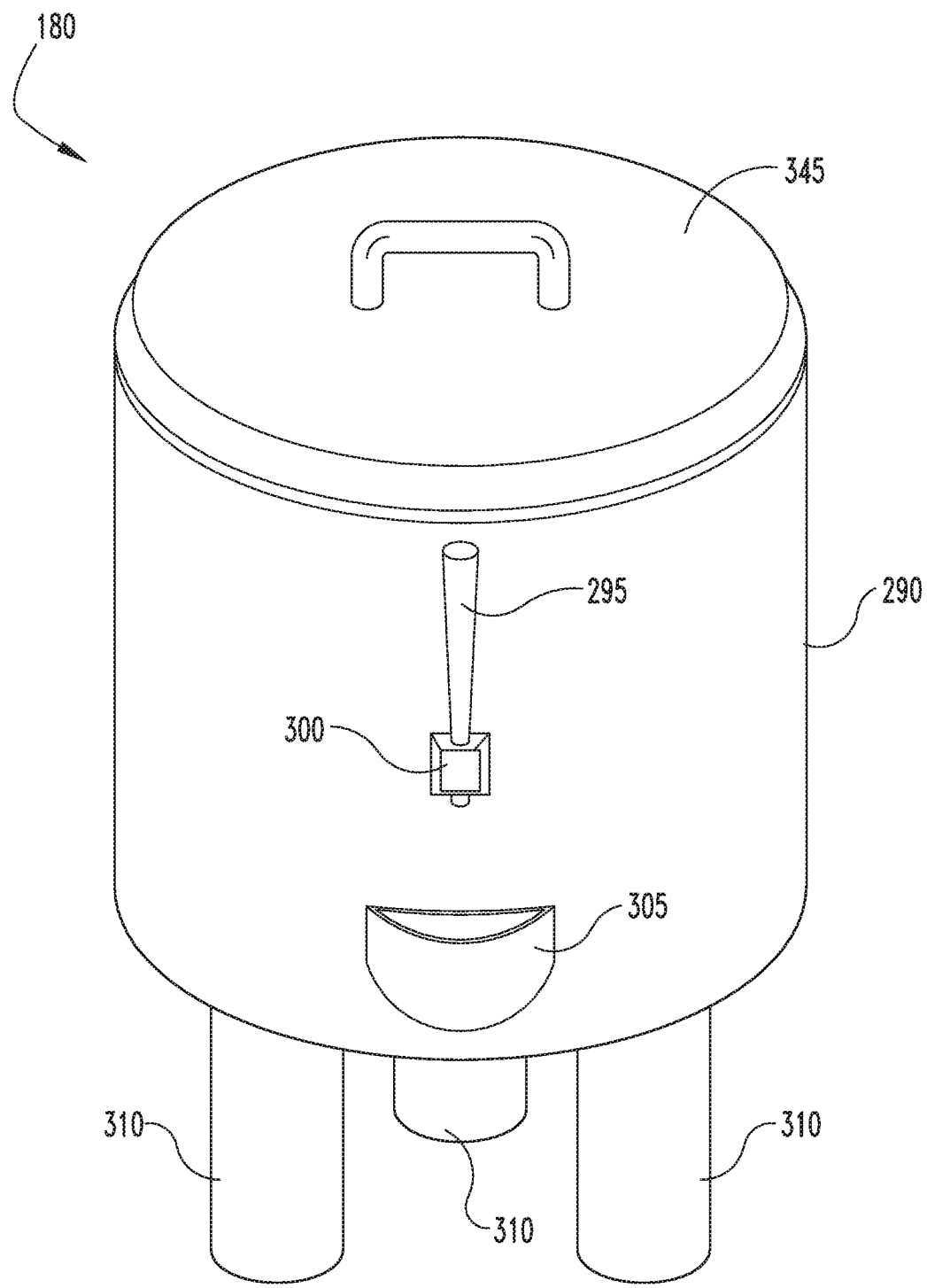
FIG. 13A is a front-perspective illustration of a fifth embodiment of the chocolate dispensing system.
Figure 13B:
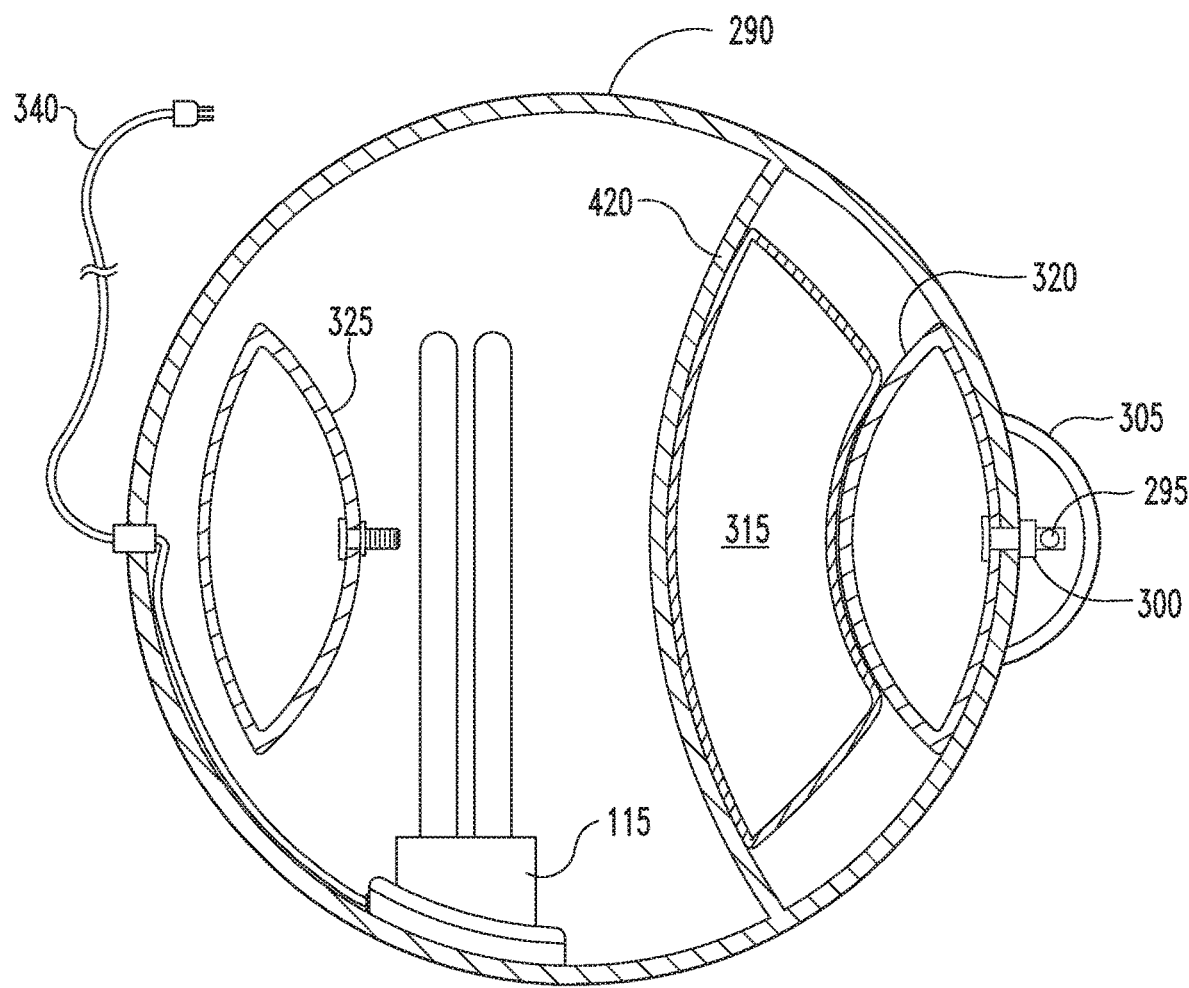
FIG. 13B is a first top-down, cross-sectional illustration of the fifth embodiment of the chocolate dispensing system.
Figure 13C:
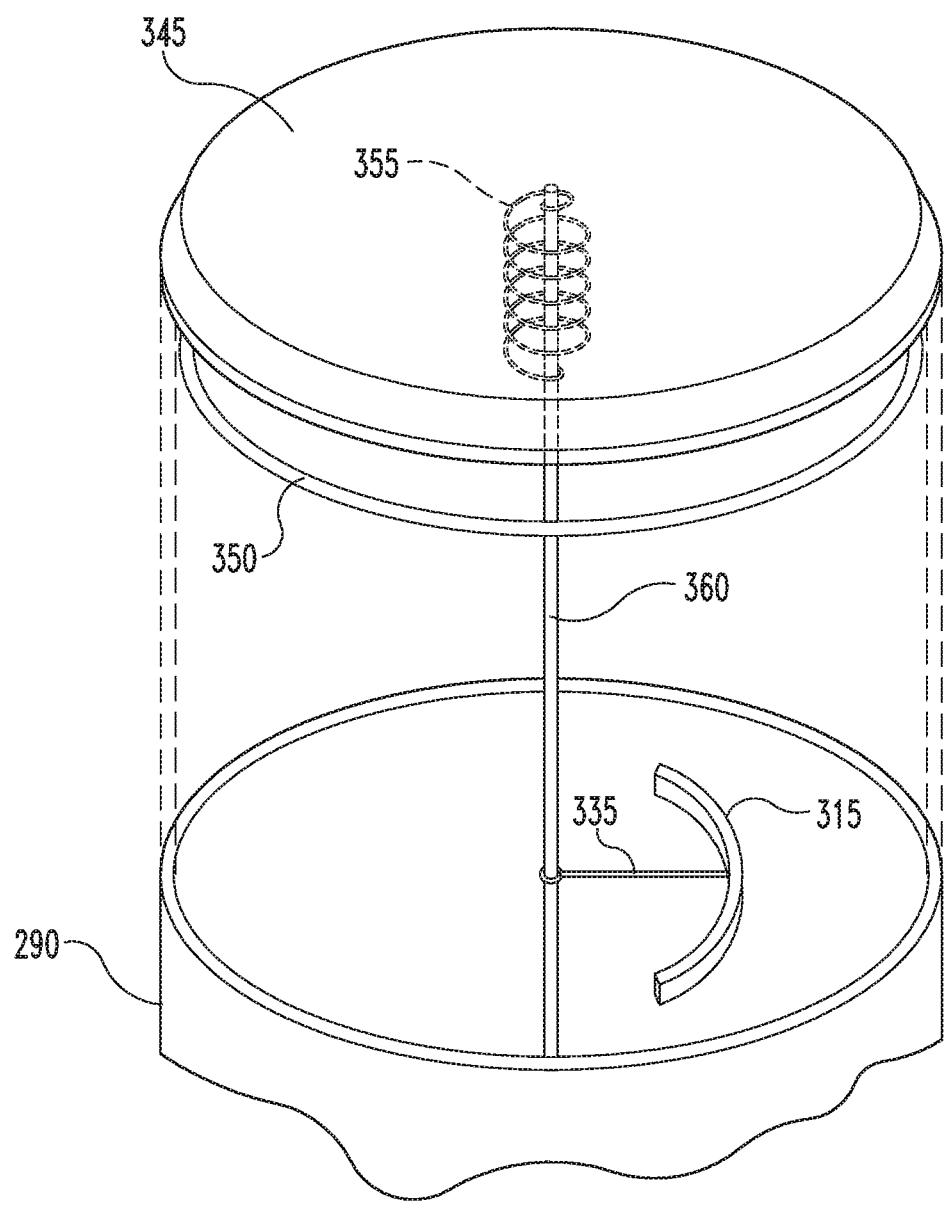
FIG. 13C is an exploded illustration of the fifth embodiment of the chocolate dispensing system having a unitary pressure member.
Figure 14A:
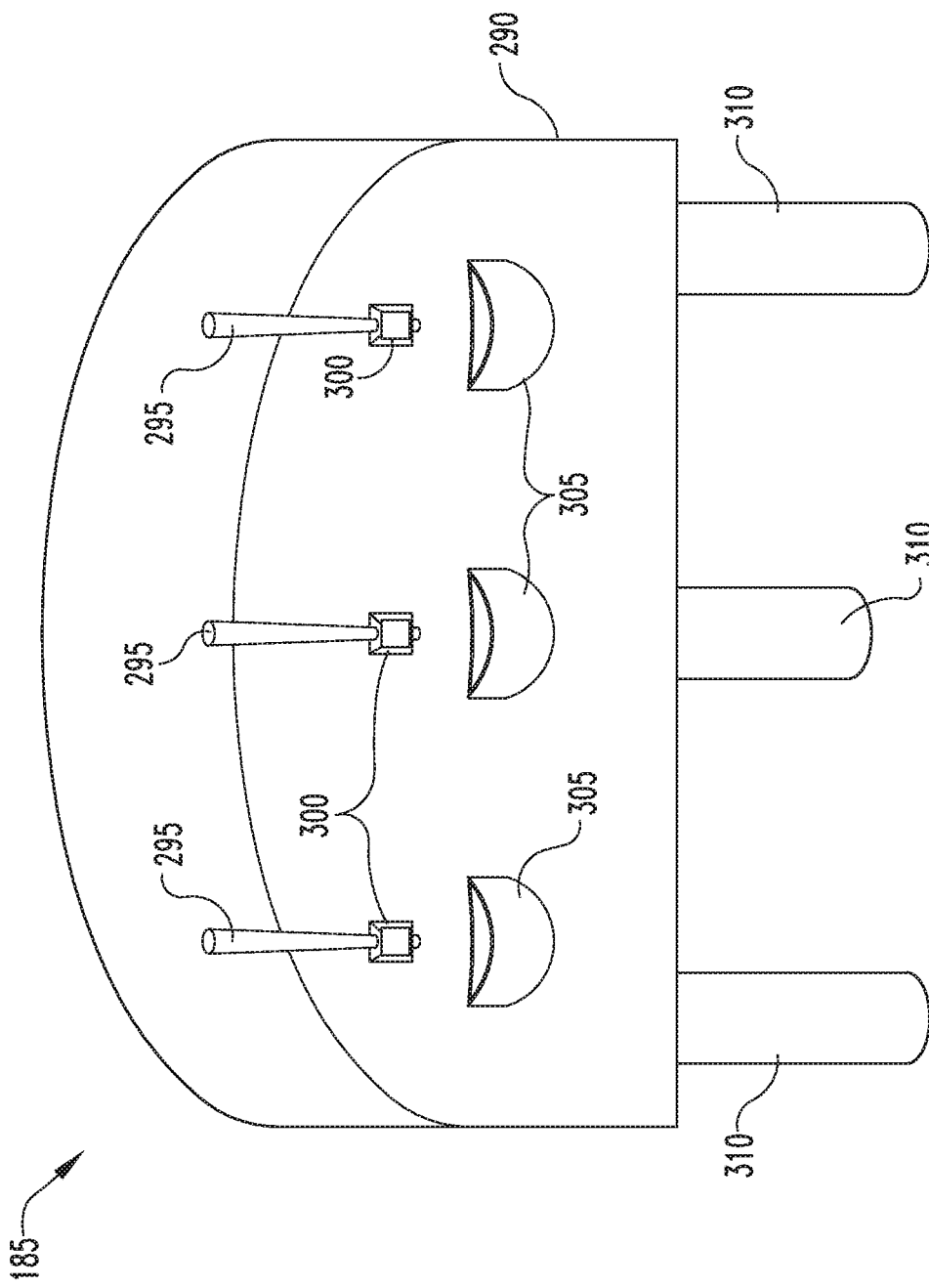
FIG. 14A is a front-perspective illustration of a sixth embodiment of the chocolate dispensing system.
Figure 14C:
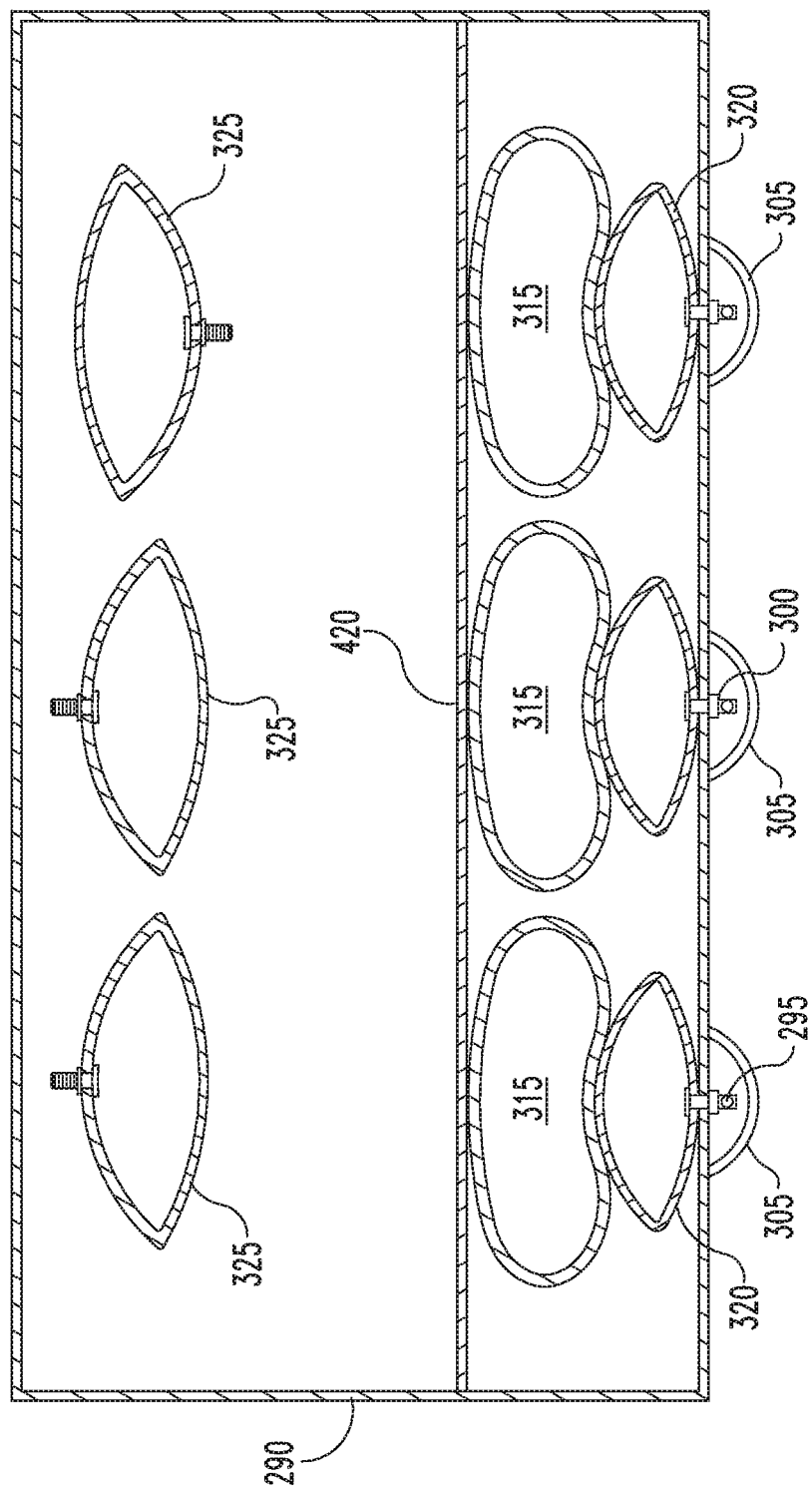
FIG. 14C is a second top-down, cross-sectional illustration of the sixth embodiment of the chocolate dispensing system having multiple pressure members.

Similarly, FIGS. 10A-10B depict a typically medium-scale container 190 typically having a volume of approximately 750 ml, although medium-scale container 190 may be constructed to any size as desired. This container embodiment may, for example, be used in medium dispenser unit 180 (for example, as depicted in FIGS. 13A-13C) and/or large dispenser unit 185 (for example, as depicted in FIGS. 14A-14C). Press-type container 190 typically may include contents 45, container seal 155, container handle 195, press-type dispenser 200, dispenser button 205, dispenser tab 210, and press-type dispenser outlet 215.

As with twist-type container 150, press-type container 190 may typically be sealed by container seal 155 to define an interior volume that may contain contents 45 such as chocolate, cheese, cosmetic materials, etc. Container handle 195 may typically be an aperture formed into press-type container 190, either above and/or through press-type container 190 materials (and bordered by container seal 155) providing a convenient and resilient point to grasp, transport, and/or manipulate press-type container 190. This may, for example, be helpful when inserting and/or removing press-type container 190 with medium dispenser unit 180 and/or large dispenser unit 185. With contents 45 in a sufficiently moveable state, an individual may apply a force sufficient on press-type dispenser 200 to depress dispenser button 205, opening press-type dispenser outlet 215 and allowing contents 45 to flow therethrough. If zero or insufficient force is applied to dispenser button 205, press-type dispenser 200 may not open, may return to a closed state, and/or may maintain a sufficiently a fluid-tight seal such that contents 45 remain sufficiently isolated from external environment 25. Dispenser tab 210 may be used as a counterpoint to hold and/or lever against while depressing dispenser button 205. Dispenser tab 210 may also be used as a physical guide for putting press-type dispenser into proper orientation for use in a tapped position with lever 295 of, for example, medium dispenser unit 180.

Also as with twist-type container 150, container seal 155 on press-type container 190 may, for example, be achieved through the use of thermal, adhesive, chemical, vacuum, and/or other sealing techniques. Typically, container seal 155 maintains a fluid-tight seal of press-type container 190 for the shelf-life duration (or longer) of contents 45 of press-type container 190. In some implementations, press-type container 190 and/or container seal 155 may utilize one or more materials in a layered and/or semi-layered configuration to maintain a sufficiently nonpermeable barrier including, but not limited to, plastic films, metal foils, etc. Press-type dispenser 200, press-type dispenser 200, dispenser button 205, dispenser tab 210, and press-type dispenser outlet 215 (and the like) typically may be constructed of a food-safe plastic, polymer, metal, and/or other suitable material sufficiently resilient of repeated applications of pressing strain during the life of the product. Press-type dispenser 200, press-type dispenser 200, dispenser button 205, dispenser tab 210, and press-type dispenser outlet 215 (and the like) also typically may be constructed to sufficiently withstand (i.e., by maintaining a majority degree of structural integrity) repeated applications of thermal energy from the warming process that press-type container 190 and its contents 45 may experience. Finally, in its closed state, press-type dispenser 200 typically may maintain a fluid-tight seal such that contents 45 of press-type container 190 remain suitably isolated from an external environment 25. Additional aspects to further seal press-type dispenser 200 may include use of resilient and/or flexible gaskets that may deform and/or seat while pressing dispenser button 205 from a closed position to an open position. Further, press-type dispenser 200 and/or press-type dispenser outlet 215 may include self-cleaning mechanisms to expel leftover contents 45 in the press-type dispenser 200, aiding in maintaining a proper seal and/or easy action of press-type dispenser 200.

In perhaps the simplest embodiment of the present novel technology, an individual may take twist-type container 150 and/or press-type container 190 filled with contents 45, place a container (e.g., twist-type container 150, press-type container 190, bulk container 220, and/or the like) in a warm water bath or like heat source of a sufficiently high temperature to melt contents 45 (e.g., 43° Celsius) for a period of time sufficient to melt contents 45, remove the container from the water bath (or like heat source), and then dispense contents 45 from the container by manually applying pressure to the exterior of the container while opening the container's dispenser (e.g., twist-type dispenser 160, press-type dispenser 200, and/or the like). In some other implementations, it may not be necessary to open the container's dispenser. For example, if using anti-drain dispenser 177, molten contents 45 may dispense once the individual has applied sufficient force to the exterior of the container to produce sufficient positive pressure within the container to overcome the resistance of anti-drain dispenser 177. The container typically may maintain contents 45 in a stable, moisture-free environment, even when submerged in water or any other heated fluid (within the temperature range that the containers are specified to be exposed to).

FIG. 11 illustrates a bulk-scale container 220 typically having a volume of approximately three liters or greater, although the container 220 may against be constructed in various sizes. This container embodiment may, for example, be used in a bulk dispenser unit (for example, as depicted in FIGS. 15A-15F). Bulk container 220 typically may include exterior content container 225, interior content container 230, container passthrough 235, and bulk dispenser 240.

Exterior content container 225 may, for example, act as both a shipping and/or carrying container, while interior container may act much in the same way that press-type container 190 may act. Exterior content container 225 may typically be made from cardboard, boxboard, wood, plastic, metal, and/or any other desired material. Container passthrough 235 typically may be a rigid and/or semi-rigid conduit from interior content container 230, through exterior content container 225, and to hulk dispenser 240. A fluid gap typically may be present between interior content container 230 and exterior content container 225 such that a heated air, water, and/or other fluid may circulate. For example, warm air may flow through a port in exterior content container 225, around interior content container 230, and thereby melt the contents 45 of interior content container 230.

Also as with the above-described containers, interior content container 230, exterior content container 225, container pass-through 235, and bulk dispenser 240 may be constructed of food-safe and heat-tolerant material. Contents 45 may typically be maintained for the shelf-life duration (or longer) of the contents 45. In some implementations, interior content container 230 may utilize one or more materials in a layered and/or semi-layered configuration to maintain a sufficiently nonpermeable barrier including, but not limited to, plastic films, metal foils, etc.

Figure 15C:
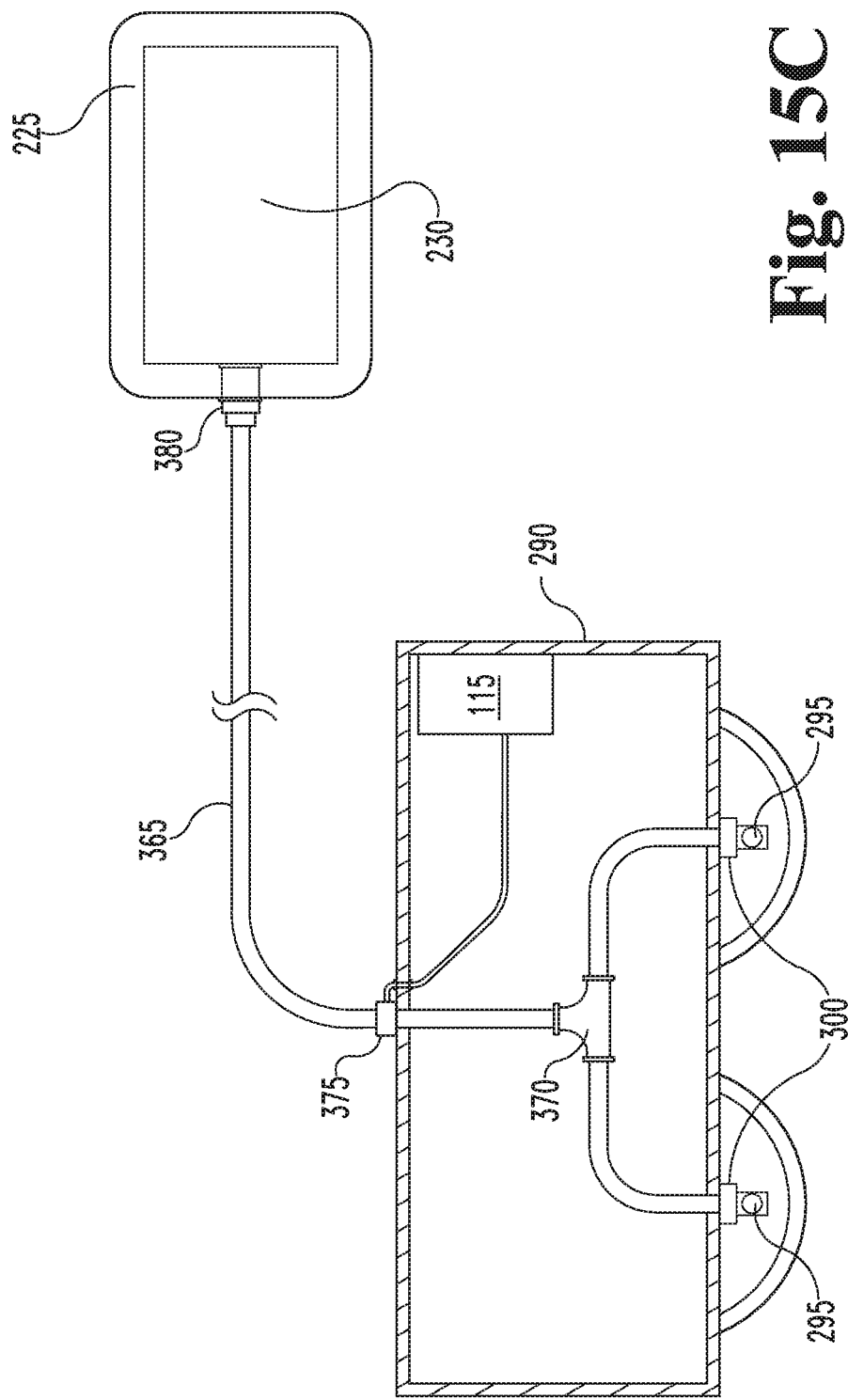
FIG. 15C is a third schematic illustration of the seventh embodiment of the chocolate dispensing system including a remote delivery system having a single source and multiple outlets.

In some implementations, as with bulk dispenser unit 245 depicted in FIGS. 15A-15F, bulk dispenser 240 may be configured to accept a double-wall tube 265 (for example, as depicted in FIG. 15F) that may simultaneously convey melted contents 45 from the bulk container 220 to a dispensing station (e.g., as depicted in FIGS. 15A-15E) and a heated fluid to the bulk container 220 to melt and/or maintain the contents 45 in a sufficiently liquid state. Such implementations will be described in greater detail below.

Small-size containers (e.g., twist-type container 150) typically may allow contents 45 to undergo a limited amount of mixing of contents 45 by capillary effect, but agitation may be necessary and/or desirable to prevent undesirable separation of contents 45. Medium-sized containers (e.g., press-type container 190) typically may allow contents 45 to mix through capillary effect, reducing and/or eliminating need for agitation to prevent undesired separation of contents 45. Larger-sized containers (e.g., housing 10, bulk container 220, etc.) typically may also allow capillary effect mixing, but may also benefit from mixing by agitation.

With regard to the various embodiments of the present novel system illustrated in FIGS. 12A-15F, FIGS. 12A-12C illustrate small dispenser unit 145, FIGS. 13A-13C illustrate medium dispenser unit 180, FIGS. 14A-14C illustrate large dispenser unit 185, and FIGS. 15A-15F illustrate bulk dispenser unit 245 (also known as remote dispenser unit). Each embodiment is discussed in greater detail below.

Small dispenser unit 145, as depicted in FIGS. 12A-12D, typically may include heating element 115, small pressure member(s) 255, pressure member attachment(s) 260, small stand 265, sliding track 270, and/or interface member 275. Typically, a container (e.g., twist-type container 150, press-type container 190, etc.) filled with contents 45 may be attached to hearing element 115, which is in turn heated using power from a power source 340 (e.g., battery, household electrical outlet, etc.). Contents 45 melt over time due to the heat transferred from heating element 115. Small dispenser unit 145 may typically reside several inches above a surface using small stand 265 to allow easier cleaning and placement. In some implementations, small stand 265 may include telescopic components that may allow a user to select a desired height. This may, for example, be beneficial for placing small dispenser unit 145 under a kitchen cabinet.

In some implementations, small pressure member 260 may apply positive pressure to the exterior of the container attached to heating element 115. Small pressure member 255 may, in some implementations, operationally connect to heating element 115 through the use of pressure member attachment(s) 260. For example, pressure member attachment(s) 260 may be, but are not limited to, clips, rivets, hook-and-loop fasteners, screws, etc.

In some other implementations, as depicted in FIG. 12B, small pressure member(s) 255 may themselves may attach the container to heating element 115, rather than using pressure member attachment(s) 260. For example, small pressure member(s) 255 may be, but are not limited to, elastic bands (e.g., rubber bands, silicone bands, etc.), hook-and-loop fasteners, etc. This implementation may allow a home user to easily attach a new container of contents 45 to small dispenser unit 145 simply by looping an elastic band around both the heating element 115 and the container, which may then supply external pressure to the container to help dispense contents 45.

Further, in another implementation depicted in FIG. 12C, small dispenser unit 145 may partially or completely surround the container of contents 45 with heating element(s) 115. Small pressure member 255 may then compress heating element(s) 115 into the container, applying positive pressure to the exterior of the container and helping to dispense contents 45. In some implementations, heating element(s) 115 may be moveably attached to and/or situated on sliding track 270. For example, two heating elements 115 may be oppositely disposed a container of contents 45, and small pressure member 255 may be preloaded to compress the two heating elements 115 together, in turn compressing the container sandwiched therebetween.

Figure 12D:
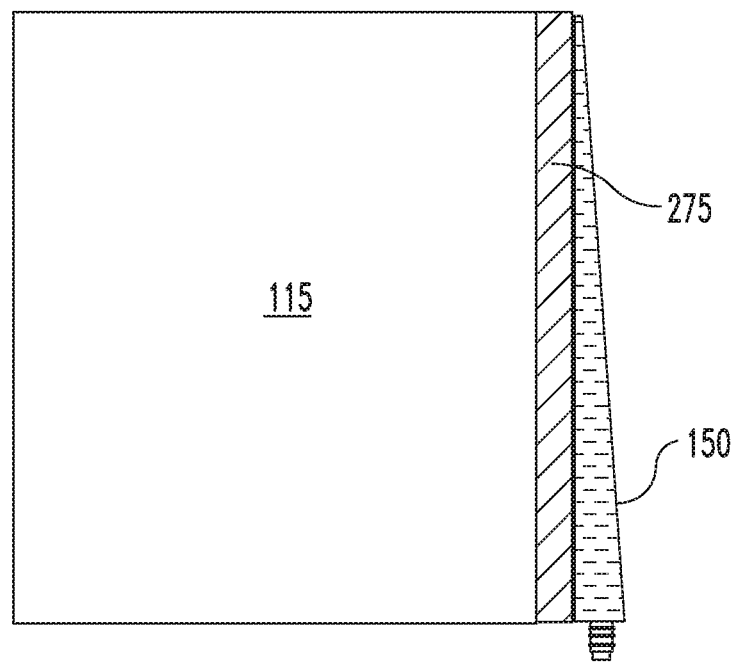
FIG. 12D Is a fourth perspective implementation of the fourth embodiment of the chocolate dispensing system.

In yet another implementation, depicted in FIG. 12D, small dispenser unit 145 may be minimally constructed using heating element 115, the container, and an interface member 275 therebetween. Interface member 275 may typically be a thermally conductive material that also acts to attach the container of contents 45 to heating element 115. This may be, for example but not limited to, a thermally conductive adhesive, gel, and/or other suitable mechanisms. Typically, interface member 275 allows removal of the container from heating element 115 by exerting a separation force between the two (i.e., pulling the container away from the heating element 115). In this implementation, a user may simply apply manual pressure to the exterior of the container (e.g., by pressing on the container with the palm and/or finger(s) of his or her hand) to create fluidic pressure inside the container to dispense contents 45 from the container.

While heating element 115 may typically be a thermally conductive material that warms to a predetermined temperature, solid block heating element 145 may also implement a variable temperature heating design (e.g., based on the parameters of the incoming power source, the resistance of the material, etc.). Further, in other implementations, heating element 115 may be constructed by layering various materials (e.g., copper, nickel, steel, aluminum, oil, etc.) or by having an external shell that is then filled with a thermally conductive fluid. This may, for example, help in retaining heat in the heating element 115 better than would be possible using a singular material.

Further, medium dispenser unit 180, as depicted in FIGS. 13A-13C, typically may include exterior housing 290, lever 295 (also referred to as handle), exterior dispenser 300 (also referred to as exterior tap), tray 305 (also referred to as catch and/or catch tray), stand member 310, pressure member 315, tapped container 320, reserve container 325, heating element 330, power source 340, lid 345, and/or lid seal 350 (also referred to as lid gasket).

Medium dispenser unit 180 may typically be configured with exterior housing 290 (typically configured as a cylinder having an open top end) resting and/or affixed to stand member 310 so as to typically reside several inches above a surface; lid 345 attached to the open top end to create an airtight seal using lid seal 350; and with lever 295, exterior dispenser 300, and tray 305 mounted to the exterior housing 290 wall. Tray 305 may typically be mounted below exterior dispenser 300 to catch any dripping content flowing from exterior dispenser 300.

Tapped container 320 may be placed inside exterior housing 290 and positioned such that tapped container 320 has a dispenser (e.g., press-type dispenser 200) and/or an outlet (e.g., press-type dispenser outlet 215) positioned with exterior dispenser 300. Lever 295 may typically be configured to activate one or more dispenser mechanisms (e.g., dispenser button 205, twist closure 170, etc.) and dispense melted contents 45 from tapped container 320 through exterior dispenser 300. Lid 345 may typically be sized to interface with lid seal 350 and onto exterior housing 290. Pressure member 315, typically a pneumatic vessel such as an air bladder, typically may exert lateral pressure on tapped container 320, providing positive pressure to help expel tapped container 320's contents 45 when lever 295 is actuated, allowing melted contents 45 of tapped container 320 to flow through exterior dispenser 300. Heating element 115 may be exposed and/or hidden within exterior housing 290 and be in electric communication with power source 340 (e.g., a battery, generator, household electrical socket, etc). A fluid (e.g., water, oil, air, etc.) may be circulated around and/or by heating element 115 within the confines of exterior housing 290, providing thermal energy sufficient to melt the contents 45 of the tapped container 320 and/or a reserve container 325. In some implementations, fluid within housing 290 may be still and/or stagnant and still provide sufficient thermal energy to melt contents 45.

In some implementations, reserve container 325 also may reside in external housing 290 and be maintained in a similarly liquid state as tapped container 320. Once tapped container 320 expels most or all of its contents 45, a user may open lid 345, releasing pressure from pressure member 315, and then remove the spent tapped container 320. The user may then move and insert reserve container 325 into the tapping position that tapped container 320 was just in, reattaching lid 345 and applying pressure to the now-tapped container 320. A new reserve container 325 may be placed into the now void area if a user wishes, and a lack of a new reserve container 325 may act as an inventory reminder to purchase new content containers for the dispensing system.

In some implementations, pressure member 315 may be one or more pneumatic bladders, spring-loaded, and/or similar elements. For example, an air, fluid, and/or the like may be pumped into a variably steed containment bladder, which may then exert force upon a container of contents 45 (e.g., the container may be tapped container 320, reserve container 325, twist-type container 150, press-type container 200, interior content container 230, and/or the like). In some other implementations, the bladder-type pressure member 315 may be preferable to a spring-type pressure member 315 as disengaging a spring-type pressure member 315 may potentially expose an inexperienced user to pinched and/or otherwise physically injured body parts. As contents 45 may be dispensed from a dispenser unit (e.g., small dispenser unit 145, medium dispenser unit 180, large dispenser unit 185, bulk dispenser unit 245, and/or the like), the bladder 315 may then increase in volume to continue exerting pressure on the exterior of the container. A pneumatic pump typically may be used to pressurize the bladder, such as a centrifugal-type, diaphragm-type, plunger-type, piston-type, gear-type, roller-type, submersible-type, rotary vane-type, peristaltic-type, impeller-type, metering-type, and/or any other type of pneumatic pump, although a simple diaphragm-type pump (e.g., an aquarium air pump) may be sufficient to pressurize the bladder 315 and exert force sufficient to expel contents 45. Such a diaphragm-type pump may natively (i.e., without metering, controllers, and/or the like) pressurize the bladder 315, for example, to about one PSI, which may then translate to, for example, about fifty or sixty PSI over the bladder's surface area. However, any pump output and/or type may be selected to achieve desired pressure characteristics and output volume.

In some implementations, the bladder pressure member 315 may be pressurized manually (e.g., upon switching on or plugging in a pump, expelling gas into the bladder either directly or indirectly, etc.) and/or automatically (e.g., a pneumatic pump may turn on when output from a dispenser (e.g., small dispenser unit 145, medium dispenser unit 180, large dispenser unit 185, bulk dispenser unit 245, and/or the like) decreases, a pressure pad registers insufficient force, etc.). Further, in some implementations, the bladder-type pressure member 315 may be directly connected to, and/or integrated with, the pneumatic pump. However, in other implementations, the bladder-type pressure member 315 may be indirectly connected by pneumatic tubing, valves, and/or other controlling/metering elements. Further, in some implementations, a pneumatic pump (and/or alternative pneumatic source) may even continue to provide sufficient pressurization when a leak in the pneumatic system exists, with low pneumatic output.

In yet other implementations, bladder-type pressure member 315 with an automatic and/or manual valve may be used to meter pressure for pressurization and/or depressurization. For example, after opening a dispenser unit (e.g., by removing lid 345 from medium dispenser unit 180, large dispenser unit 185, and/or the like) and/or before disconnecting a source of contents 45 (e.g., twist-type container 150, press-type container 200, bulk container 220, and/or the like), the valve may be operated to release and/or maintain fluid within the pneumatic bladder 315. Thus, the pneumatic bladder 315 may be relieved of pressure to allow a user to remove a container from a dispenser 180 and/or reengage a pneumatic source to pressurize the bladder 315. In some implementations, the pneumatic valve(s) may be automated to pressurize and/or depressurize upon certain conditions. For example, upon opening lid 345 or removing power from a dispenser 180 and/or pneumatic pump, the bladder 315 may automatically depressurize (allowing maintenance on the dispenser) and then repressurize when lid 345 is reattached and/or when the pneumatic pump is reconnected to a power source 340. In other examples, a stretch sensor connected to bladder 315 may cause bladder 315 to depressurize when the bladder 315 is beyond a certain size threshold; a pressure sensor located adjacent to a container 190, when sensing insufficient pressure being exerting on the container 190, may depressurize the bladder 315 and/or lower the output of a controllable pneumatic pump; and/or a pressure sensor may send a signal to increase the output of a controllable pneumatic pump.

In some implementations, bladder-type presume member may be replaced with a spring- and/or torsion-type pressure member 315. For example, such implementation may include torsion member 335, lid spring 355, and/or rod 360. Lid 345 may typically be operationally connected to rod 360 and lid spring 355, which may in turn connect to pressure member 315 and torsion member 335. For example, rod 360 may thread into lid 345, lid spring 355 may slip over exterior of rod 360 and exert pressure upward on lid 345 while securing lid 345 to exterior housing 290 via latches, threads, and/or any other attachment mechanism. Torsion member 335 may typically be, for example, a torsion spring, a worm drive compression system, and/or any other mechanism of exerting lateral pressure on pressure member 315 by placing vertical pressure onto rod 360 while securing lid 345. Pressure member 315 may then exert lateral pressure on tapped container 320, providing positive pressure to help expel tapped container 320's contents 45 when lever 295 is actuated, allowing melted contents 45 of tapped container 320 to flow through exterior dispenser 300.

Further, in some implementations, an agitator 50 (described above) may be used to stir contents 45 of tapped container 320 and/or reserve container 325. This may, for example, be accomplished by a content producer depositing a magnetic stirrer bar agitator 50 into a container before sealing the container. An agitator driver 105 may then be situated below where tapped container 320 and/or reserve container 325 reside in medium dispenser unit 180, allowing magnetic stirrer agitator 50 to help keep consistency of contents 45. In other implementations, a recirculating pump, a peristaltic pump, and/or any other mechanism for stirring and maintaining sufficiently uniform content distribution may be used. Based on each of these alternatives, the respective container (e.g., tapped container 320, reserve container 325, bulk container 220, etc.) may include additional tube connections (not shown) for facilitating these mixing mechanisms. However, for some contents 45, agitators 50 may be unnecessary to maintaining proper ingredient distributions within their respective containers.

Additionally, large dispenser unit 185, depicted in FIGS. 14A-14C, typically may include exterior housing 290, lever 295 (also referred to as handle), stand member 310, exterior dispenser 300 (also referred to as exterior tap), tray 305 (also referred to as catch and/or catch tray), stand member 310, pressure member 315, one or more tapped containers 320, one or more reserve containers 325, heating element 330, torsion member 335, power source 340, lid spring 355 (not shown), lid 345 (not shown), lid seal 350 (also referred to as lid gasket) (not shown), and/or rod 360. Typically, large dispenser unit 185 may function as described above with medium dispenser unit 180. Large dispenser unit 185 may therefore act to provide functionality of multiple medium dispenser units 180 in a single unit. For example, FIGS. 14A-14C depict large dispenser unit 185 having three discrete exterior dispensers 300, tapped containers 320, and reserve containers 325. However, providing each tapped container 320 with sufficient pressure from pressure member 315 may prove difficult when faced with a plurality of tapped containers 320

In some implementations, a single pressure member 315 may be connected to a single torsion member 335 and rod 360. This single pressure member 315 may be made of a flexible and/or semi-flexible material to provide greater contouring capabilities and surround the tapped containers 320. In other implementations, the single pressure member may be connected to multiple torsion members 335 and rods 360 to provide more distributed points of lateral pressure (and/or greater overall pressure exertion). In yet another implementation, multiple discrete pressure members 315 may be individually connected to torsion members 335 and rods 360 such that each pressure member 315 may individually respond to the pressure demands of each individual tapped container 320. This may, for example, allow better pressure control on each tapped container 320 and therefore better dispensing characteristics (e.g., flow rate, etc.) as compared to a single, long pressure member 315 design. However, where each tapped container 320 dispenses at approximately the same rate, a unitary pressure member 315 design may reduce necessary components.

Bulk dispenser unit 245, depicted in FIGS. 15A-15F, typically may include exterior housing 290, exterior dispenser 300 (also referred to as exterior tap), tray 305 (also referred to as catch and/or catch tray), dispenser passthrough 370, stand member 310, heating element 115, power source 340, dispenser connection member 375, double-walled tube 365, exterior content container 225, interior content container 230, contents 45, and/or source connection member 380. In some implementations, the bulk dispenser unit 245 may be wall- or structure-mounted to a surface 385.

Bulk dispenser unit 245 may typically be used in a manner similar to a commercial soda fountain by delivering remote contents 45 to a tap. However, while soda syrup is typically able to flow through tubing at room temperature, chocolate (and other previously described alternatives) remain solid at room temperature and impracticable to flow to bulk dispenser unit 245 in such a state. Bulk dispenser unit 245 and/or a remote heating element 390 may provide a heated fluid (e.g., air, water, oil, etc.) through one section of a double-wall tube 365 into source connection member 380 while melted contents 45 from a remote container (e.g., bulk container 220) may flow back to bulk dispenser unit 245, entering exterior housing 290 through dispenser connection member 375, flowing through dispenser passthrough 370, and then flowing out of exterior dispenser 300. As described above, the heated fluid flows into bulk container 220 and around interior content container 230 while typically remaining within exterior housing 290. In some implementations, exterior housing 290 typically may be fluid-tight, maintaining a positive pressure within bulk container 220 to help expel melted contents 45 through the double-wall tube 365 to the bulk dispenser unit 245. This fluid volume and pressure ultimately acts as a volume makeup as well as the contents 45 are expelled and consumed. Once the contents 45 of the remote container are exhausted, a user may change out the old remote container with a new remote container. In some implementations, the double-wall tube 365, source connection member 380, and/or dispenser connection member 375 may include automatic closures to prevent contamination of the contents 45 and/or double-wall tube 365. Double-wall tube 365 may also include a cutoff valve to prevent sudden loss of restriction that may occur for heating element 115 when double-wall tube 365 is removed from bulk container 220.

Additionally, in some implementations (e.g., as depicted in FIG. 15B), exterior dispenser 300, tray 305, and dispenser connection member 375 may be mounted to a surface 385 instead of using exterior housing 290. In this configuration, an establishment may provide multiple taps without consuming too much space. This may, for example, be beneficial in a small pub, a busy café, or where a content manufacturer wants to provide a "tasting" wall of sorts for customers to sample products.

Figure 15D:
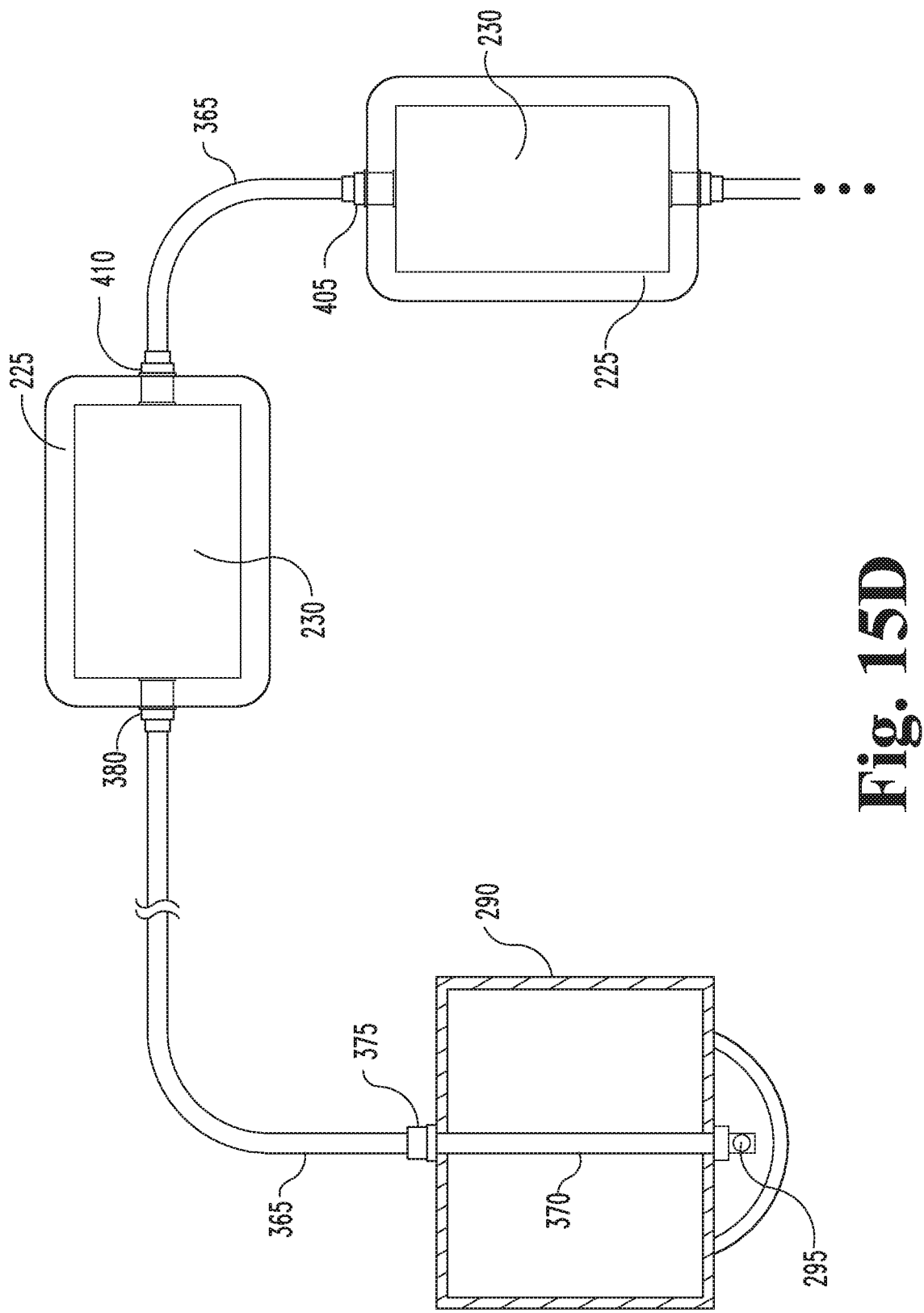
FIG. 15D is a fourth schematic illustration of the seventh embodiment of the chocolate dispensing system including a remote delivery system in a daisy chain configuration.

Further, as depicted in FIGS. 15C-15D, some implementations may utilize many-to-one and/or one-to-many topologies. For example, instead of connecting one exterior dispenser 300 to one bulk container 220, as shown in FIG. 15A, multiple taps may be connected to a single bulk container 220, as shown in FIG. 15C. Additionally, bulk containers 220 may be connected in a "daisy-chain" scheme, as depicted in FIG. 15D. In a "daisy-chain" configuration, bulk container 220 may include one or more input ducts 405 and/or output ducts 410 that may allow heated fluid to pass though each exterior content container 225 and around each interior content container 230 to melt contents 45 in each respective bulk container 220. In some implementations, contents 45 may also flow through input ducts 405 and/or output ducts 410, but typically only heated fluid to melt and/or maintain viscosity of the contents is interchanged. In some additional implementations, heated fluid may be vented out the terminal hulk container 220 of the daisy-chain. Further, some implementations may include gang valves, secondary transfer tubes, and/or other mechanisms for combining dispensers 300 and containers of contents 45 to dispense in non-one-to-one configurations. These configurations may allow establishments to reduce system downtime, decrease maintenance, increase content variety to exterior dispensers 300, etc.

Figure 15E:
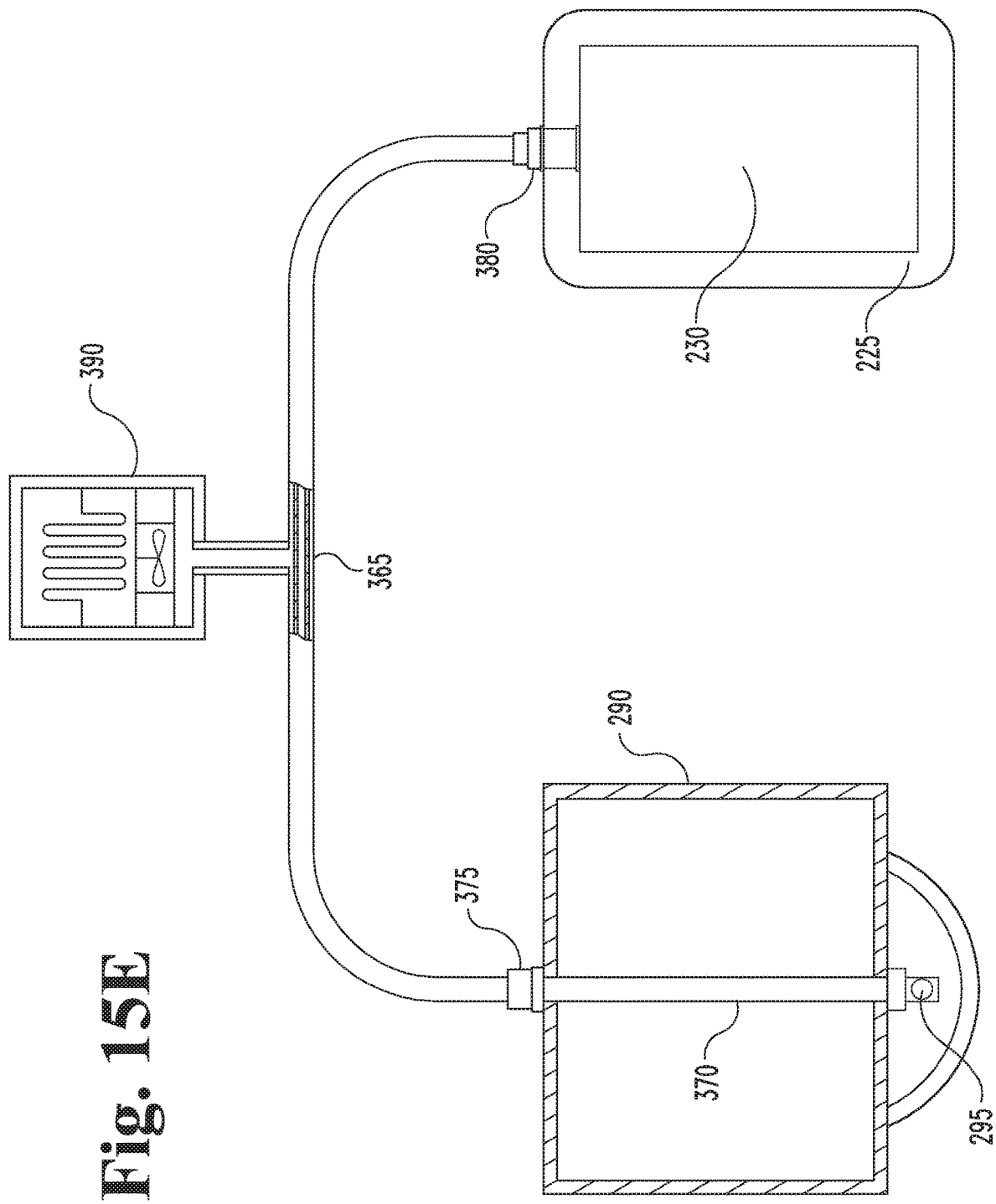
FIG. 15E is a fifth schematic illustration of the seventh embodiment of the chocolate dispensing system including remote heating and delivery systems.

Additionally, In yet another implementation depicted in FIG. 15E, double-wall tube 365 may be connected to remote heating element 390 to provide the warmed fluid to the system. This configuration may, for example, be beneficial to reduce noise in the bulk dispenser unit 245, which would otherwise be providing the warmed fluid to the system and sending this through the double-wall tube 365. Remote heating element 390 may tap into double-wall tube 365 (e.g., only to the exterior portion 400 of double-wall tube 365) and supply warm air, water, oil, etc. to melt contents 45. In some implementations, remote heating element 390 may additionally include recirculating features to better maintain fluid flow and/or temperature. For example, in one implementation, remote heating element 390 may connect an inlet on remote heating element 390 with the dispenser side of the system, while connecting an outlet on remote heating element 390 with the bulk container 220 side of the system.

FIG. 15F depicts a typical flow pattern through double wall tube 365. Heated fluid from a bulk dispenser unit 245 or remote heating element 390 flows through the exterior portion 400 of the double-wall tube 365, and molten content from bulk container 220 flows through the interior portion 395 of double-wall tube 365 toward exterior dispenser 300 (and, typically, customers). While the heated fluid may alternatively flow through interior portion 395 while molten contents 45 flow through exterior portion 400 it is beneficial to have the molten contents 45 surrounded by the warm fluid to maintain a molten state regardless of surrounding environmental conditions without further insulating the double-wall tube 365. Some implementations may include triple-wall, quadruple-wall, or greater walled varieties in order to carry multiple contents and/or heated fluid streams without additional runs of tubing. Further, in some other implementations, tubing may be sectionally divided portions instead of radially divided, circular portions. For example, a cross-section of tubing may carry contents 45 through two channels (where a circular tube is divided once through its diameter), four channels (where a circular tube is divided twice perpendicularly through its diameter), etc.

Figure 15G:
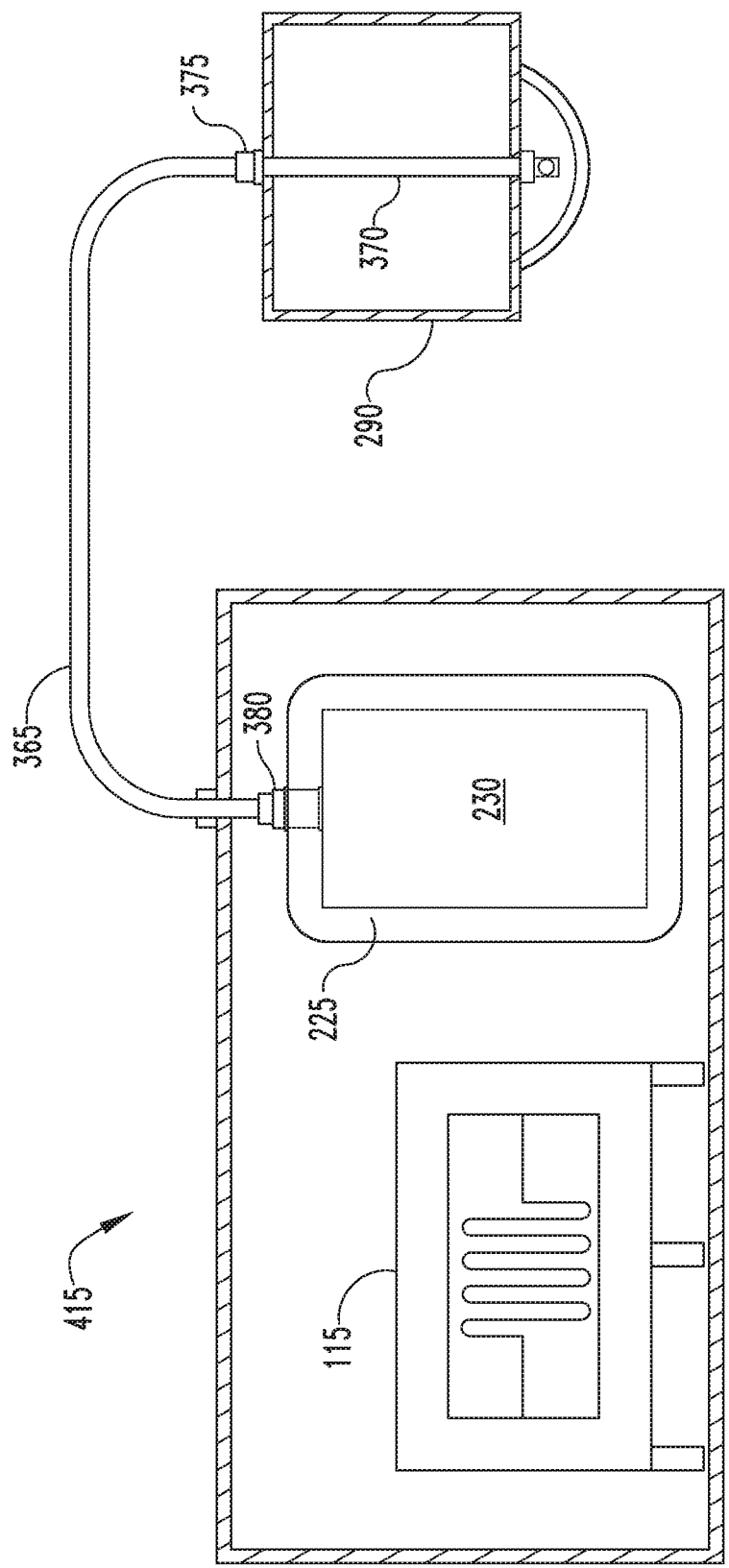
FIG. 15G is a sixth perspective illustration of the seventh embodiment of the chocolate dispensing system including a proofing enclosure.

FIG. 15G depicts an implementation of remote heating element 390 and bulk container 220 located in a proofing enclosure 415, which may allow contents 45 of bulk container 220 to melt. Bulk container 220 may then be in fluidic communication with exterior dispenser 300 directly and/or indirectly (e.g., through dispenser passthrough 370, dispenser connection member 375, source connection member 380, etc.). The connection may be accomplished through double-wall tube 365, which in other implementations the connection may be through a single-wall tube. In other implementations, excess heat from remote heating element 390 may be vented from proofing enclosure 415. This may be helpful, for example, to prevent overheating contents 45 and/or causing damage to proofing enclosure 415, remote heating element 390, and/or bulk container 220. Some other implementations may utilize a thermal probe and/or switch to detect the temperature of proofing enclosure 415, bulk container 220, remote heating element 390, and/or contents 45 (e.g., in proofing enclosure 415, tube 365, at exterior dispenser 300, etc.), activating and deactivating remote heating element 390 to maintain proper temperature of contents 45, ensure safety of equipment, and save resources (e.g., electricity, money, etc.) during off- or closed-periods.

In some implementations, a container (e.g., twist-type container 150, press-type container 200, bulk container 220, and/or the like) may additionally and/or alternatively be warmed by heating the dispenser unit (e.g., small dispenser unit 145, medium dispenser unit 180, large dispenser unit 185, bulk dispenser unit 245, and/or the like) itself. For example, a dispenser unit may be located inside of on top of, and/or otherwise adjacent (and in thermal communication with) a heating source. In one such aspect, a dispenser unit may be placed in a heated proofing enclosure 415 (as described above). In another aspect, a dispenser unit may be placed on top of a heated floor structure (e.g., a thermal mat, radiant-heated flooring, etc.) and the heat may transfer into the dispenser.

In yet another implementation, a container (e.g., twist-type container 150, press-type container 200, hulk container 220, and/or the like) may be warmed by heating a component (e.g., housing shell 30, hotplate 110, exterior housing 290, stand member 310, pressure member 315, rod 360, and/or the like) of the dispenser unit (e.g., small dispenser unit 145, medium dispenser unit 180, large dispenser unit 185, bulk dispenser unit 245, and/or the like) itself. For example, housing shell 30, exterior housing 290, and/or the like may be constructed with integral (partially or completely) heating elements (e.g., heating element 115 and/or the like), double-wall construction, a water jacket, and/or the like. For example, the entire shell 30 (or the like) of a dispenser may be in thermal communication with a heat source, which provides heat then to both the shell 30 and contents 45 within the shell 30. In some implementations, elements of a container may be constructed using high thermal, density materials such as, but not limited to, copper, brass, aluminum, iron (e.g., cast iron), nickel, steel, and the like. These materials may, in some implementations, be layered and/or intermixed to provide desired thermal, aesthetic, mass, and other characteristics. In some further implementations, heated container component heating techniques may additionally be used in conjunction with indirect and/or direct area (e.g., proofing enclosure 415, heating mat, etc.) and/or contents 45 heating.

Figure 16:
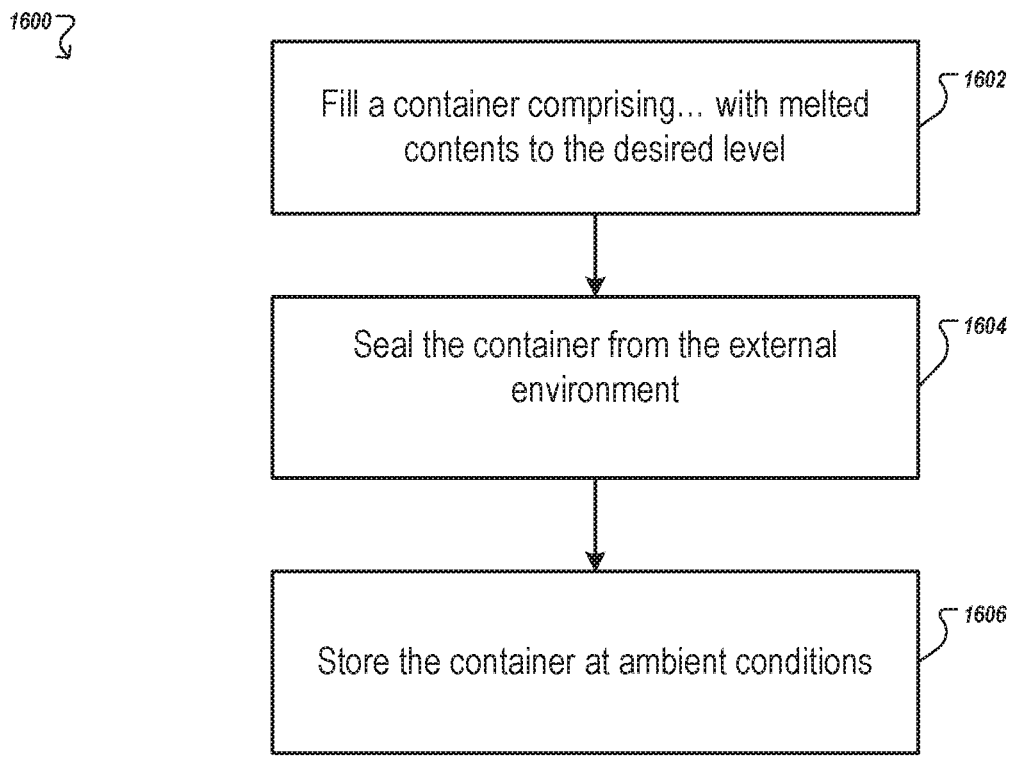
FIG. 16 is method of storing chocolate according to one embodiment of the present invention.
Figure 17:
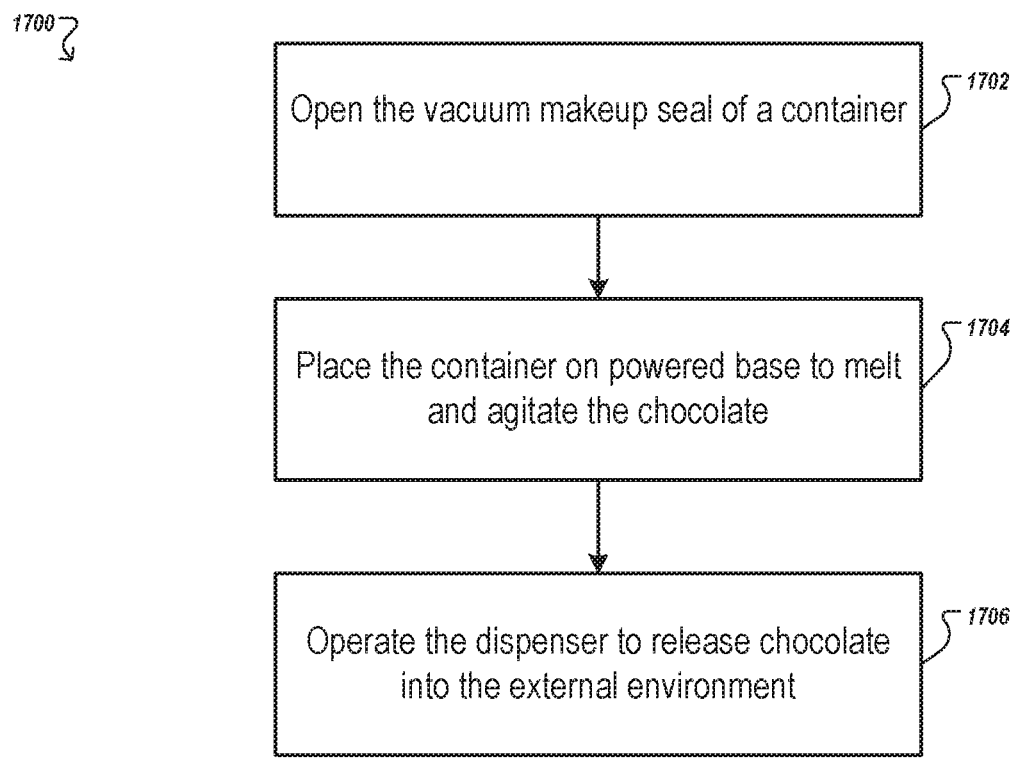
FIG. 17 is a method of dispensing chocolate according to one embodiment of the present invention.
Figure 18:
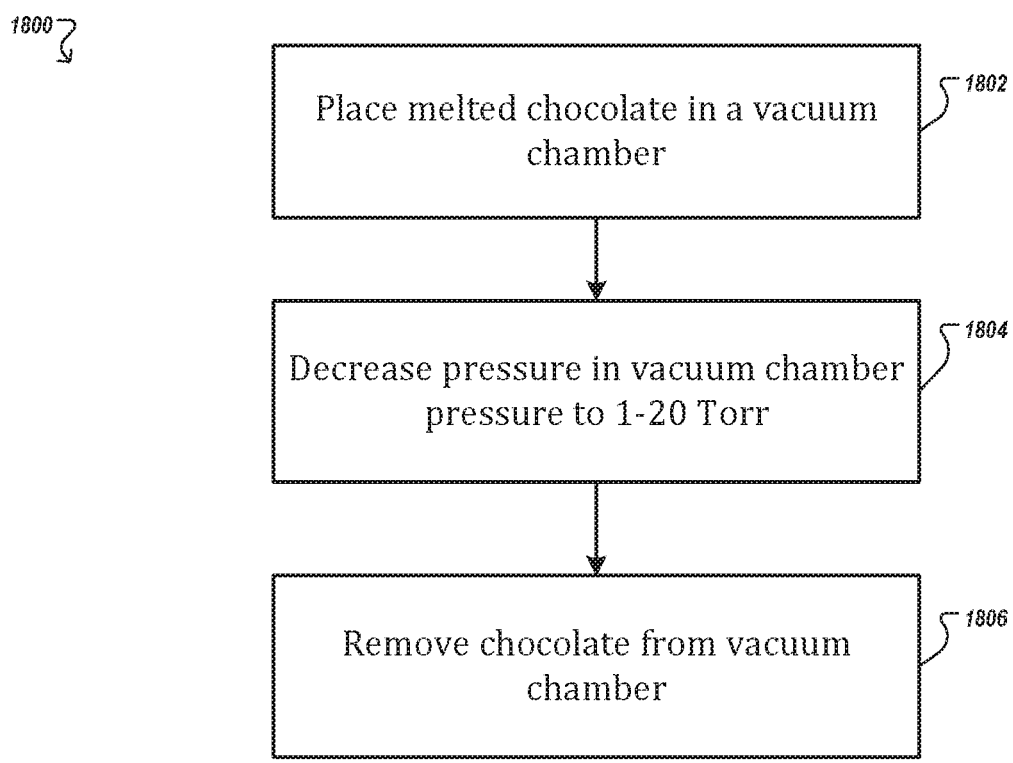
FIG. 18 is a method of conching chocolate according to one embodiment of the present invention.
Figure 19A:
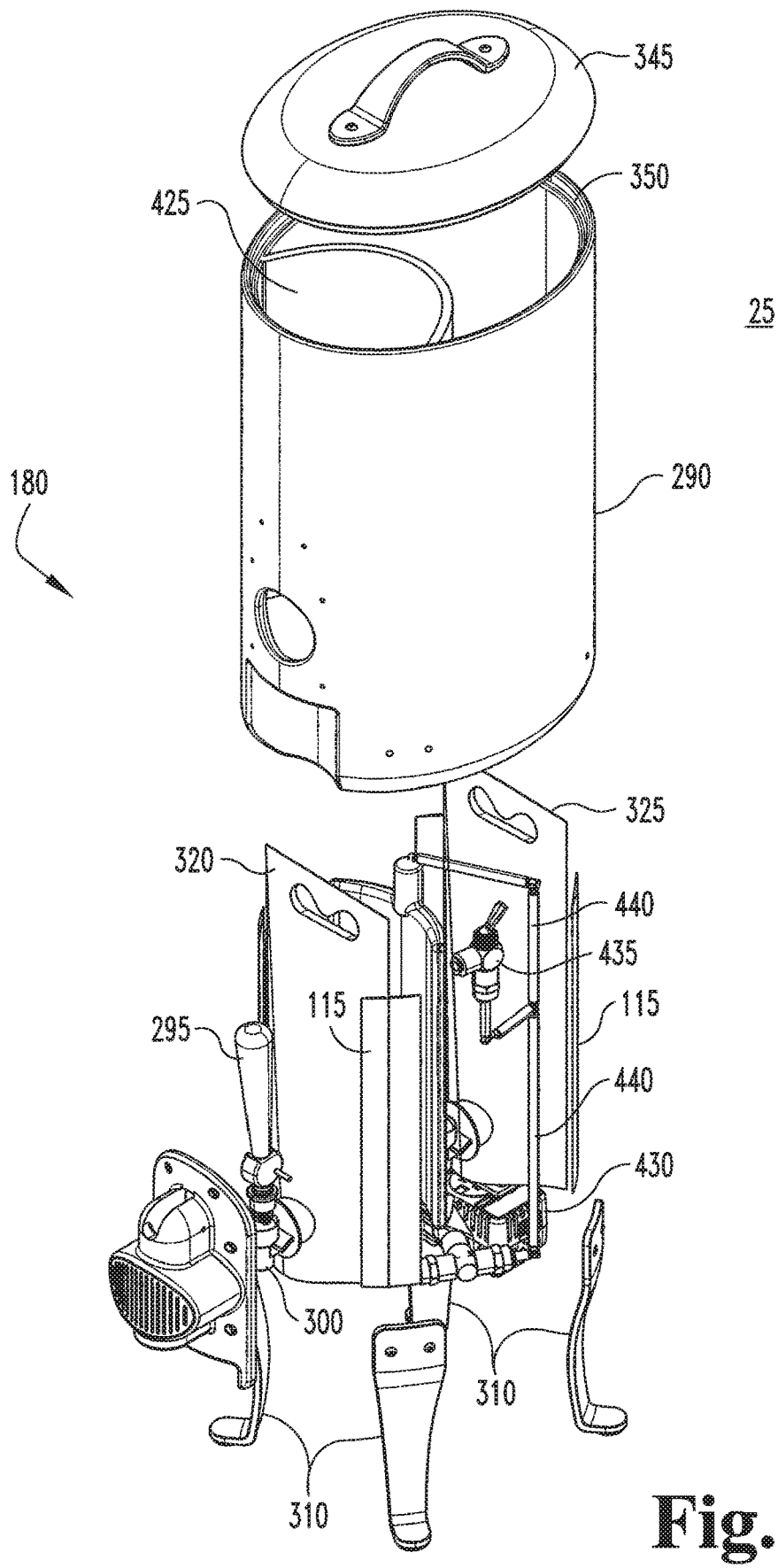
FIG. 19A is an exploded perspective view of an eighth embodiment of the chocolate dispensing system.
Figure 19D:
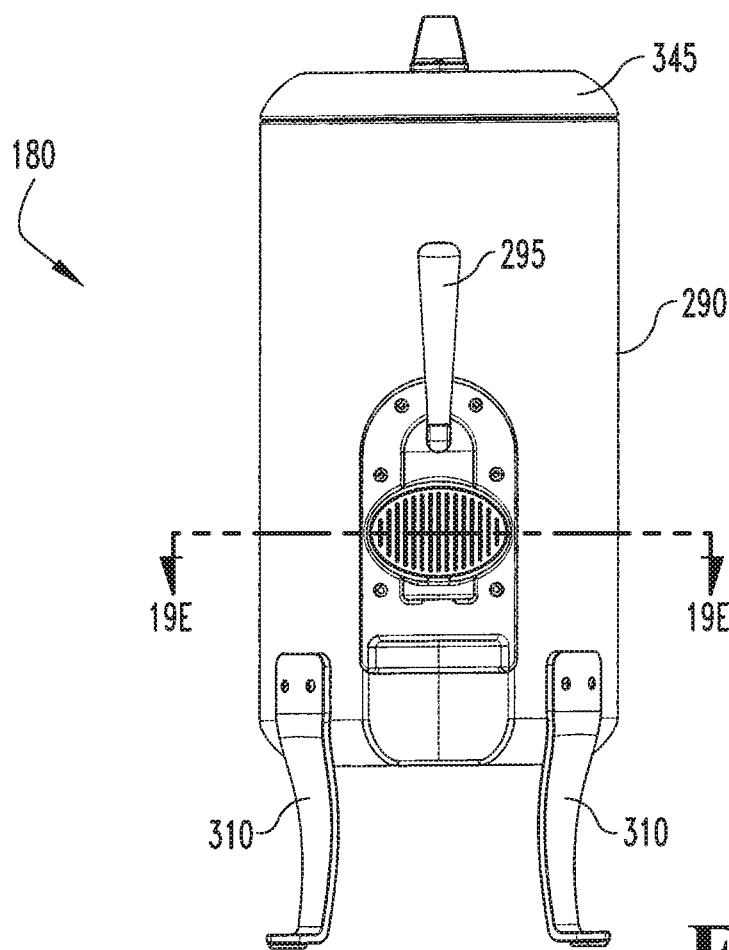
FIG. 19D is a perspective view of an eighth embodiment of the chocolate dispensing system from the front.
Figure 19E:
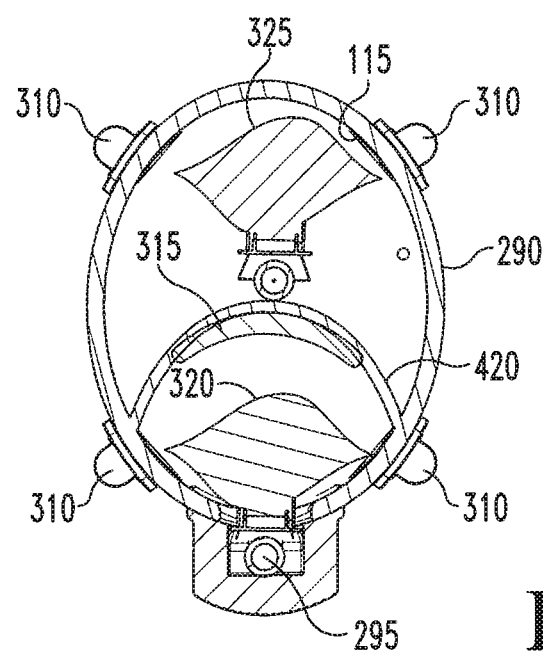
FIG. 19E is a sectional view of an eighth embodiment of the chocolate dispensing system from the top.
Figure 19F:
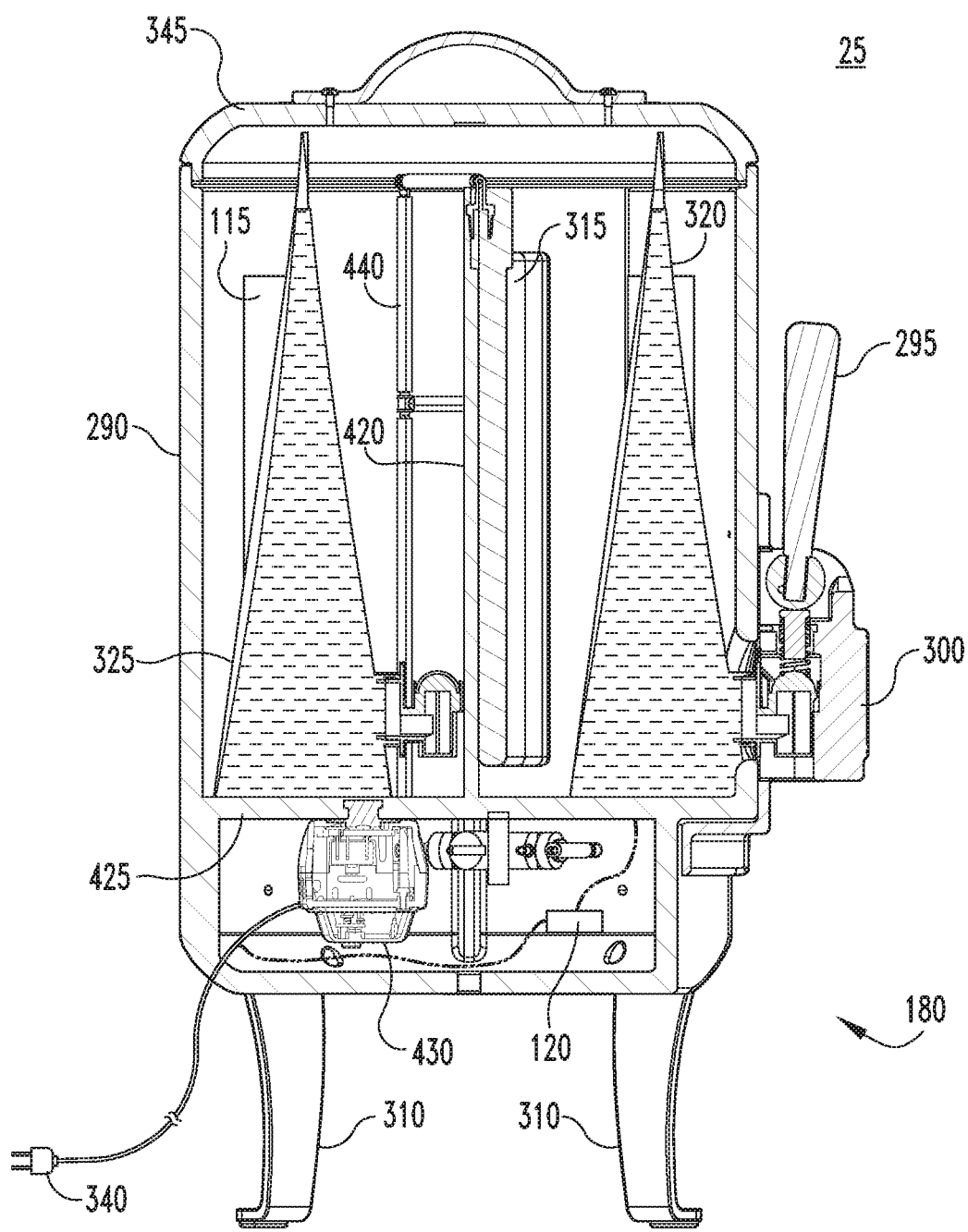
FIG. 19F is a sectional view of an eighth embodiment of the chocolate dispensing system from the side.

In some instances, contents 45 of housing 10 may have a relatively low viscosity in the melted state to enable it to flow out dispenser 35 at a reasonable rate. While the conching process (described elsewhere in this application) presents one technique for decreasing viscosity. FIGS. 16-18 describe methods using the present novel technology for storing contents, and for decreasing the viscosity of contents (typically chocolate) and producing a flavor profile superior to conched chocolate using a conche-free system.

FIG. 16 depicts storing method 1600 for maintaining contents 45 in ambient conditions without compromising the integrity of contents 45. Storing method 1600 may typically include the steps of "Fill container with molten contents to the desired level" 1602, "Seal container from external environment" 1604, and "Store container at ambient conditions" 1606. Examples of filling, sealing, and storing for steps 1602, 1604, and 1606, respectively, using the present novel technology are described elsewhere in this disclosure. Using storing method 1600, a supplier, distributor, and/or customer may fill, pack, distribute, and/or store containers (e.g., container 10, twist-type container 150, press-type container 200, bulk container 220, and/or the like) for extended periods of time, while maintaining contents 45 in typically stable (i.e., fluid-tight) conditions, until it is time to dispense contents 45 using the present novel technology.

FIG. 17 depicts a dispensing method 1700 for dispensing contents 45 from a container (e.g., container 10, twist-type container 150, press-type container 200, bulk container 220, and/or the like) of storing method 1600 without compromising the integrity of contents 45. Dispensing method 1700 may typically include the steps of "Disengage container seal from container" 1702, "Place container on powered base to melt and agitate contents" 1704, and "Operate and/or activate dispenser to release contents into external environment" 1706. Examples of disengaging seal, melting and agitating contents, and operating and/or activating dispenser for steps 1702, 1704, and 1706, respectively, using the present novel technology are described elsewhere in this disclosure. Using dispensing method 1700, a customer may receive, unpack, assemble, melt, agitate, and dispense contents 45 from containers (e.g., container 10, twist-type container 150, press-type container 200, bulk container 220, and/or the like), while typically maintaining contents 45 in typically stable (i.e., fluid-tight) conditions, until it is time to dispense contents 45 using the present novel technology.

FIG. 18 depicts a vacuum method 1800 for vacuuming contents 45 in a conche-free manner without compromising the integrity of contents 45 and increasing quality (e.g., desired flavor profile, viscosity, oxygenation, unpalatable compound content, decreased water content, and the like) of contents 45 (typically chocolate). Vacuum method 1800 may typically include the steps of "Place molten contents in vacuum chamber" 1802, "Decrease pressure in vacuum chamber to 1-20 Torr" 1804, and "Remove contents from vacuum chamber" 1806. During the placing step 1802, molten contents may preferably be at a temperature of 90°-125° Fahrenheit, and may be more preferably at a temperature of 105°-120° Fahrenheit. During the decreasing step 1804, atmospheric pressure in the vacuum chamber may typically be decreased to 1-20 Torr, more preferably 1-5 Torr, more preferably 2-4 Torr, and more preferably 2.5-3 Torr.

While it is known that room temperature (i.e., approximately 21° Celsius) water may boil at approximately 18 Torr and that other undesirable compounds in chocolate typically have a vapor pressure greater than water, and one would assume at these levels the water and undesirable compounds would be removed, the desired flavor profile and viscosity produced by the present method may not achieved until the pressure is decreased below 15 Torr, and more preferably below 5 Torr. If the vacuum pressure is less than 1 Torr, the majority of the desirable flavors may be removed from the chocolate. In some implementations, processing chocolate in such a manner may release bound cocoa butter and/or help develop flavor. Further, in some implementation, contents 45 may be agitated to further promote flavor development.

Vacuum method 1800 may also decrease the viscosity of chocolate by removing micro air bubbles suspended in the chocolate. Air bubbles in chocolate may typically be encapsulated in a layer of cacao butter due to the nonpolar characteristics of air and cacao butter. Removing micro air bubbles may typically release the cacao butter, typically resulting in decrease in the overall viscosity. Micro air bubbles in chocolate typically pop at 20-100 Torr, depending on their size and the particular recipe.

Further, vacuum method 1800 may be added to by vibrating and/or mixing contents 45 during the evacuating process, resulting in rapid migration of air bubbles, gaseous water, and/or other acids. Unlike traditional conching methods, the present vacuum method 1800 prevents further oxidation during the conching process, enabling a comparable chocolate flavor profile to be achieved in minutes instead of days (or longer).

A conche-free system utilizing vacuum method 1800 typically may include the following components: a vacuum chamber (not shown), a vacuum pump (not shown), and/or a vacuum pressure indicator (not shown). Melted contents 45 may be placed directly into the vacuum chamber or may be placed into a bowl or similar support prior and then placed in to the vacuum chamber. The vacuum may then be applied, and once the chamber reaches the desired pressure, the pressure may return to atmospheric pressure and the chocolate may be removed.

In some implementations of the present novel technology, storing method 1600, dispensing method 1700, and/or vacuum method 1800 may be performed serially and/or cyclically. For example, unconched chocolate may be shipped to a supplier, who may then initially process contents 45 and store contents 45 in a container (e.g., container 10, twist-type container 150, press-type container 200, bulk container 220, and/or the like) using storing method 1600. The container may then be sent to a refiner who performs dispensing method 1700 and then vacuum method 1800 to refine contents 45 to desired profile(s). Contents may then be stored using storing method 1600 and then shipped to a distributor and/or customers directly. Customers may then dispense contents 45 using dispensing method 1700. In other implementations, all steps of methods 1600, 1700, and 1800 may be performed by a single individual (e.g., a customer, supplier, and/or the like). In still other implementations, some steps of methods 1600, 1700, and/or 1800 may be omitted (e.g., storing step 1608 may be omitted and disengaging step 1702 may be immediately performed), and the aggregate process may remain functional.

In some further implementations of the present novel technology, further pressure member(s) 315 (e.g., as might be used with or in place of bladder, pump, pressure member, torsion member, rod, lid spring, and the like) that may be used to apply typically constant force against a container of contents. In one implementation, a spring steel member may be attached to a springs, which are in turn slidably attached to a track with loaded springs. This is in turn attached to a rigid and/or semi-rigid wall. Thus, as the content container depletes, the springs may press the track attachments upwards, pressing the spring steel against the wall and into the container, while maintaining a typically consistent force profile against both, and allowing contents to continue to be expelled at a relatively constant rate from a dispenser.

One of the challenges may be to design a pressure member 315 that is sufficiently easy for a user to load and unload the pouch of contents. For example, but not by limitation, ideally the user may load the contents with one hand and set the pressure member 315 with the other hand. Another challenge may be the space constraint of the exterior container 290. For example, the thickness of the base of the container (e.g., press-type container 190), not taking into account the valve may be approximately three inches. Further, the valve may be, for example, approximately 1.5 inches from front to back. If the pressure member 315 is attached to a fixed plate, then the stroke may typically be at least about 4.5 inches and still have compression at the end of the stroke to insure that the contents are still flowing.

Another such implementation typically may include pull handle, support plate, contact plate, extension springs, spring steel, and/or pivots. The contact plate typically may be a curved plate that would press against the contents pouch (e.g., press-type container 190). In some implementations, it typically may be heated. In this implementation, a person typically may pull up on the pull handle. This typically may extend two extension springs, straightening out the spring steel plate. When the spring steel plate is straightened, it may typically draw the contact plate inward. There typically may be two pivot points that allow the spring steel to straighten, although more or less may be used as desired. In a loaded state, the above implementation may typically be ready to apply force to the content container, while the springs are at or near full extension.

In some implementations, the clearance of the dispenser typically may be taken into account. Typically, a content container may completely seat inside and at the bottom of a dispenser unit, with the content container pushed forward so that the container dispenser is protruding through the exterior housing. Container dispenser typically may not be ready to operate until actuated by a user, a tap, and/or other mechanism. In some implementations, the handle may be pulled upward with one hand, the container being removed with the other hand. The opposite set of steps typically may be used to remove the content container and to load the pressure member 315.

In further implementations, there may be room to store an additional content container within the housing volume. In one such implementation, a dispenser unit may have a diameter of approximately nine inches and outer dimensions between the legs of approximately six inches. However, a dispenser unit may, of course, be sized and/or constructed as desired.

In additional implementations, when the spring steel bends and straightens, the contact plate may tend to move vertically because only the top pivot slides. In some implementations, slots in the contact plate may be used to help keep the contact plate at a relatively constant height.

In yet another implementation, instead of simply storing an additional content container, a dispenser unit may have two or more functional exterior dispensers within the same dispenser unit, for example, disposed in a back-to-back orientation. In some implementations, dimensions may be modified to accommodate these orientations. Further, in some implementations, the two pressure members 315 may, slide in order to get the two content containers to properly and/or easily fit and/or extend through the exterior container. In some other implementations, where two or more exterior dispensers may be desired, the dispenser unit may be mounted on a turn table such that when one content container is empty, the top of the dispenser unit may be rotated (by turning the turn table) to expose the other exterior dispenser(s).

Additionally, in another implantation of a pressure member, a user may insert his or her fingers through the loop and push down on a handle. This in turn may urge a pin, typically connected to the end of a rod, against the bottom of a spring steel loop.

As with above, clearance may be taken into account for container dispenser(s). Containers of contents typically may be seated at the bottom of the dispenser unit, with the container of contents pushed forward such that the container dispenser passes through the exterior container and protrudes from the dispenser unit for use. Further, additional room within the exterior container that may be used to store an additional container of contents may also be provided. For example, a dispenser may have a nine-inch diameter and outer dimensions of the legs of six inches. These dimensions may, of course, be modified as desired. Similar, this implementation may be used for with multiple dispenser units including two or more exterior dispensers, pressure members, and/or containers of contents.

In some implementations, pressure member(s) may have a full stroke of approximately 4.5 inches and apply about 20 pounds of force at the end of the stroke. This may place the loop in a deflective state, which may be undesireable in some use cases. In some other implementations, these strokes may be modified to apply more or less force throughout a stroke, such as by using energy in a spring, spring steel, bladder, and/or the like. In some further implementations, the pressure member(s) typically may be removable, allowing for simplified cleaning of the exterior container and associated components.

In yet another implementation, a pressure member may typically include handle, pivots, springs, and/or contact plate. Typically, there may be sheet metal at the bottom of this implementation's pressure member that has been folded. This extra material may have horizontal slots across its base, these slots purpose being to help prevent the front end of the contact plate from lifting upwards. In this implementation, one may load the mechanism by pulling on handle.

When the springs may be repositioned onto the front half of the mechanism in this implementation, the bottom end of the spring may pull up on the linkages, which may in turn drive the contact plate outward. The top of the spring may pull from the top of the contact plate downward and outward. In some implementations, if a wear resistant plastic (including but not limited to ultra-high-molecular-weight polyethylene (UHMWPE, UHMW), polyoxymethyne (POM), or the like) is placed at the base of the contact plate, the mechanism typically may slide without the need of a slot.

In another implementation, the direction of the linkages may be reversed. In this implementation, instead of a user pulling tip on a handle to load the mechanism, the mechanism may be loaded by pushing down on the handle. In some implementation, a locking mechanism for the handle may also be included. Typically, when the handle is fully pushed down, the user may turn the handle ninety degrees to lock the mechanism. In some implementations, the user may push down slightly and rotate the handle ninety degrees to disengage and unlock the locking mechanism.

In one implementation of the pressure member, the beginning of a displacement of about 1.5 inches and may result in a force on each spring of about 25.3 pounds. These specifications may be modified as desired to achieve alternative displacements and/or forces. Similarly, at approximately half-way through a pressure member's travel, the force on each spring at this point, for example, may be about 16.8 pounds. Additionally, at the end of the travel, the force at this point may be, for example, approximately 18.9 pounds per spring. In some implementations, the travel of the handle and the springs may, for example, be close to vertical. The force needed to be exerted on the handle may be, for example, about fifty pounds (which may also be the load needed at the start of the compression).

Further, in another embodiment of medium dispenser unit 180, as depicted in FIGS. 19A-19F, typically may include heating element 115, heating controller 120, external exterior housing 290, lever 295, exterior dispenser 300, stand members 310, pressure member 315, tapped container 320, reserve container 325, heating element 330, power source 340, lid 345, lid seal 350, separating wall 420, bottom wall 425, pump 430, pneumatic valve(s) 435, and/or pneumatic line(s) 440.

Medium dispenser unit 180 may typically be configured with exterior housing 290 resting and/or affixed to stand members 310 so as to typically reside several inches above a surface; lid 345 attached to the top of housing 290 to create an fluid-tight seal using lid seal 350; and with lever 295 and exterior dispenser 300 mounted to the outside of exterior housing 290.

Tapped container 320 may be placed inside exterior housing 290 and positioned such that tapped container 320 has a dispenser (e.g., press-type dispenser 200) and/or an outlet (e.g., press-type dispenser outlet 215) positioned with exterior dispenser 300. Lever 295 may typically be configured to activate one or more dispenser mechanisms (e.g., dispenser button 205, twist closure 170, etc.) and dispense melted contents 45 from tapped container 320 through exterior dispenser 300. Pressure member 315 typically may be a pneumatic bladder (such as an air bladder), which is filled by pump 430 through pneumatic valve(s) 435 and/or pneumatic lines(s) 440. As bladder 315 fills, thus increasing in side, it typically may exert lateral pressure on tapped container 320, providing positive pressure to help urge tapped container 320's contents 45 when lever 295 is actuated, allowing melted contents 45 of tapped container 320 to flow through exterior dispenser 300. Heating element 115 may be exposed and/or hidden within exterior housing 290 and typically may be in electric communication with heating controller 115 and/or power source 340 (e.g., a battery, generator, household electrical socket, etc.). Heating element 115 typically may include a temperature sensing member (e.g., thermocouple, thermometer, heat flux sensor, thermistor, and/or the like) and/or a heating member (e.g., resistive coil/wire using Joule heating, heat pump, heat exchangers, Peltier effect devices, and/or the like). In some implementations, heating element 115 may be one or more heating strips attached to exterior housing 290 and/or bottom wall 425, allowing thermal energy to radiate through unit 180, housing 290, container(s) (e.g., tapped container 320, reserve container 325, etc.), and/or contents 45. A fluid (e.g., water, oil, air, etc.) may then be circulated around and/or by heating element 115 within the confines of exterior housing 290, providing thermal energy sufficient to melt the contents 45 of the tapped container 320 and/or a reserve container 325. In some implementations, still and/or stagnant heated fluid (e.g., air), such as might result from heating housing 290 using heating strips 115, may provide sufficient thermal energy to melt contents 45 and allow pressure member 315 to urge contents 45 out of tapped container 320 and exterior dispenser 300.

In some implementations, reserve container 325 also may reside in external housing 290 and be maintained in a similarly liquid state as tapped container 320. Once tapped container 320 expels most or all of its contents 45, a user may open lid 345; depressurize pressure member 315 by deactivating pump 430, actuating pneumatic valve 435, and/or disconnecting pneumatic line(s) 440; and then remove the spent tapped container 320. In some other implementations, pump 430 may reverse inflow and outflows to remove fluid from pressure member 315 via pneumatic hose(s) 440. The user may then move and insert reserve container 325 into the tapping position that tapped container 320 was in; repressurizing pressure member 315 (e.g., by turning pump 430 back on, reversing pump 430 outflow/inflows, actuating pneumatic valve 435 back to original position, reconnecting pneumatic line(s) 440, and/or the like); and reattaching lid 345. A new reserve container 325 may be placed into the now void area if a user wishes, and a lack of a new reserve container 325 may act as an inventory reminder to purchase new content containers for the dispensing system.

Pressure member 315 may be one or more pneumatic bladders, spring-loaded, and/or similar elements. A fluid typically may be pumped into a variably sized containment bladder 315, which, may then exert force upon a container (e.g., press-type container 190) of contents 45 (e.g., the container may be tapped container 320, reserve container 325, twist-type container 150, press-type container 200, interior content container 230, and/or the like). As contents 45 may be dispensed from a dispenser unit (e.g., small dispenser unit 145, medium dispenser unit 180, large dispenser unit 185, bulk dispenser unit 245, and/or the like), bladder 315 may then increase in volume to continue exerting pressure on the exterior of the container 190. A pneumatic pump 430 typically may be used to pressurize bladder 315, such as a centrifugal-type, diaphragm-type, plunger-type, piston-type, gear-type, roller-type, submersible-type, rotary vane-type, peristaltic-type, impeller-type, metering-type, and/or any other type of pneumatic pump 430, although a simple diaphragm-type pump 430 (e.g., an aquarium air pump 430) may be sufficient to pressurize bladder 315 and exert force sufficient to expel contents 45. Such a diaphragm-type pump 430 may natively (i.e., without metering, controllers, and/or the like) pressurize bladder 315, for example, to about one PSI, which may then translate to, for example, about fifty or sixty PSI over the bladder 315's surface area. However, any pump 430 output and/or type may be selected to achieve desired pressure characteristics and output volume.

In some implementations, the bladder pressure member 315 may be pressurized manually (e.g., upon switching on or plugging in a pump 430, expelling gas into the bladder 315 either directly or indirectly, etc.) and/or automatically (e.g., a pneumatic pump 430 may turn on when output from a dispenser (e.g., small dispenser unit 145, medium dispenser unit 180, large dispenser unit 185, bulk dispenser unit 245, and/or the like) decreases, a pressure pad registers insufficient force, etc.), and/or the like. Further, in some implementations, the bladder-type pressure member 315 may be directly connected to, and/or integrated with, pump 430. However, in other implementations, the bladder-type pressure member 315 may be indirectly connected by pneumatic tubing 440, valves 435, and/or other controlling/metering elements. Further, in some implementations, pump 430 (and/or alternative pneumatic source) may continue to provide sufficient pressurization when a leak in the pressure member 315 pneumatic system exists, with low pneumatic output.

In yet other implementations, bladder-type pressure member 315 with an automatic and/or manual valve 435 may be used to meter pressure for pressurization and/or depressurization. For example, after opening a dispenser unit 180 (e.g., by removing lid 345 from medium dispenser unit 180, large dispenser unit 185, and/or the like) and/or before disconnecting a container (e.g., twist-type container 150, press-type container 200, bulk container 220, and/or the like) of contents 45, valve 435 may be operated to release and/or maintain fluid within the pneumatic bladder 315. Thus, pneumatic bladder 315 may be relieved of pressure to allow a user to remove a container from a dispenser 180 and/or reengage a pneumatic source (e.g., pump 430) to pressurize the bladder 315. In some implementations, the pneumatic valve(s) 435 may be automated to pressurize and/or depressurize upon certain conditions. For example, upon opening lid 345 or removing power source 340 from a dispenser 180 and/or pneumatic pump 430, the bladder 315 may automatically depressurize (allowing maintenance on the dispenser) and then repressurize when lid 345 is reattached and/or when the pump 430 is reconnected to power source 340. In other examples, a stretch sensor connected to bladder 315 may cause bladder 315 to depressurize when the bladder 315 is beyond a certain size threshold; a pressure sensor located adjacent to a container 190, when sensing insufficient pressure being exerting on the container 190, may depressurize the bladder 315 and/or lower the output of a controllable pneumatic pump 430; and/or a pressure sensor may send a signal to increase the output of a controllable pneumatic pump 430.

In some implementations, an identifier system may be used to further calibrate dispenser units (e.g., small dispenser unit 145, medium dispenser unit 180, large dispenser unit 185, bulk dispenser unit 245, and/or the like) to a desired temperature and/or pressure for different contents 45. An identifier system typically may include one or more identifiers, one or more user interfaces, and/or one or more interrogation devices. For example, dispenser unit 180 may include a touchpad, touchscreen, and/or like user interface for entering an identifier, such as a contents 45 code (e.g., binary, hexadecimal, decimal, alphabetical, alphanumerical, and/or the like). Upon entry and/or confirmation, unit 180 may retrieve temperature and/or pressure parameters and configure unit 180 accordingly. Some implementations may utilize passive and/or active interrogation mechanism to retrieve identifier(s). For example, a container (e.g., press-type container 190) may include one or more embedded identifiers (e.g., barcodes, QR codes, active and/or passive radio-frequency identification (RFID) tags, and/or the like. Likewise, unit 180 may include one or more interrogation devices, such as code scanners, tag readers, and/or the like. Upon interrogation of identifier(s) by interrogation device(s), unit 180 may receive and configure parameters of unit 180 accordingly for specific contents 45. In some further implementations, these identifiers may be used to enable monitoring of approved and/or unapproved counterfeit content 45 containers. For example, if unit cannot read an identifier, or the parsed identifier does not meet predetermined parameters, unit 180 may not operate properly and/or at all.

Additionally, contents 45 of the present novel technology may be characterized as composite materials with a fatty, or hydrophobic, matrix suspending partially and/or fully emulsified hydrophilic components. In the case of chocolate, cacao butter may provide a matrix, which typically may be above 20% by weight, which suspends cacao bean solids and ground sugar crystals. Natural emulsifiers that may be released during the grinding process, such as cacao lecithin, help to provide the amphipathic properties for stabilizing the hydrophilic particles in the hydrophobic matrix and may also prevent clumping. Additional emulsifying agents, such as soy lecithin, may often be added to chocolate to further reduce the composite surface tension resulting in a decreased viscosity.

Fatty matrix composites, especially composites containing saturated and/or substantially saturated fatty acids may often be characterized as solids at room temperature with a relatively low thermal conductivity and narrow liquid window before decomposing at elevated temperatures. Chocolate, for example, typically may have a relatively narrow liquid window with melting points ranging from 80-96 degrees Fahrenheit depending on crystal structure, and a thermal degradation taking place at temperatures above 120 degrees Fahrenheit. Chocolates narrow liquid window and low thermal conductivity typically may require long, gentle melting cycles to preserve flavor and texture.

Processing methods for contents 45 present novel technology typically may process molten chocolate under vacuum. Low or rough vacuum levels are typically between 25 and 760 Torr (atmospheric pressure). This pressure range typically may be characterized by a very short molecular mean free path, which typically may be approximately 66 nanometers to 1.75 micrometers, and which typically may result in a high level of molecular interaction. Medium vacuums levels typically may be between 0.001 to 25 Torr. This medium pressure range transitions through a relatively broad range of molecular mean free paths, which may typically be approximately 1.75 micrometers to 10 centimeters, and which typically may correlate to rapidly decreasing molecular interactions as the pressure decreases through this range. In some implementations, this typically may be observed in a plasma discharge transitioning from an arc at 25 Torr that may then rapidly delocalize to a diffuse plasma under 1 Torr. At the lowest point of this medium range, gas molecules typically may be more likely to hit the walls of a relatively small vacuum chamber than interact with each other.

Processing method typically may manipulate the atmospheric pressure to consistently remove trapped air bubbles and develop the flavor of contents 45 prior to sealing in a container (e.g., press-type container 190). Contents 45 typically may be preferably maintained in a liquid state during processing method 450 to enable efficient migration of trapped gases. During the first stage of vacuum processing, trapped air bubbles expand in size enabling them to rise to the surface of the material. This typically may be observed by the rapid expansion of contents 45 volume in the vacuum chamber.

At approximately 75-25 Torr (depending on temperature, viscosity, and degree of agitation), the surface tension of the expanding bubbles in contents 45 typically may be unable to contain the gases, resulting in a rapid rupturing of the evolving bubbles and a substantial release of the trapped air bubbles. This first stage may typically also be characterized by decrease in contents 45's viscosity resulting from the release of bound emulsifiers and fatty matrix components previously encasing the air bubbles.

During the second stage of processing method, at pressure typically under 25 Torr, some of the molecules in the content begin to rapidly evaporate resulting in a reproducible evolution of content 45's flavor profile. Once the desired pressure is reached, contents 45 may be returned to atmospheric pressure and packaged in a container (e.g., press-type container 190).

Further, if the pressure is decreased below the desired pressure (i.e., typically below 1 Torr), the third stage of processing method may be reached. Typically, during this stage, contents 45's flavor profile typically may begin to degrade as desirable components typically may be removed from contents 45, resulting in a bland and/or undesirable flavor. For chocolate, the third stage typically may occur at pressures less than 1 Torr, significantly higher than typical vacuum levels used for freeze drying and/or vacuum-processing of food. In some implementations, while this may create undesirable chocolate due to releasing desirable elements through outgasing on contents 45, collection of these desirable elements for further processing, concentration, and/or distilling may result in alternative products (e.g., candles, aromatics, and/or the like) that may contain these desired elements.

In one example of processing method, a sample chocolate in its liquid state typically may be heated to approximately 115 degrees Fahrenheit, removed from the heat source, placed in a vacuum chamber, and evacuated at a rate of 1 cubic foot per minute of pumping capacity per cubic foot of vacuum chamber until a pressure of approximately 5 Torr is reached. During evacuation, the vacuum chamber and chocolate typically may be vibrated, stirred, rotated and/or otherwise agitated using any convenient mechanism for agitation to help break the surface tension of the chocolate bubbles released during the first stage and to prevent contents 45 from overflowing in the vacuum chamber.

In a first exemplary embodiment, a content dispensing container (e.g., twist-type container 150, press-type container 190, and/or the like) includes a deformable fluid-tight container shell defining an internal volume and separating the internal volume from an external environment; a semi-solid content contained within, the internal volume; a valve stem operationally connected to and disposed at least partially through the deformable container shell; and a valve disposed in the external environment and operationally connected to the valve stem. Further, the semi-solid content may be a hydrophobic matrix with at least partially emulsified hydrophilic components suspended therein; the container shell may be substantially fluid-tight; the valve may have at least one open state and a closed state; the valve may be actuated between the at least one open state and the closed state; the valve may be self-cleaning; the internal volume may be in fluidic communication with the external environment during the at least one open state; the internal volume content cannot fluidically communicate with the external environment during the closed state; and the content may remain moisture-stable while the valve is in the closed state.

In some further implementations of the first exemplary embodiment, the content may contain less than 3% water; the content may be solid at room temperature; and/or the valve may be selected from the group comprising: a twist-type valve, a press-type valve, an anti-drain valve, a bulk dispenser, an exterior dispenser, and a ball valve. Additionally, the semi-solid content may melt into a viscous fluid upon heating; the matrix may be cacao butter and the at least partially emulsified hydrophilic components may be cacao bean solids and ground sugar crystals; the content may be solid at room temperature; and/or the semi-solid content may be selected from the group consisting of chocolate, cheese, cosmetic products, and combinations thereof.

In a second exemplary embodiment, a content dispensing apparatus may be provided, typically including a housing defining a first volume; a pressure member operationally connected to the inner wall, where the pressure member is actuatable to move into the first volume; an aperture formed through the housing for fluidic communication with the first volume; an actuator operationally connected to the pressure member; a heater connected in thermal communication with the first volume; and a first deformable pouch positioned in the first volume. The first deformable pouch may further include a fluid-tight enclosure, dispensable content substantially filling the fluid-tight enclosure, a fluidic conduit extending through the fluid-tight enclosure, and a fluidic valve operationally connected to the fluidic conduit and positioned without the fluid-tight enclosure. Additionally, the fluidic conduit typically may extend through the aperture; the fluidic valve may be positioned without the first volume; energization of the actuator may urge the pressure member against the first deformable pouch; and, when the actuator is energized, actuation of the valve may allow chocolate to flow from the first deformable pouch.

Figure 20A:
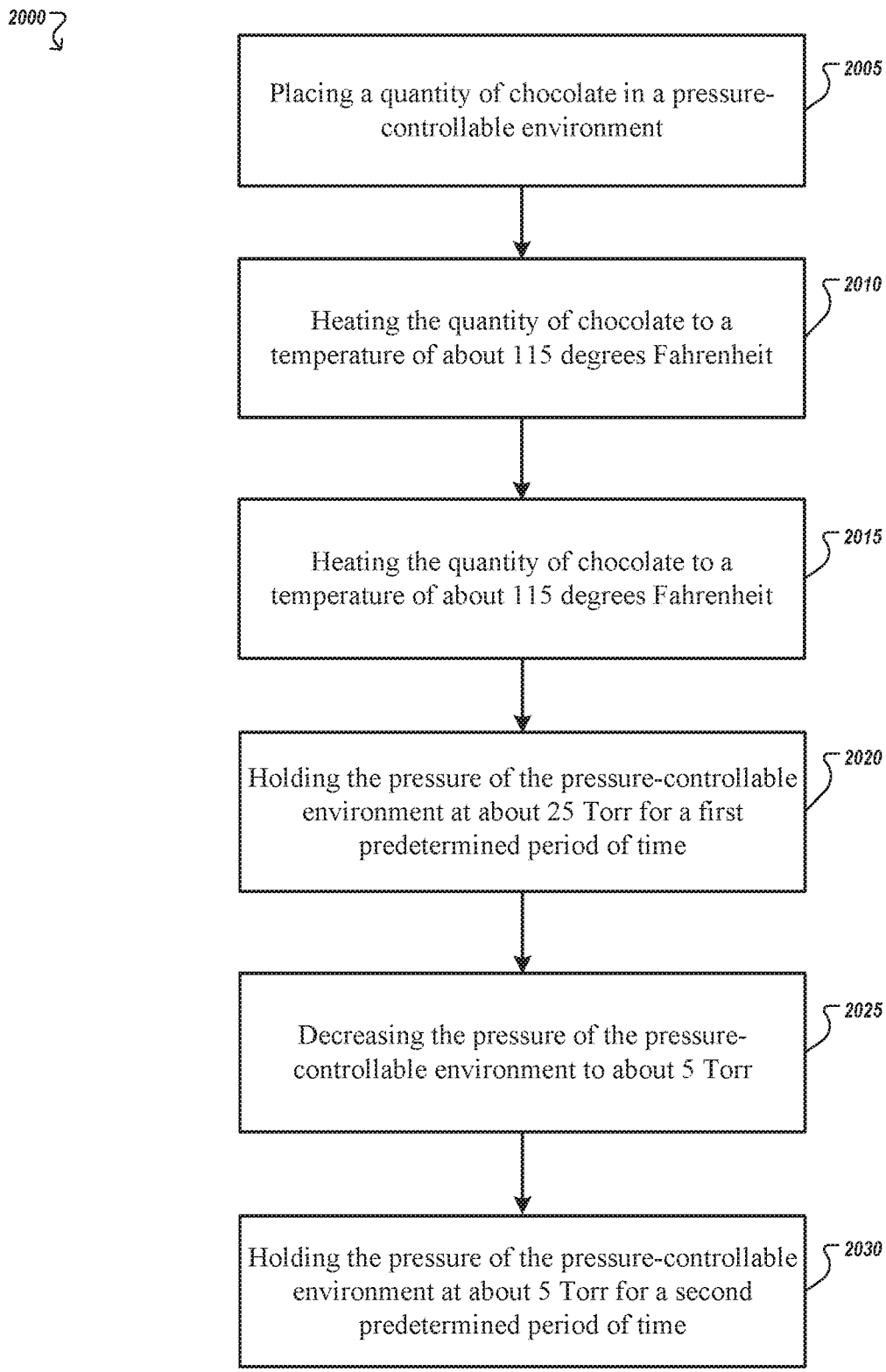
FIG. 20A is a process flow associated with a method of processing chocolate according to one embodiment of the present invention.
Figure 20B:
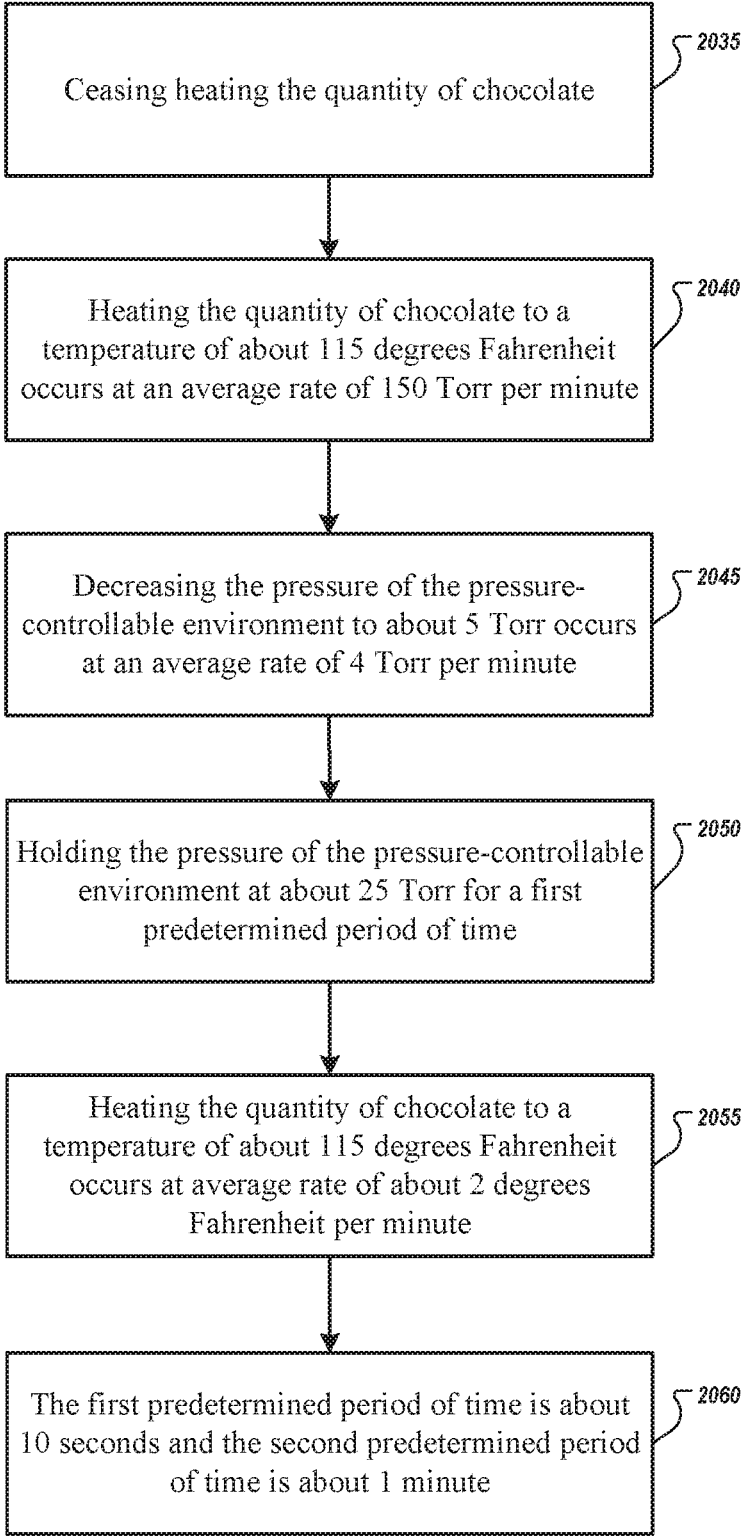
FIG. 20B is a second process flow associated with a method of processing chocolate according to one embodiment of the present invention.
Figure 20C:
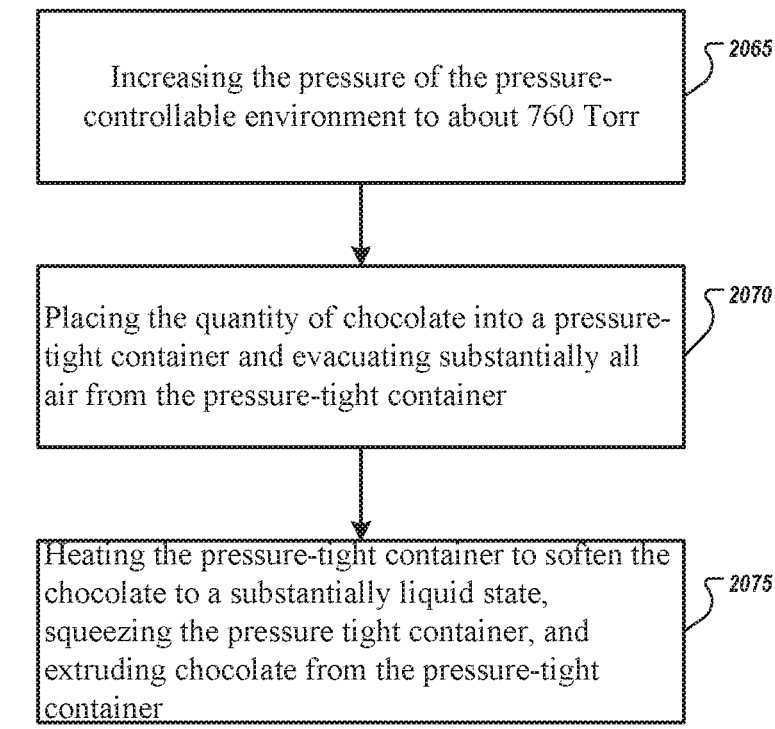
FIG. 20C is a third process flow associated with a method of processing chocolate according to one embodiment of the present invention.

In some other implementations of the second exemplary embodiment, the apparatus may further include an inner wall positioned in the housing and bifurcating the first volume into separate second and third volumes. In other implementations, apparatus may also include a cover member operationally connected to the housing, where engagement of the cover member with the housing may substantially isolate the first volume from an outside environment; where engagement of the cover member creates a substantially pressure-tight seal defining a pressure vessel; and where disengagement of the cover member from the housing allows deformable pouches to be moved into and out of the first volumes Further, in still another implementation of the second exemplary embodiment, the pressure member may be a pressure vessel and the actuator may be a pump in fluidic communication with the pressure vessel and/or the pressure member may be an inflatable bag and the actuator may be a pump in fluidic communication with the inflatable bag In a third exemplary embodiment, as depicted in FIGS. 20A-20C, a method for treating chocolate typically may include the steps of a) placing a quantity of chocolate in a pressure-controllable environment 2005, b) heating the quantity of chocolate to a temperature of about 115 degrees Fahrenheit 2010, c) decreasing the pressure of the pressure-controllable environment to about 25 Torr 2015, d) holding the pressure of the pressure-controllable environment at about 25 Torr for a first predetermined period of time 2020, e) decreasing the pressure of the pressure-controllable environment to about 5 Torr 2025; and f) holding the pressure of the pressure-controllable environment at about 5 Torr for a second predetermined period of time 2030. In some other aspects, the method may also include, after b) and before e), ceasing heating the quantity of chocolate 2035; after f) increasing the pressure of the pressure-controllable environment to about 760 Torr 2065; placing the quantity of chocolate into a pressure-tight container and evacuating substantially all air from the pressure-tight container 2070; and/or heating the pressure-tight container to soften the chocolate to a substantially liquid state, squeezing the pressure tight container, and extruding chocolate from the pressure-tight container 2075. Further, in some implementations, step c) may occur at a rate of about 150 Torr per minute 2040, step e) may occur at a rate of about 4 Torr per minute 2045, step b) may occur at an average rate of about 2 degrees Fahrenheit per minute 2050, and/or the first predetermined period of time may be 10 seconds and the second predetermined period of time may be 1 minute 2055.

In another implementation of the third embodiment, the method may include steps including placing a quantity of chocolate in a pressure-controllable environment; heating the quantity of chocolate to a temperature of about 115 degrees Fahrenheit; decreasing the pressure of the pressure-controllable environment to about 5 Torr; and holding the pressure of the pressure-controllable environment at about 5 Torr for a predetermined period of time. Additional steps may include decreasing the pressure of the pressure-controllable environment to about 5 Torr at an average rate of about 8 Torr per minute; heating the quantity of chocolate to a temperature of about 115 degrees Fahrenheit may occur at a rate of about 2 degrees Fahrenheit per minute; and/or heating the quantity of chocolate to a temperature of about 115 degrees Fahrenheit may occur at a rate of no more than 1 degree Fahrenheit per minute.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A method for treating chocolate, comprising:
    a) placing a quantity of chocolate in a pressure-controllable environment, wherein the quantity of chocolate has a chocolate surface;
    b) heating the quantity of chocolate to a temperature of about 115 degrees Fahrenheit;
    c) decreasing the pressure of the pressure-controllable environment to about 25 Torr to subject the chocolate surface to a 25 Torr vacuum;
    d) holding the pressure of the pressure-controllable environment at about 25 Torr for a first predetermined period of time;
    e) decreasing the pressure of the pressure-controllable environment to about 5 Torr to subject the chocolate surface to a 5 Torr vacuum; and
    f) holding the pressure of the pressure-controllable environment at about 5 Torr for a second predetermined period of time wherein the first predetermined period of time is about 10 seconds and wherein the second predetermined period of time is about 1 minute.

2. The method of claim 1, and further comprising:
    g) after b) and before c), ceasing heating the quantity of chocolate.

3. The method of claim 1, wherein step c) occurs at an average rate of about 150 Torr per minute.

4. The method of claim 1, wherein step e) occurs at an average rate of about 4 Torr per minute.

5. The method of claim 1, wherein step b) occurs at a rate of about 2 degrees Fahrenheit per minute.

6. The method of claim 1, and further comprising:
    h) after f) increasing the pressure of the pressure-controllable environment to about 760 Torr.

7. The method of claim 1, and further comprising:
    i) placing the quantity of chocolate into a pressure-tight container; and
    j) evacuating substantially all air from the pressure-tight container.

8. The method of claim 7 and further comprising:
    k) heating the pressure-tight container to soften the chocolate to a substantially liquid state;
    l) squeezing the pressure tight container; and
    m) extruding chocolate from the pressure-tight container.

9. A method for preparing chocolate, comprising:
    r) placing a quantity of chocolate defining a chocolate surface in a vacuum chamber;
    s) heating the quantity of chocolate to a temperature sufficient to substantially liquefy the quantity of chocolate;
    t) decreasing the pressure of the vacuum chamber to a first pressure, wherein the chocolate surface is subjected to a vacuum and wherein substantially all trapped gases are outgassed from the quantity of chocolate;
    u) holding the pressure of the vacuum chamber at the first pressure for a first predetermined period of time;
    v) decreasing the pressure of the vacuum chamber to a second pressure, wherein the chocolate surface is subjected to a vacuum and where at least some volatile flavor elements outgas from the quantity of chocolate; and
    w) holding the pressure of the vacuum chamber for a second predetermined period of time;
    wherein the chocolate consists essentially of cacao, cacao butter, and sugar;
    wherein during steps t), u), v), and w), the temperature of the chocolate is maintained sufficiently high to maintain the chocolate as a liquid wherein the first predetermined period of time is about 10 seconds and wherein the second predetermined period of time is about 1 minute.

10. The method of claim 9, wherein step v) selects for a flavor profile for the quantity of chocolate.

11. The method of claim 9, wherein:
    step t) occurs at an average rate of about 150 Torr per minute; and
    step v) occurs at an average rate of about 4 Torr per minute.

12. The method of claim 9, wherein step s) occurs at a rate of about two degrees Fahrenheit per minute.

13. The method of claim 9, wherein step s) occurs at a rate of no more than one degree Fahrenheit per minute.

\* \* \* \* \*